(12) United States Patent
Brown

(10) Patent No.: US 10,184,601 B2
(45) Date of Patent: Jan. 22, 2019

(54) COUPLING ASSEMBLY FOR CONNECTING A DRAIN TO A DRAIN PIPE

(71) Applicant: Norman Brown, Mulmur (CA)

(72) Inventor: Norman Brown, Mulmur (CA)

( * ) Notice: Subject to any disclaimer, the term of this patent is extended or adjusted under 35 U.S.C. 154(b) by 385 days.

(21) Appl. No.: 15/205,513

(22) Filed: Jul. 8, 2016

(65) Prior Publication Data

US 2018/0010722 A1  Jan. 11, 2018

(51) Int. Cl.
| | |
|---|---|
| *F16L 21/08* | (2006.01) |
| *F16L 25/14* | (2006.01) |
| *E03C 1/122* | (2006.01) |
| *F16L 21/00* | (2006.01) |

(52) U.S. Cl.
CPC .............. *F16L 25/14* (2013.01); *E03C 1/122* (2013.01); *F16L 21/08* (2013.01); *F16L 21/002* (2013.01)

(58) Field of Classification Search
CPC . F16L 27/1017; F16L 27/1085; F16L 21/002; F16L 21/005; F16L 21/08; F16L 21/007
USPC .......................................... 285/109, 370, 235
See application file for complete search history.

(56) References Cited

U.S. PATENT DOCUMENTS

| | | | | |
|---|---|---|---|---|
| 3,360,283 | A * | 12/1967 | Guthrie ................. | F16L 21/002 285/110 |
| 3,521,913 | A * | 7/1970 | Verhein ................. | F16L 21/005 285/109 |
| 3,602,531 | A * | 8/1971 | Patry ..................... | F16L 21/002 285/148.23 |

(Continued)

FOREIGN PATENT DOCUMENTS

CA    2698587    4/2011

OTHER PUBLICATIONS

Technical Brochure entitled "U-Flow Mechanical Seal", undated, source https://www.omgroofing.com/literature.html?language=en.

*Primary Examiner* — David Bochna
(74) *Attorney, Agent, or Firm* — Fasken Martineau Dumoulin LLP

(57) ABSTRACT

The present invention relates generally to a kit for coupling a first pipe to a second pipe. The kit includes an elastomeric coupling sleeve provided with top and bottom ends sized to snugly fit within the respective first and second pipes. The coupling sleeve includes top, intermediate and bottom portions and an inner surface that defines a passageway. A first passageway portion extends between the top and intermediate portions and a second passageway portion extends between the intermediate and bottom portions. The first passageway portion tapers toward the intermediate portion and has threading formed along the inner surface. The second passageway portion tapers toward the intermediate portion and has threading formed along the inner surface. The kit also includes top and bottom rigid expansion rings that have threading formed along their outer surfaces configured for engagement with the threading formed along the inner surface of the first and second passageway portions, respectively. When operatively connecting the coupling sleeve to the first and second pipes, each expansion ring is threadingly engageable with the associated portion of the coupling sleeve so as to urge the coupling sleeve in the region of the expansion ring to bulge outwardly and seal the coupling sleeve against the respective first and second pipe.

17 Claims, 41 Drawing Sheets

(56) References Cited

U.S. PATENT DOCUMENTS

| | | | | |
|---|---|---|---|---|
| 3,797,865 | A * | 3/1974 | Ballentine | F16L 21/002 285/237 |
| 4,305,679 | A * | 12/1981 | Modi | E02D 29/14 210/165 |
| 4,469,467 | A * | 9/1984 | Odill | E02D 29/14 285/236 |
| 4,557,625 | A * | 12/1985 | Jahnke | E02D 29/14 285/236 |
| 4,564,201 | A * | 1/1986 | Hannah | F16L 21/005 277/314 |
| 5,549,334 | A * | 8/1996 | Zeisler | F16L 21/005 24/20 TT |
| 5,570,890 | A * | 11/1996 | Skinner | F16L 5/02 285/237 |
| 6,126,206 | A * | 10/2000 | Topf, Jr. | F16L 21/005 138/97 |
| 6,955,498 | B1 * | 10/2005 | McCuan | E02D 29/14 404/25 |
| 8,480,093 | B2 * | 7/2013 | Skinner | F16L 21/005 277/616 |
| 8,534,715 | B2 * | 9/2013 | Abbasi | F16L 21/08 285/338 |
| 8,720,907 | B2 * | 5/2014 | Worley | F16L 21/08 24/279 |

* cited by examiner

COUPLING ASSEMBLY FOR CONNECTING A DRAIN TO A DRAIN PIPE

FIELD OF THE INVENTION

The present invention relates generally to pipe couplings, and more specifically, to a coupling assembly for connecting a drain to a drain pipe.

BACKGROUND OF THE INVENTION

The need to connect a new drain to a drain pipe often arises during building renovations or refurbishment projects. In such instances, the new drain usually includes an insert pipe that has an outer diameter that is smaller than the outer diameter of the drain pipe. A variety of couplings have been developed to join the insert pipe to the drain pipe. For example, it is very common for installers to use a rubber flexible sleeve coupling that fits around and over the top of the standing drain pipe and the bottom of the insert pipe, and is tightly secured in place to each by circular steel band clamps are tightened with screws. While the design of this coupling sleeve is relatively simple and installation of the coupling can be performed relatively easily, the use of this type of coupling may not be well-suited in certain applications where access to the standing drain pipe may be limited or difficult, or where space constraints hinder the installer's ability to properly tighten the steel band clamps.

To address these drawbacks, certain couplings have been configured to fit into the insert pipe and the standing drain pipe. One such coupling is described in Canadian Patent No. 2,698,587 issued to Abbasi et al. The coupling includes an articulated housing which is made up of two solid tubular bodies that are threaded to each other. The tubular bodies are outfitted with an elastic tubular cover which surrounds them. The elastic tubular cover extends along almost the entire length of the tubular bodies and is held in place by two end collars—one collar associated with one of tubular bodies disposed at one end of the articulated housing and the other collar associated with the other tubular bodies located at the opposite end of the articulated housing. One of the collars is provided with a castlehead which is configured to receive a special, bar-shaped tool which allows torque to be applied to the associated tubular body.

During installation, the articulated housing is inserted into the insert pipe and then both the articulated housing and the insert pipe are inserted into the standing drain pipe. Thereafter the special tool is mated with the castlehead provided on the collar and the associated tubular body is urged to rotate and move towards the other tubular body. As this occurs, the span between the two end collars shortens thereby squeezing or compressing the elastic tubular cover between the collars. This compression deforms the elastic tubular cover and causes it to expand outwardly to sealably contact the inner surfaces of the insert pipe and the standing drain pipe.

While this coupling constitutes an improvement over the rubber flexible sleeve described above, in the field some difficulties have been encountered. More specifically, due to its design, the elastic tubular body must be deformed in order to form a seal with the inner surfaces of both the insert pipe and the standing drain pipe. Sometimes, during installation, if the elastic tubular cover does not sufficiently deform, it can fall through the standing drain pipe and can get lodged therein. Retrieval of the lodged coupling can be a difficult and costly undertaking.

A similar problem can be encountered when an installer wishes to disconnect an already installed coupling. It is not possible to separately disconnect the coupling from the insert pipe or the standing drain pipe. In order to disconnect an already installed coupling, the installer has to lengthen the tubular bodies to cause the elastic tubular cover to revert to its non-expanded configuration. When the installer does so, the coupling is simultaneously loosened from both the insert pipe and the standing drain pipe.

Moreover, because of the rigidity and limited sizing options of the tubular bodies, the coupling cannot accommodate a broad range of pipe sizes.

In light of the foregoing, it would be desirable to have a coupling assembly that could be tighten or "locked" in place to each of the standing pipe drain and the insert pipe, independently. Preferably, such coupling assembly would be configured to minimize the risk of it falling into, and becoming lodged in, the standing drain pipe.

SUMMARY OF THE INVENTION

In accordance with one embodiment of the present invention, there is provided a kit for coupling a drain having an insert pipe to a drain pipe. The kit includes a coupling sleeve made of a resiliently deformable, elastomeric material. The coupling sleeve has a tubular sleeve body provided with an inner surface; a top end sized to snugly fit within the insert pipe of the drain; a top circumferential groove defined in the inner surface of the sleeve body at a location proximate the top end of the sleeve body; a bottom end sized to snugly fit within the drain pipe; and a bottom circumferential groove defined in the inner surface of the sleeve body at a location proximate the bottom end of the sleeve body. The thickness of the sleeve body is variable along the top and bottom circumferential grooves. The kit also includes a top expansion ring which is made of a rigid material and which is seized to snugly fit within the top groove. The top expansion ring has a plurality of outwardly projecting structures at spaced apart locations configured to abut the inner surface of the sleeve body. When operatively connecting the coupling sleeve to the insert pipe of the drain, the top expansion ring is rotatable within the top groove to position at least one of the plurality of outwardly projecting structures of the top expansion ring against an area of the sleeve body having increased thickness so as to urge the coupling sleeve in the region of top groove to bulge outwardly and seal the coupling sleeve against the insert pipe. Also provided is a bottom expansion ring made of a rigid material. The bottom expansion ring is sized to snugly fit within the bottom groove and has a plurality of outwardly projecting structures at spaced apart locations to abut the inner surface of the sleeve body. When operatively connecting the coupling sleeve to the drain pipe, the bottom expansion ring is rotatable within the bottom groove to position at least one of the plurality of outwardly projecting structures of the bottom expansion ring against an area of the sleeve body having increased thickness so as to urge the coupling sleeve in the region of bottom groove to bulge outwardly and seal the coupling sleeve against the drain pipe.

In one feature, the sleeve body has a top portion, a bottom portion, and intermediate portion joining the top portion to the bottom portion. The top portion has a diameter that is sized smaller than the diameter of the bottom portion. Optionally, the sleeve body has helical threading projecting from the outer surface thereof.

In another feature, the top circumferential groove has a plurality of top sleeve abutment shoulders formed into the inner surface of the sleeve body. The thickness of the sleeve body along the top circumferential groove is greatest at the locations of the plurality of top sleeve abutment shoulders. The coupling sleeve in the region of top groove has a non-expanded configuration and an expanded configuration. When the coupling sleeve is in the non-expanded configuration, at least one of the plurality of outwardly projecting structures of the top expansion ring abuts at least one of the top sleeve abutment shoulders. When the coupling sleeve is in the expanded configuration, at least one of the plurality of outwardly projecting structures of the top expansion ring is displaced from at least one of the top sleeve abutment shoulders.

In a further feature, the plurality of top sleeve abutment shoulders includes six top sleeve abutment shoulders. Each of the plurality of outwardly projecting structures of the top expansion ring is a top ring abutment shoulder. The plurality of outwardly projecting structures of the top expansion ring includes six top ring abutment shoulders. In an alternative feature, the plurality of top sleeve abutment shoulders includes four top sleeve abutment shoulders. Each of the plurality of outwardly projecting structures of the top expansion ring is a top ring abutment shoulder. The plurality of outwardly projecting structures of the top expansion ring includes four top ring abutment shoulders.

In an additional feature, the top circumferential groove includes a plurality of curved rebate regions disposed in a ring-like arrangement. Each curved rebate region is bound by a pair of the top sleeve abutment shoulders. In at least one of the plurality of curved rebate regions, the thickness of the sleeve body gradually increases between the pair of top sleeve abutment shoulders that bound the at least one of the plurality of curved rebate regions.

In another feature, the bottom circumferential groove is formed with a plurality of bottom sleeve abutment shoulders formed into the inner surface of the sleeve body. The thickness of the sleeve body along the bottom circumferential groove is greatest at the location of bottom sleeve abutment shoulders. The coupling sleeve in the region of bottom groove has a non-expanded configuration and an expanded configuration. When the coupling sleeve is in the non-expanded configuration, at least one of the plurality of outwardly projecting structures of the bottom expansion ring abuts at least one of the bottom sleeve abutment shoulders. When the coupling sleeve is in the expanded configuration, at least one of the plurality of outwardly projecting structures of the bottom expansion ring is displaced from at least one of the bottom sleeve abutment shoulders.

In a further feature, the plurality of bottom sleeve abutment shoulders includes six bottom sleeve abutment shoulders. Each of the plurality of outwardly projecting structures of the bottom expansion ring is a bottom ring abutment shoulder. The plurality of outwardly projecting structures of the bottom expansion ring includes six bottom ring abutment shoulders. In an alternative feature, the plurality of bottom sleeve abutment shoulders includes four bottom sleeve abutment shoulders. Each of the plurality of outwardly projecting structures of the bottom expansion ring is a bottom ring abutment shoulder. The plurality of outwardly projecting structures of the bottom expansion ring includes four bottom ring abutment shoulders.

In an additional feature, the bottom circumferential groove includes a plurality of curved rebate regions disposed in a ring-like arrangement. Each curved rebate region is bound by a pair of the bottom sleeve abutment shoulders. In at least one of the plurality of curved rebate regions, the thickness of the sleeve body gradually increases between the pair of bottom sleeve abutment shoulders that bound the at least one of the plurality of curved rebate regions.

In yet another feature, the top expansion ring is sized smaller than the bottom expansion ring. The number of outwardly projecting structures of the top expansion ring matches the number of outwardly projecting structures of the bottom expansion ring.

In still another feature, the top circumferential groove has a plurality of top sleeve abutment shoulders formed into the inner surface of the sleeve body. The bottom circumferential groove has a plurality of bottom sleeve abutment shoulders formed into the inner surface of the sleeve body. The number of top sleeve abutment shoulders matches the number of bottom sleeve abutment shoulders.

In a further feature, the kit further includes a top key fitting configured to mate with the top expansion ring for fixed rotation therewith. The top key fitting is attachable to a tool. The top expansion ring has a central cutout whose boundaries are defined by a plurality of contoured portions disposed in a ring-like arrangement. Each contoured portion includes a landing configured to receive a portion of the top key fitting. The top key fitting has a body and a plurality of spaced apart stub arms projecting outwardly therefrom. Each stub arm is configured to fit within one landing of a respective contoured portion. Optionally, the plurality of contoured portions includes six contoured portion. In a further option, the plurality of contoured portions includes four contoured portion.

In an additional feature, the kit includes a bottom key fitting configured to mate with the bottom expansion ring for fixed rotation therewith. The bottom key fitting is attachable to a tool. The bottom expansion ring has a central cutout whose boundaries are defined by a plurality of contoured portions disposed in a ring-like arrangement. Each contoured portion including a landing configured to receive a portion of the bottom key fitting. The bottom key fitting has a disc-shaped body and a plurality of spaced apart stub arms radiating therefrom. Each stub arm configured to fit within one landing of a respective contoured portion. Optionally, the plurality of contoured portions includes six contoured portion. In a further option, the plurality of contoured portions includes four contoured portion.

In yet another feature, the kit includes a top key fitting and a bottom key fitting. The top key fitting is configured to mate with the top expansion ring for fixed rotation therewith. The bottom expansion ring is configured to mate with the bottom expansion ring for fixed rotation therewith. Each of the key fittings is attachable to a tool. The top key fitting is sized smaller than the bottom key fitting.

In another broad aspect of the present invention, there is provided a kit for coupling a first pipe to a second pipe. The kit includes a coupling sleeve made of a resiliently deformable, elastomeric material. The coupling sleeve has a tubular sleeve body provided with an inner surface; a top end sized to snugly fit within the first pipe; a top circumferential groove defined in the inner surface of the sleeve body at a location proximate the top end of the sleeve body; a bottom end sized to snugly fit within the second pipe; a bottom circumferential groove defined in the inner surface of the sleeve body at a location proximate the bottom end of the sleeve body. The thickness of the sleeve body is variable along the top and bottom circumferential grooves. The kit further includes a top expansion ring made of a rigid material. The top expansion ring is sized to snugly fit within the top groove and has a plurality of outwardly projecting structures at spaced apart locations configured to abut the inner surface of the sleeve body. When operatively connecting the coupling sleeve to the first pipe, the top expansion ring is rotatable within the top groove to position at least one of the plurality of outwardly projecting structures of the top expansion ring against an area of the sleeve body having increased thickness so as to urge the coupling sleeve in the region of top groove to bulge outwardly and seal the coupling sleeve against the first pipe. Also provided is a bottom expansion ring made of a rigid material. The bottom expansion ring is sized to snugly fit within the bottom groove and has a plurality of outwardly projecting structures at spaced apart locations to abut the inner surface of the sleeve body. When operatively connecting the coupling sleeve to the second pipe, the bottom expansion ring is rotatable within the bottom groove to position at least one of the plurality of outwardly projecting structures of the bottom expansion ring against an area of the sleeve body having increased thickness so as to urge the coupling sleeve in the region of bottom groove to bulge outwardly and seal the coupling sleeve against the second pipe.

In yet another broad aspect of the present invention, there is provided a kit for coupling a first pipe to a second pipe. The kit includes a coupling sleeve made of a resiliently deformable, elastomeric material. The coupling sleeve has a tubular sleeve body provided with an inner surface; a first end sized to snugly fit within the first pipe; a first circumferential groove defined in the inner surface of the sleeve body at a location proximate the first end of the sleeve body; a second end sized to snugly fit within the second pipe; a second circumferential groove defined in the inner surface of the sleeve body at a location proximate the second end of the sleeve body. The thickness of the sleeve body is variable along the first and second circumferential grooves. The kit further includes a first expansion ring made of a rigid material. The first expansion ring is sized to snugly fit within the first groove and has a plurality of outwardly projecting structures at spaced apart locations configured to abut the inner surface of the sleeve body. When operatively connecting the coupling sleeve to the first pipe, the first expansion ring is rotatable within the first groove to position at least one of the plurality of outwardly projecting structures of the first expansion ring against an area of the sleeve body having increased thickness so as to urge the coupling sleeve in the region of first groove to bulge outwardly and seal the coupling sleeve against the first pipe. Also provided is a second expansion ring made of a rigid material. The second expansion ring is sized to snugly fit within the bottom groove and has a plurality of outwardly projecting structures at spaced apart locations to abut the inner surface of the sleeve body. When operatively connecting the coupling sleeve to the second pipe, the second expansion ring is rotatable within the second groove to position at least one of the plurality of outwardly projecting structures of the second expansion ring against an area of the sleeve body having increased thickness so as to urge the coupling sleeve in the region of second groove to bulge outwardly and seal the coupling sleeve against the second pipe.

In still another broad aspect of the present invention, there is provided a kit for coupling a first pipe to a second pipe. The kit includes a coupling sleeve made of a resiliently deformable, elastomeric material. The coupling sleeve has a tubular sleeve body that includes a top portion, a bottom portion, an intermediate portion disposed between the top and bottom portions and an inner surface defining a passageway extending through the top, intermediate and bottom portions. The passageway has a first portion extending between the top portion and the intermediate portion and a second portion extending between the intermediate portion and the bottom portion. The first portion of the passageway tapers from the top portion toward the intermediate portion and has threading formed along the inner surface. The second portion of the passageway tapers from the bottom portion toward the intermediate portion and has threading formed along the inner surface. The sleeve body further includes a top end sized to snugly fit within the insert pipe of the drain and a bottom end sized to snugly fit within the drain pipe. A top expansion ring is also provided. It is made of a rigid material and has threading formed along its outer surface configured for engagement with the threading formed along the inner surface of the first portion of the passageway. When operatively connecting the coupling sleeve to the insert pipe of the drain, the top expansion ring is threadingly engageable with the top portion of the coupling sleeve so as to urge the coupling sleeve in the region of top expansion ring to bulge outwardly and seal the coupling sleeve against the insert pipe. The kit further has a bottom expansion ring made of a rigid material. The bottom expansion ring has threading formed along its outer surface configured for engagement with the threading formed along the inner surface of the second portion of the passageway. When operatively connecting the coupling sleeve to the drain pipe, the bottom expansion ring is threadingly engageable with the bottom portion of the coupling sleeve so as to urge the coupling sleeve in the region of bottom expansion ring to bulge outwardly and seal the coupling sleeve against the drain pipe.

In another feature, the top portion of the sleeve body has a diameter that is sized smaller than the diameter of the bottom portion. In a further feature, the sleeve body has helical threading projecting from the outer surface thereof.

In yet another feature, the sleeve body has a sleeve body wall and the thickness of the sleeve body wall increases from each of the top and bottom ends of the sleeve body towards the intermediate portion. In still another feature, the top expansion ring is sized smaller than the bottom expansion ring.

In additional feature, the kit further includes a key fitting configured to mate with at least one of the top and bottom expansion rings for fixed rotation therewith. The key fitting is attachable to a tool. Optionally, the key fitting is configured to mate with the top expansion ring and the bottom expansion ring. In another feature, the key fitting has a body and a plurality of spaced apart stub arms projecting outwardly therefrom. In one feature, the key fitting has four stub arms.

In a further feature, the top expansion ring has an inner surface that defines a central cutout and includes a plurality of spaced apart landings cut into the inner surface of the top expansion ring at locations about the central cutout. Each landing is configured to receive one of the stub arms of the key fitting. The top expansion ring also has a top face and a bottom face and the plurality of landings extend into the bottom face of the top expansion ring. In an additional feature, the top expansion ring has a plurality of grooves that extend through the top and bottom faces. Each groove of the plurality is shaped to allow one of the stub arms of the key fitting to pass therethrough.

In yet another feature, the bottom expansion ring has an inner surface that defines a central cutout and includes a plurality of spaced apart landings cut into the inner surface of the bottom expansion ring at locations about the central cutout. Each landing is configured to receive one of the stub arms of the key fitting. The bottom expansion ring has a top face and a bottom face and the plurality of landings extend into the top face of the bottom expansion ring.

In still another broad aspect of the present invention, there is provided a kit for coupling a first pipe to a second pipe. The kit includes a coupling sleeve made of a resiliently deformable, elastomeric material. The coupling sleeve has a tubular sleeve body that includes a top portion, a bottom portion, an intermediate portion disposed between the top and bottom portions and an inner surface defining a passageway extending through the top, intermediate and bottom portions. The passageway has a first portion extending between the top portion and the intermediate portion and a second portion extending between the intermediate portion and the bottom portion. The first portion of the passageway tapers from the top portion toward the intermediate portion and has threading formed along the inner surface. The second portion of the passageway tapers from the bottom portion toward the intermediate portion and has threading formed along the inner surface. The sleeve body also includes a top end sized to snugly fit within the first pipe and a bottom end sized to snugly fit within the second pipe. The kit is further provided with a top expansion ring made of a rigid material. The top expansion ring has threading formed along its outer surface configured for engagement with the threading formed along the inner surface of the first portion of the passageway. When operatively connecting the coupling sleeve to the first pipe, the top expansion ring is threadingly engageable with the top portion of the coupling sleeve so as to urge the coupling sleeve in the region of top expansion ring to bulge outwardly and seal the coupling sleeve against the first pipe. Also included in the kit is a bottom expansion ring made of a rigid material. The bottom expansion ring has threading formed along its outer surface configured for engagement with the threading formed along the inner surface of the second portion of the passageway. When operatively connecting the coupling sleeve to the second pipe, the bottom expansion ring is threadingly engageable with the bottom portion of the coupling sleeve so as to urge the coupling sleeve in the region of bottom expansion ring to bulge outwardly and seal the coupling sleeve against the second pipe.

In a different broad aspect of the present invention, there is provided a kit for coupling a first pipe to a second pipe. The kit includes a coupling sleeve made of a resiliently deformable, elastomeric material. The coupling sleeve has a tubular sleeve body that includes a first body portion, a second body portion, an intermediate body portion disposed between the first and second body portions and an inner surface defining a passageway extending through the first, intermediate and second body portions. The passageway has a first passageway portion extending between the first body portion and the intermediate body portion and a second passageway portion extending between the intermediate body portion and the bottom body portion. The first passageway portion tapers from the top body portion toward the intermediate body portion and has threading formed along the inner surface. The second passageway portion tapers from the bottom body portion toward the intermediate body portion and has threading formed along the inner surface. The sleeve body also has a first end sized to snugly fit within the first pipe and a second end sized to snugly fit within the second pipe. The kit further includes a first expansion ring made of a rigid material. The first expansion ring has threading formed along its outer surface configured for engagement with the threading formed along the inner surface of the first passageway portion. When operatively connecting the coupling sleeve to the first pipe, the first expansion ring is threadingly engageable with the first body portion of the coupling sleeve so as to urge the coupling sleeve in the region of first expansion ring to bulge outwardly and seal the coupling sleeve against the first pipe. Also provided is a second expansion ring made of a rigid material. The second expansion ring has threading formed along its outer surface configured for engagement with the threading formed along the inner surface of the second passageway portion. When operatively connecting the coupling sleeve to the second pipe, the second expansion ring is threadingly engageable with the second body portion of the coupling sleeve so as to urge the coupling sleeve in the region of second expansion ring to bulge outwardly and seal the coupling sleeve against the second pipe.

BRIEF DESCRIPTION OF THE DRAWINGS

The embodiments of the present invention shall be more clearly understood with reference to the following detailed description of the embodiments of the invention taken in conjunction with the accompanying drawings, in which.

DETAILED DESCRIPTION OF THE EMBODIMENTS OF THE INVENTION

Figure 1:
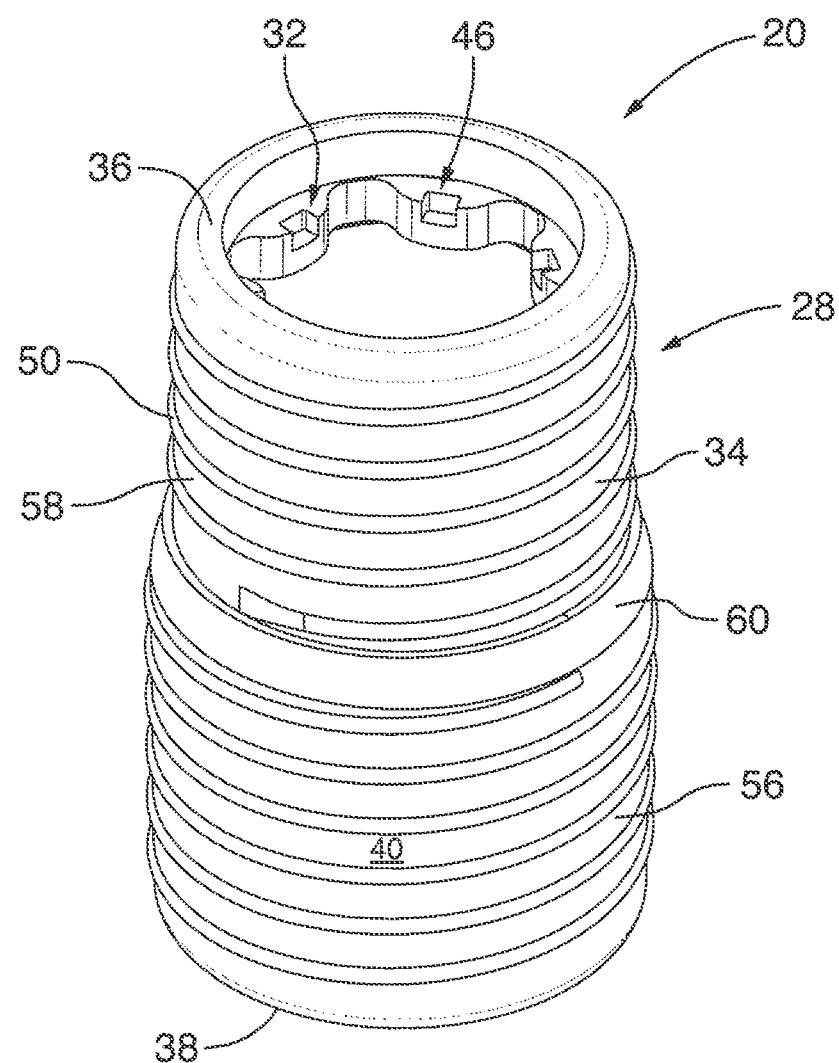
FIG. 1 is a top right perspective view of a coupling assembly for a drain pipe according to an embodiment of the present invention.

The description which follows, and the embodiments described therein are provided by way of illustration of an example, or examples of particular embodiments of principles and aspects of the present invention. These examples are provided for the purposes of explanation and not of limitation, of those principles of the invention. In the description that follows, like parts are marked throughout the specification and the drawings with the same respective reference numerals.

Figure 9:
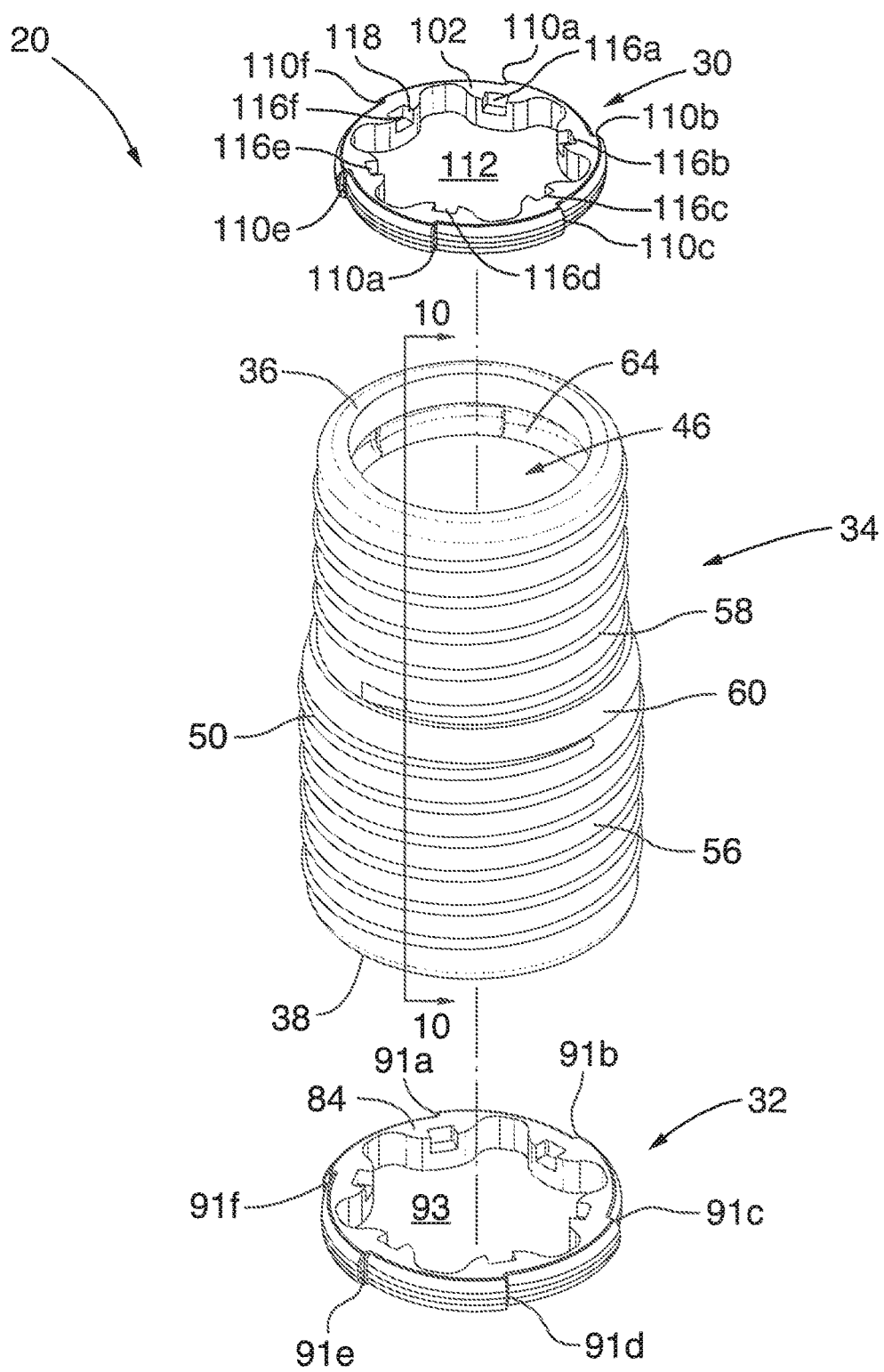
FIG. 9 is an exploded view of the coupling assembly shown in FIG. 1.
Figure 17:
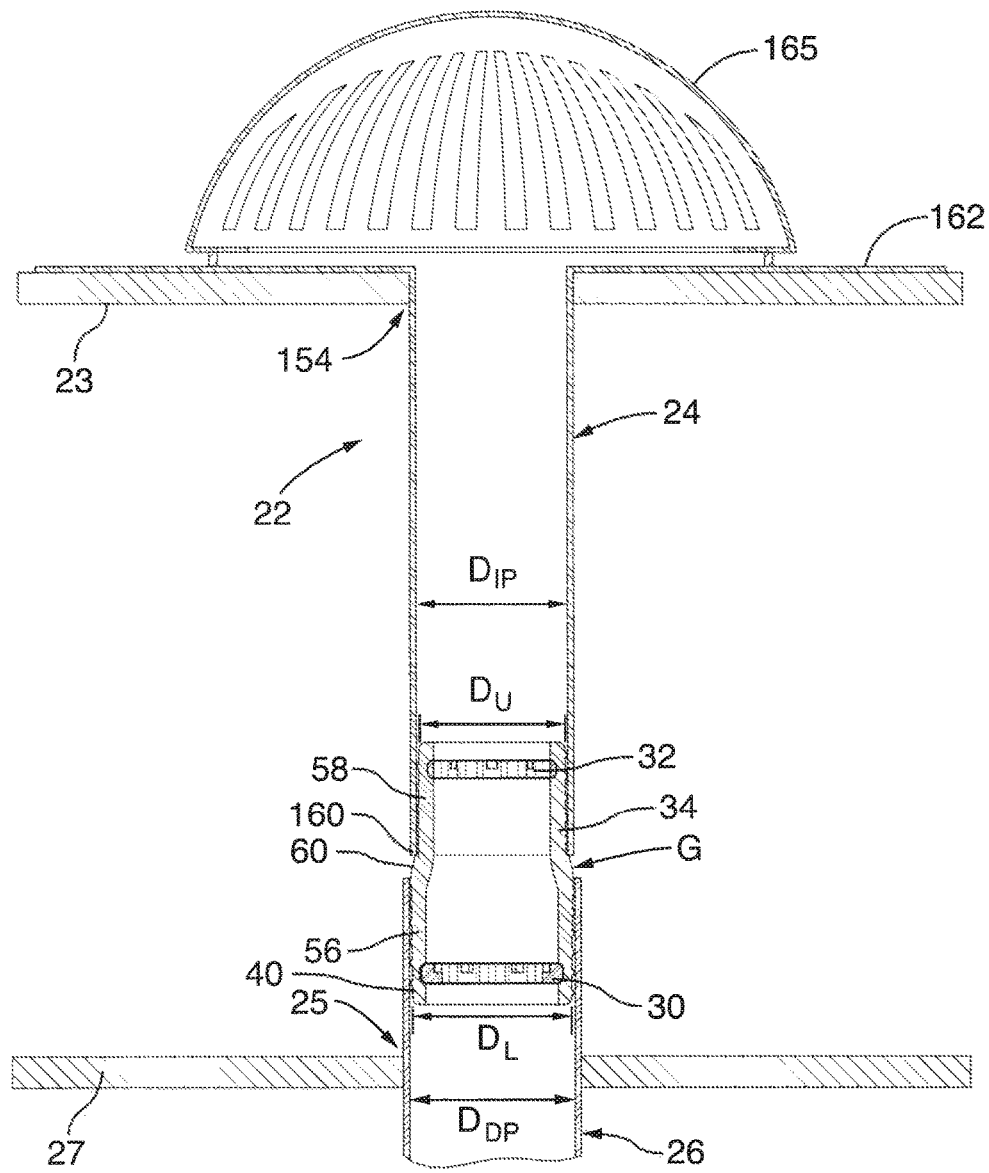
FIG. 17 is a longitudinal cross-sectional view of the drain, the coupling assembly and the drain pipe all shown operatively connected to each other.

Referring to FIGS. 1, 9, 17, there is shown a coupling assembly 20 for sealably connecting a drain 22 having an insert pipe 24 to a standing drain pipe 26. In the preferred embodiment, coupling assembly 20 is vertically oriented, the drain 22 is a roof drain mountable to a roof structure 23 and the drain pipe 26 is a roof drain pipe projecting upwardly through an opening 25 formed through a support structure 27 that is located below the roof structure 23. However, this need not be the case in every application. In alternative embodiments, the coupling assembly 20 could be used with other drains and drain pipes disposed differently. In still other embodiments, the coupling assembly could be used to connect horizontally-oriented pipes.

Given the vertical orientation of the coupling assembly 20 in the preferred embodiment, in this specification, the terms upper (or top) and lower (or bottom) will be used to describe the orientation of components of the assembly 20.

Figure 2:
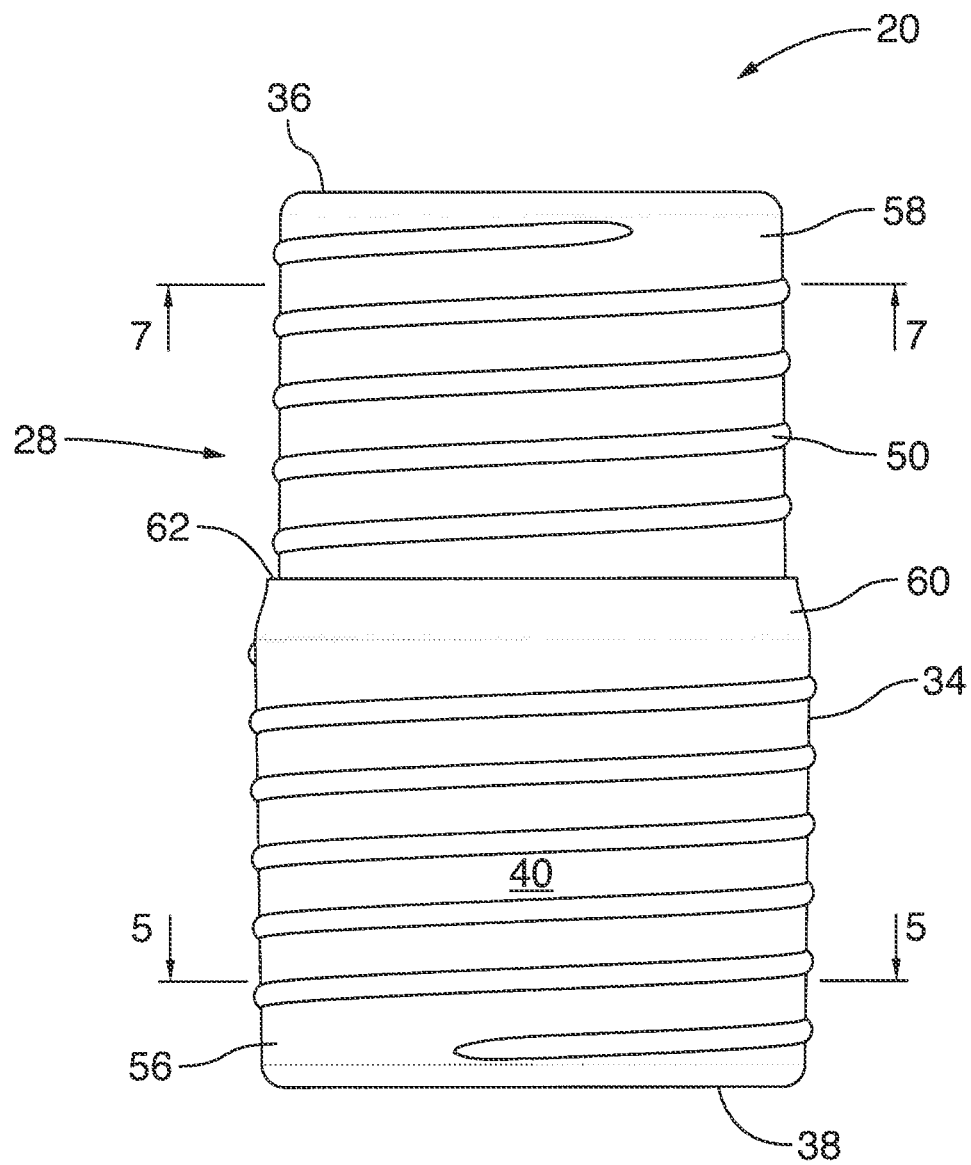
FIG. 2 is a side elevation view of the coupling assembly shown in FIG. 1.

As shown in FIG. 9, coupling assembly 20 includes a flexible coupling sleeve 28, a rigid bottom expansion ring 30 and a rigid top expansion ring 32. The coupling sleeve 28 is made of a fluid impermeable, elastomeric material (preferably, ethylene propylene diene monomer (EPDM) rubber) and has a generally tubular sleeve body 34 which extends between a top end 36 and a bottom end 38 (see FIGS. 2 and 10). In this embodiment, the length of the sleeve body 34 measures 120 mm. In other embodiments, the sleeve body could be sized differently to suit a particular application.

The sleeve body 34 has an outer surface 40 and an inner surface 42 which defines a longitudinal passageway 44 that communicates with a top opening 46 and a bottom opening 48. Disposed helically along the outer surface 40 of the sleeve body 34 between the top and bottom ends 36 and 38 and formed thereon, is raised helical threading 50. As explained below, the threading 50 serves to enhance the seal made between, on the one hand, the coupling sleeve 28 and the inner surface 52 of the insert pipe 24 (visible in FIG. 15) on the one hand, and on the other hand, the coupling sleeve 20 and the inner surface 54 of the standing drain pipe 26 (visible in FIG. 13).

As shown in FIG. 17, the sleeve body 30 further includes a lower portion 56 provided with an outer diameter $D_L$ (measured about the outer surface 40, but excluding the threading 50), an upper portion 58 provided with a relatively smaller outer diameter $D_U$ (also measured about the outer surface 40, but excluding the threading 50) and an intermediate transition portion 60 joining the lower portion 56 to the upper portion 58. The outer diameter $D_L$ is sized to be smaller than the internal diameter $D_{DP}$ of the standing drain pipe 26 (shown in FIG. 17) such that the lower portion 56 can fit snugly within the standing drain pipe 26, when the coupling sleeve 28 is inserted therein. Similarly, the outer diameter $D_U$ of the upper portion 58 is sized to be smaller than the internal diameter $D_{IP}$ of the insert pipe 24 (shown in FIG. 17) to allow the top portion 58 to fit snugly within the insert pipe 24, when the coupling sleeve 28 is connected to the drain 22. It should be noted that in this arrangement, the internal diameter $D_{IP}$ of the insert pipe 24 is relatively smaller than the internal diameter $D_{DP}$ of the standing drain pipe 26. In this embodiment, the $D_L$ measures 73 mm; the $D_U$ measures 63 mm; the $D_{DP}$ measures 75 mm; and the $D_{IP}$ measures 65 mm. These are merely examples of suitable dimensions. In other embodiments, the insert pipe and the standing drain pipe could have different internal diameters, in which case the upper and lower portions would be configured with appropriately sized smaller outer diameters to ensure a good seal is formed between the coupling assembly and each of the insert pipe and the standing drain pipe.

The intermediate portion 60 is relatively narrow and is formed roughly midway between the upper and lower portions 58 and 56. In the region of the intermediate portion 60, the sleeve body 34 tapers gently in the direction of the upper portion 58 before terminating with a very short flange 62 (clearly identified in FIGS. 2 and 10) that connects to the upper portion 58.

Figure 10:
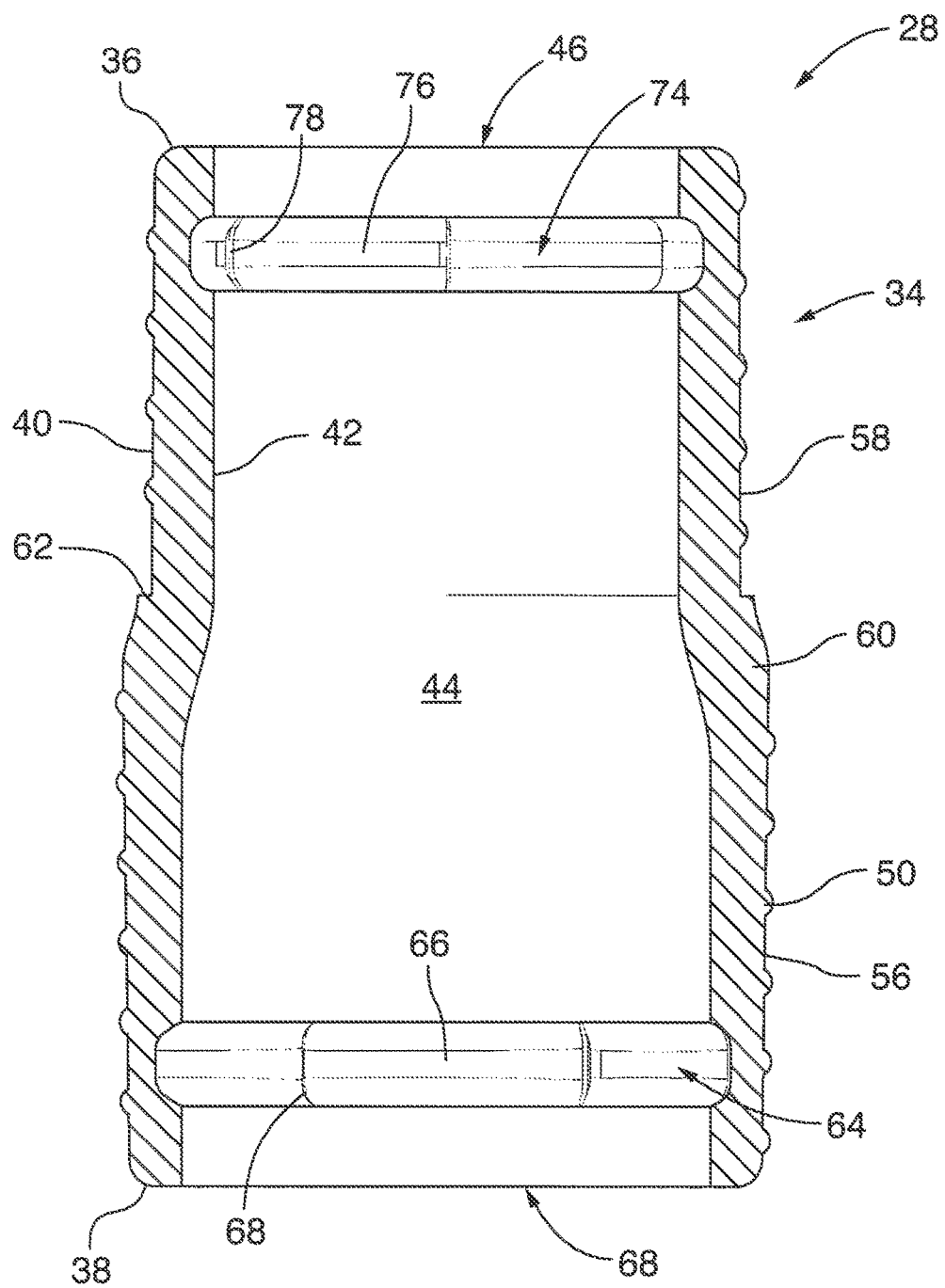
FIG. 10 is a cross-sectional view of the coupling sleeve shown in FIG. 1 taken along section '9-9'.

Referring specifically to FIG. 10, one can see that the internal diameter within the passageway 44 is relatively larger in the area of the lower portion 56 than in the area of the upper portion 58 with the internal diameter tapering in the intermediate portion 60.

Figure 6:
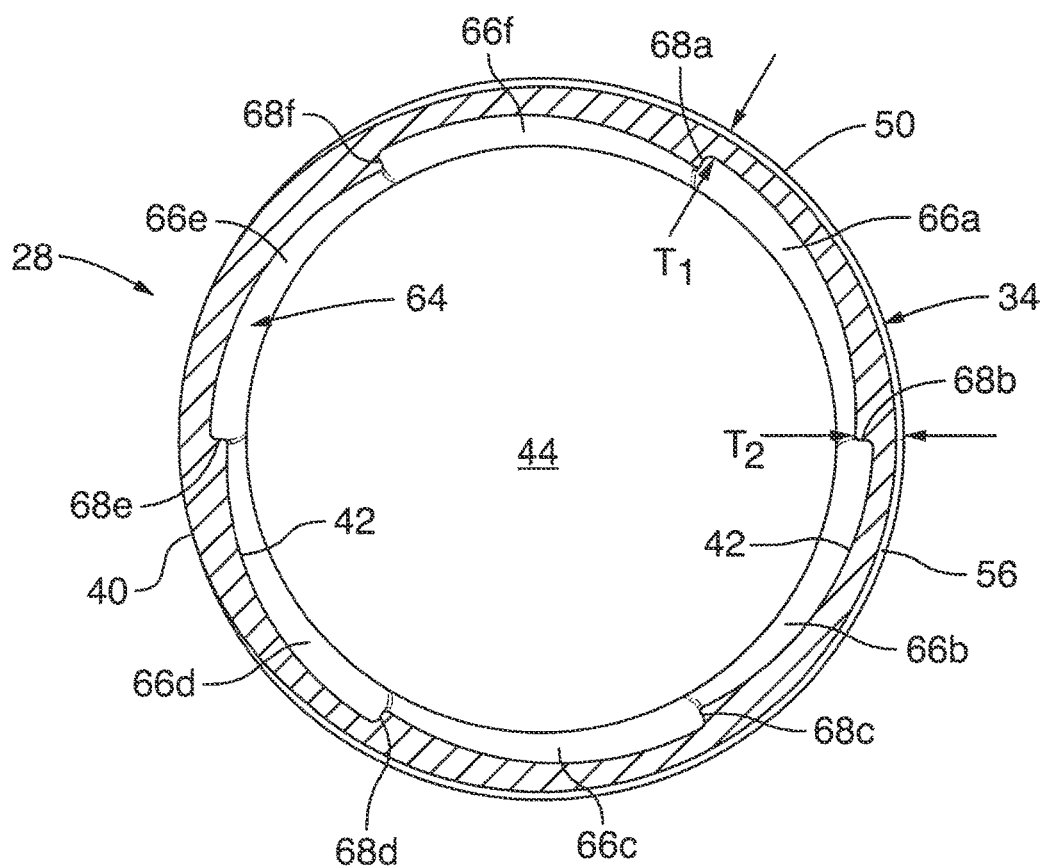
FIG. 6 is another cross-sectional view similar to that illustrated in FIG. 5 except that the bottom expansion ring has been removed to reveal details of the internal structure of the coupling sleeve in the region of the bottom groove.

At a short distance away from the bottom opening 48, a first station in the nature of a circumferential bottom groove 64 is defined in the inner surface 42 of the sleeve body 34. The bottom groove 64 is configured to accommodate therein the bottom expansion ring 30. When the coupling sleeve is viewed in longitudinal cross-section as depicted in FIG. 10, the bottom groove 64 can be seen to have a generally arcuate profile. As best shown in FIG. 6, the bottom groove 64 is formed with a series of discrete curved rebate regions generically designated with reference numeral 66, disposed in a ring-like arrangement. In this embodiment, there are six (6) discrete curved rebate regions 66a, 66b, 66c, 66d, 66e and 66f circumferentially disposed one adjacent the other.

Each rebate region 66 is bound on either side by a lower sleeve abutment shoulder, ridge or structure (generically designated by reference numeral 68) that is formed into the inner surface 42 of the sleeve body 34 and juts inwardly into the passageway 44. More specifically, curved rebate region 66a is bound by shoulder 68a and shoulder 68b; rebate region 66b is bound by shoulder 68b and shoulder 68c; rebate region 66e is bound by shoulder 68c and shoulder 68d; rebate region 66d is bound by shoulder 68d and shoulder 68e; rebate region 66e is bound by shoulder 68e and shoulder 68f; and rebate region 66f is bound by shoulder 68f and shoulder 68a. The thickness of the sleeve body 34 in a curved rebate region 66 varies between adjacent shoulders 68. For example, in curved rebate region 66a the sleeve body 34 is thinnest just beyond the shoulder 68a (see thickness $T_1$ in FIG. 6). The thickness of the sleeve body 34 increases as one follows the curve of the rebate region 66a and moves further away from shoulder 68a, with the sleeve body 34 having its greatest thickness at shoulder 68b (see thickness $T_2$ in FIG. 6). In this embodiment, $T_1$ measures 6.35 mm and $T_2$ measures 11.35 mm. Preferably, the increase in thickness is gradual. It will thus be understood that the locations of the location of the shoulders 68 correspond to areas of increased thickness in the sleeve body 34. As explained in greater detail below, the curved rebate regions 66 and the shoulders 68 are configured to cooperatively engage portions of the bottom expansion ring 30 to selectively urge the lower portion 56 of the coupling sleeve 28 in the region of bottom groove 64 to resiliently deform from a non-expanded configuration 70 (shown in FIG. 5) to an expanded or bulging configuration 72 (shown in FIG. 14).

Figure 8:
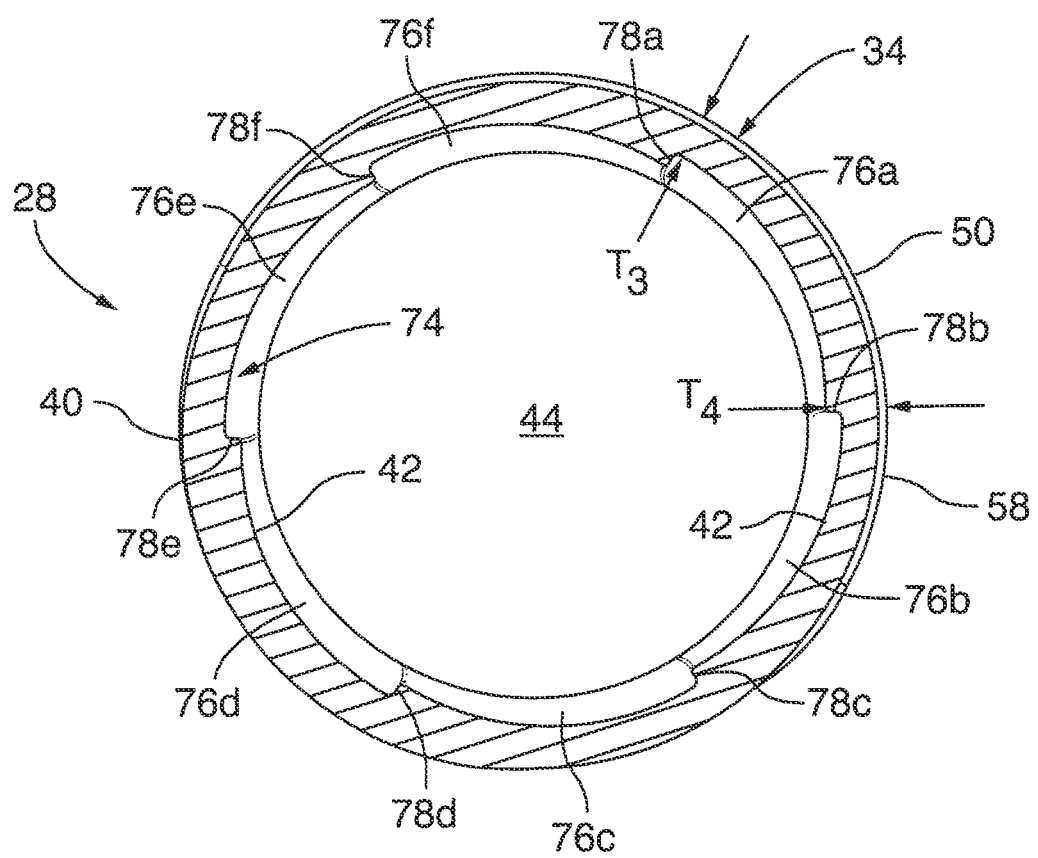
FIG. 8 is another cross-sectional view similar to that illustrated in FIG. 7 except that the top expansion ring has been removed to reveal details of the internal structure of the coupling sleeve in the region of the top groove.

A second station in the nature of a circumferential top groove 74 is defined in the inner surface 42 of the sleeve body 34, a short distance away from the top opening 46. The top groove 74 is configured to receive therein the top expansion ring 32. The top groove 74 is generally similar to bottom groove 64, except that it is sized somewhat smaller on account of the smaller diameter of the sleeve body 34 in that area. In like fashion to bottom groove 64, the top groove 74 can be seen to have a generally arcuate profile (see FIG. 10) and is formed with a series of discrete curved rebate regions generically designated with reference numeral 76, disposed in a ring-like arrangement. In the embodiment shown in FIG. 8, there are six (6) discrete curved rebate regions 76a, 76b, 76c, 76d, 76e and 76f circumferentially disposed one adjacent the other.

Each rebate region 76 is bound on either side by an upper shoulder abutment shoulder, ridge or structure, (generically designated by reference numeral 78) that is formed into the inner surface 42 of the sleeve body 34 and juts inwardly into the passageway 44. More specifically, curved rebate region 76a is bound by shoulder 78a and shoulder 78b; rebate region 76b is bound by shoulder 78b and shoulder 78c; rebate region 76c is bound by shoulder 78c and shoulder 78d; rebate region 76d is bound by shoulder 78d and shoulder 78e; rebate region 76e is bound by shoulder 78e and shoulder 78f and rebate region 76f is bound by shoulder 78f and shoulder 78a. The thickness of the sleeve body 34 in a curved rebate region 76 varies between adjacent shoulders 78. For example, in curved rebate region 76a the sleeve body 34 is thinnest just beyond the shoulder 78*a*. The thickness of the sleeve body 34 increases as one follows the curve of the rebate region 76*a* and moves further away from shoulder 78*a*, with the sleeve body 34 having its greatest thickness at shoulder 78*h*. Preferably, the increase in thickness is gradual. It will thus be understood that the location of the shoulders 78 correspond to areas of increased thickness in the sleeve body 34. As explained in greater detail below, the curved rebate regions 76 and the shoulders 78 are configured to cooperatively engage portions of the top expansion ring 32 to selectively urge the upper portion 58 of the coupling sleeve 28 in the region of top groove 74 to resiliently deform from a non-expanded configuration 80 (shown in FIG. 7) to an expanded or bulging configuration 82 (shown in FIG. 14).

Figure 3:
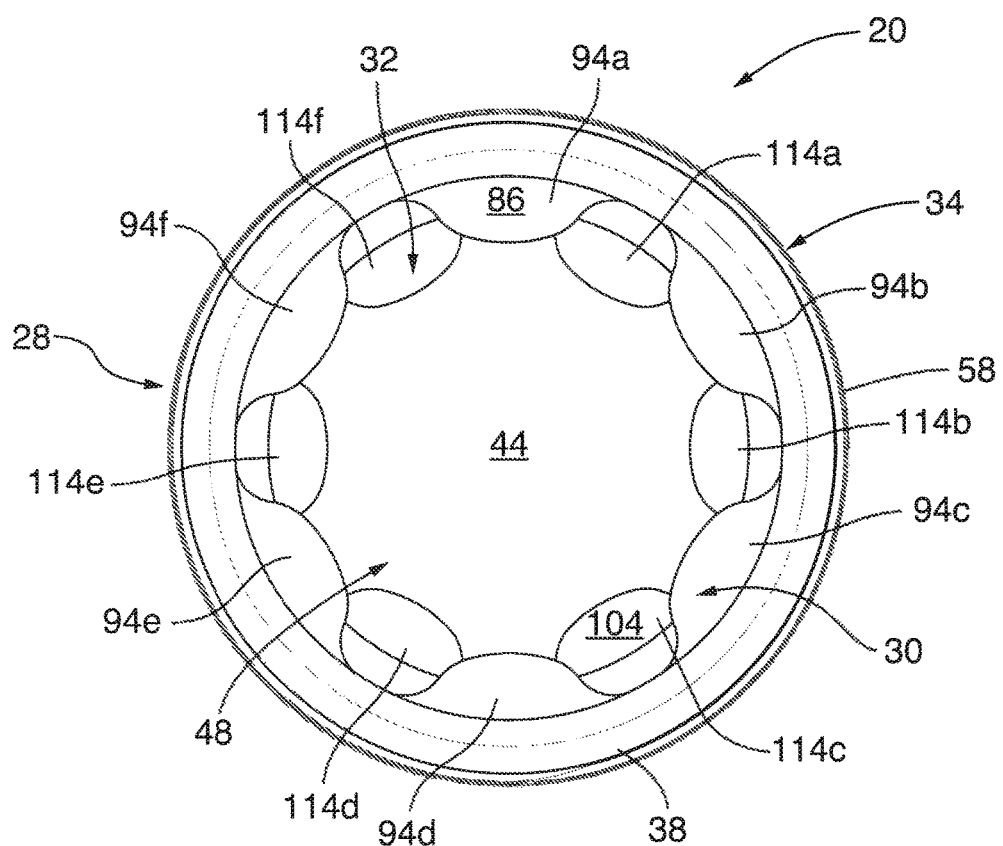
FIG. 3 is a bottom plan view showing the coupling assembly illustrated in FIG. 1 with a bottom expansion ring disposed within a coupling sleeve being visible therein.
Figure 11:
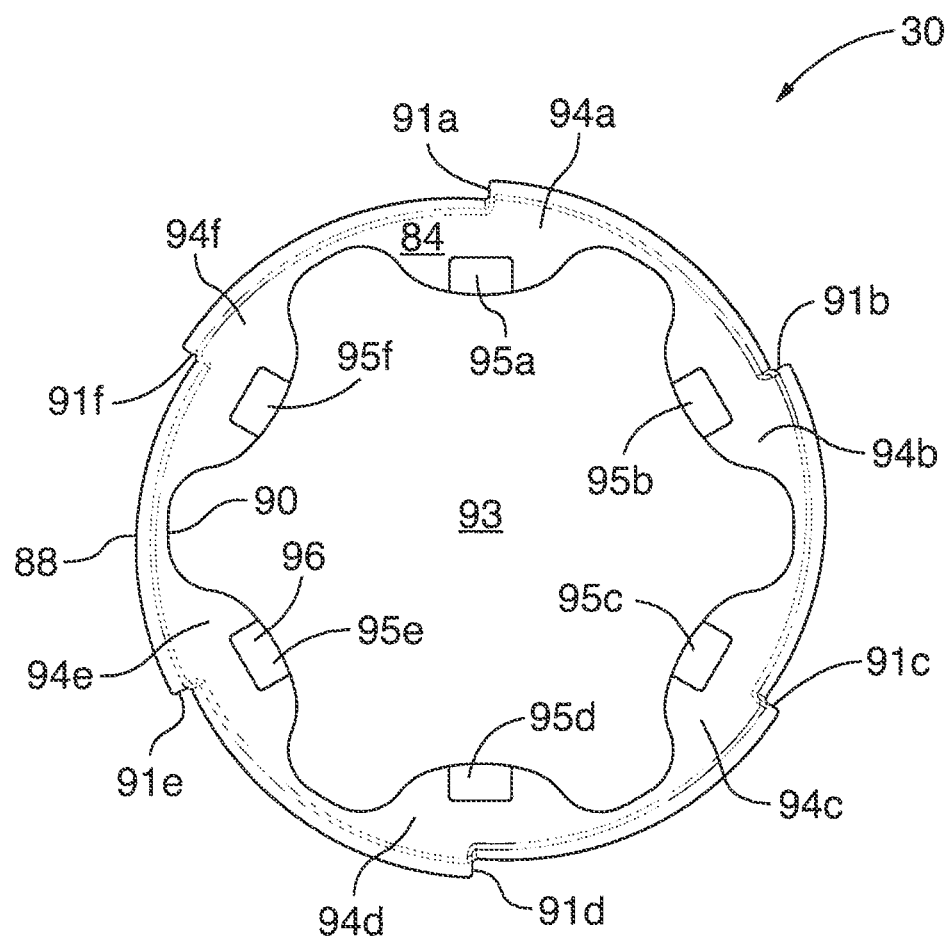
FIG. 11 is a top plan view of the bottom expansion ring illustrated in FIG. 10.
Figure 12:
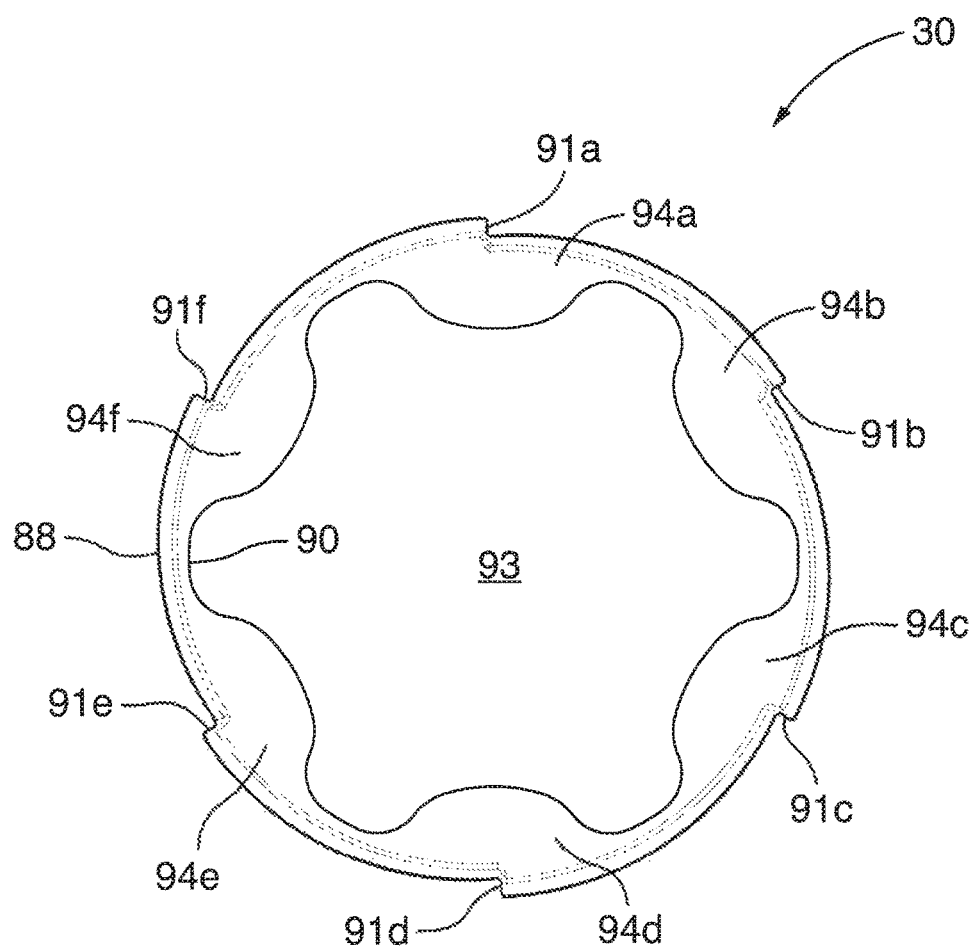
FIG. 12 is a bottom plan view of the bottom expansion ring shown in FIG. 10.

Turning now to FIGS. 9, 11 and 12, a detailed description of the bottom expansion ring 30 follows. The bottom expansion ring 30 has an upper face 84, an opposed lower face 86 (visible in FIG. 3), a curved outer surface 88 and an inner surface 90. The curvature of the outer surface 88 is configured to correspond substantially to the curvature of the bottom groove 64.

Figure 5:
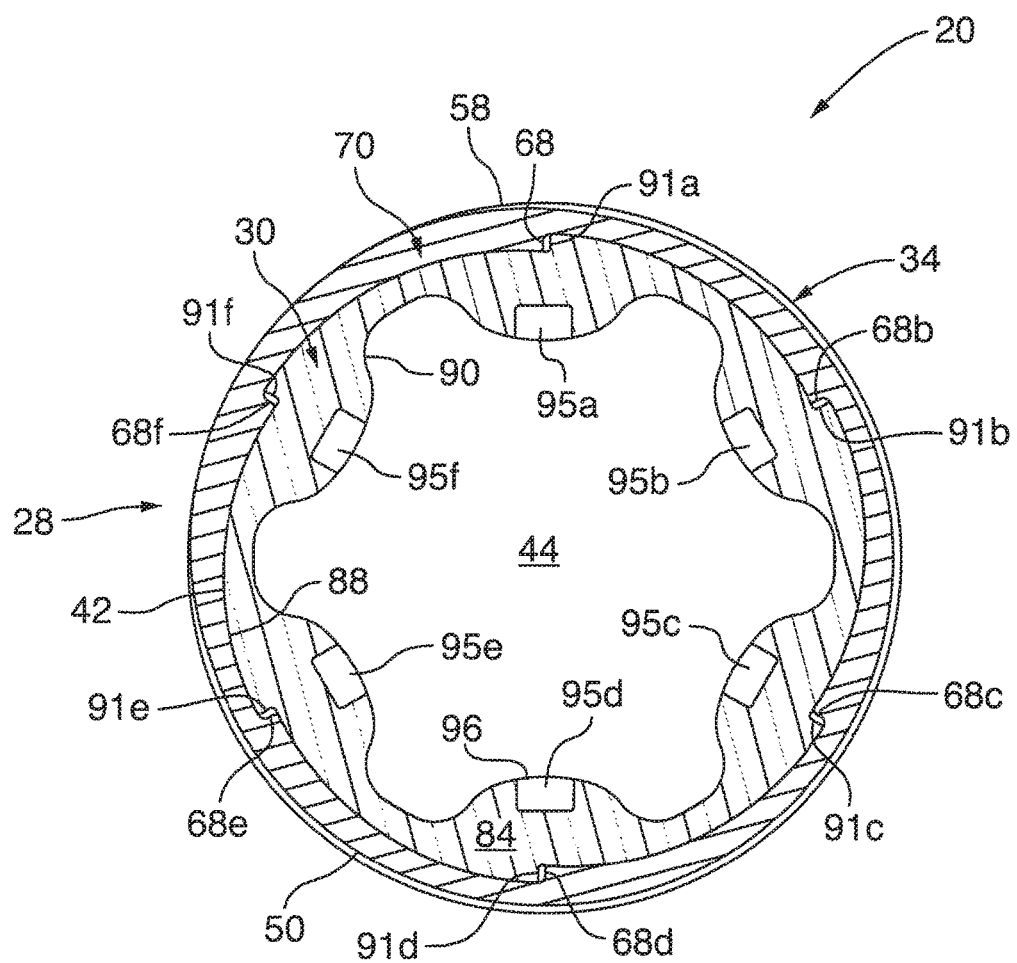
FIG. 5 is a cross-sectional view of the coupling assembly illustrated in FIG. 2 taken along section '5-5' showing the bottom expansion ring positioned within the coupling sleeve while the lower portion of the coupling sleeve remains in a non-expanded configuration.

When seen in plan view, the bottom expansion ring 30 has a generally circular profile defined by the curved outer surface 88, the circular profile being interrupted by relatively small discontinuities in the nature of ring abutment shoulders or ridges (generically designated by reference numeral 91) jutting outwardly from the outer surface 88. In this embodiment, there are six (6) such abutment shoulders 91*a*, 91*b*, 912*c*, 91*d*, 91*e* and 91*f*. As shown in FIG. 5, these ring shoulders are configured to bear against corresponding lower sleeve shoulders 68*a*, 68*b*, 68*c*, 68*d*, 68*e* and 68*f* formed in the inner surface 42 of the sleeve body 34, when the bottom expansion ring 30 is arranged within the bottom groove 64 and the lower portion 56 of the coupling sleeve 28 in the region of bottom groove 64 is in the non-expanded configuration 70. As explained in greater detail below, the ring abutment shoulders 91 cooperate with the inner surface 42 of the sleeve body 34 each other to define bottom sleeve expansion seal and locking means 92.

A central cutout 93 imparts a vague annular shape to the bottom expansion ring 30. The cutout 90 is sized large enough so as not to significantly impede the flow of any water that passes through the cutout 93 and the passageway 44 defined in the coupling sleeve 28, when the coupling assembly 20 is operatively connected to the insert pipe 24 and the standing drain pipe 26.

The star-like shape of the cutout 93 is defined by contoured portions, in this case, scalloped portions 94*a*, 94*b*, 94*c*, 94*d*, 94*e* and 94*f* (generically designated with reference numeral 94) formed in the inner surface 90 and disposed in a ring-like arrangement. Each scalloped portion 94 has a rectangular rebate generically identified with reference numeral 95 (and more specifically, 95*a*, 95*b*, 95*c*, 95*d*, 95*e* and 95*f*) which is cut deep into the upper face 84 of the bottom expansion ring 30. By having each rebate 95 extend partially into (but not completely through) the upper face 84, a landing 96 is formed at the location of each rebate. The landing is configured to receive therein a portion of a key fitting 98 and to support the key fitting 98 so as to substantially prevent or minimize the accidental loss of the key fitting 98 resulting from the key fitting 98 falling through the coupling assembly 20 and down into the standing drain pipe 26 during installation of the coupling assembly 20. As explained in greater detail below, when attached to a ratchet tool 100, the key fitting 98 can be used to rotate the bottom expansion ring 30 within the coupling sleeve 28 so as to urge the lower portion 56 of the coupling sleeve 28 in the region of bottom groove 64 to adopt an expanded or bulging configuration 72.

In other embodiments, the cutout 93 could be shaped differently.

Figure 4:
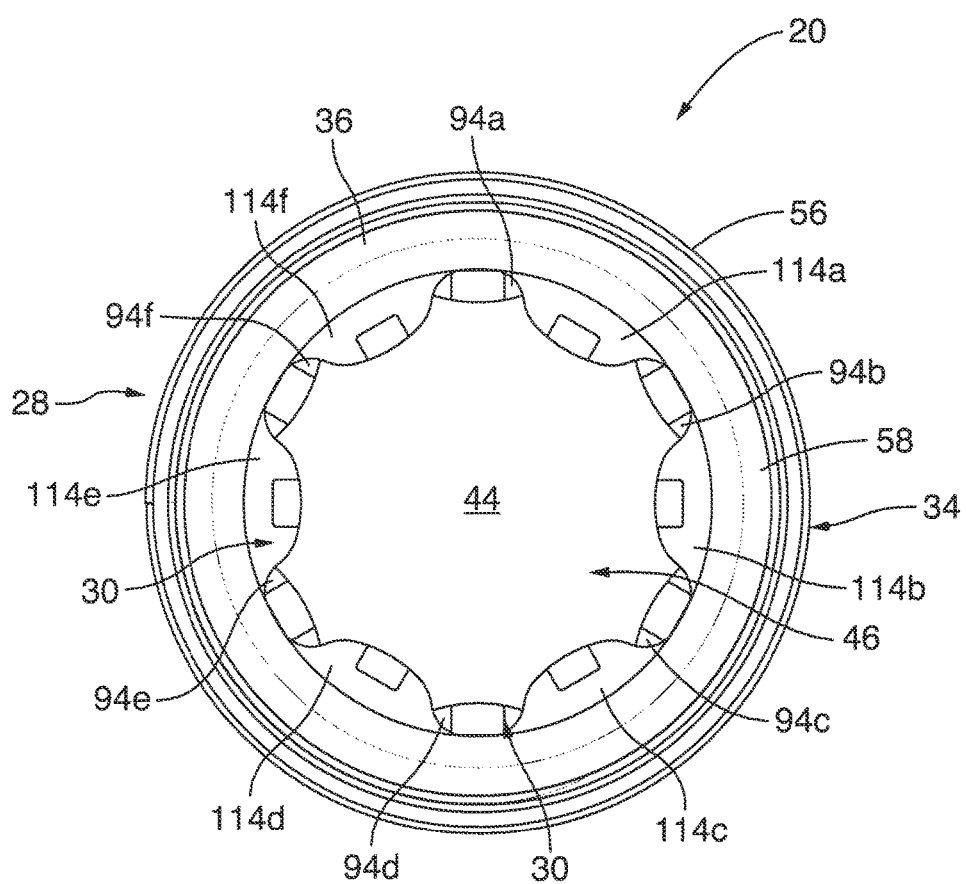
FIG. 4 is a top plan view showing the coupling assembly illustrated in FIG. 1 with an top expansion ring disposed within the coupling sleeve being visible therein.

During fabrication of the coupling assembly 20, the bottom expansion ring 30 is inserted into the bottom groove 64 where it fits snugly therein, with portions of curved outer surface 88 of the expansion ring 30 abutting the inner surface 42 of sleeve body 34. As shown in FIG. 4, the upper face 84 of the bottom expansion ring 30 is oriented towards the top opening 46 of the sleeve body 34 so that during installation of the coupling assembly 20, the key fitting 98 attached to the ratchet tool 100 can be inserted through the top opening 46 and be mated with the bottom expansion ring 30 (i.e. with portions of the key fitting 98 being received within the landings 96 formed in the scalloped portions 94).

In this embodiment, the thickness of the bottom expansion ring 30 as measured between the upper face 84 and the lower face 86 is 8.5 mm. In other embodiments, the bottom expansion ring can be fabricated with a different thickness (i.e. a larger or smaller thickness). Preferably, the thickness of the bottom expansion ring measures between 8 and 20 mm.

The bottom expansion ring 30 shown in the drawings is made of a translucent, hard, plastic material—polycarbonate. In other embodiments, the expansion ring could be fabricated from other materials selected on the basis of their strength, rigidity and durability characteristics. For example, the expansion ring could be made of steel or another suitable metal.

Figure 7:
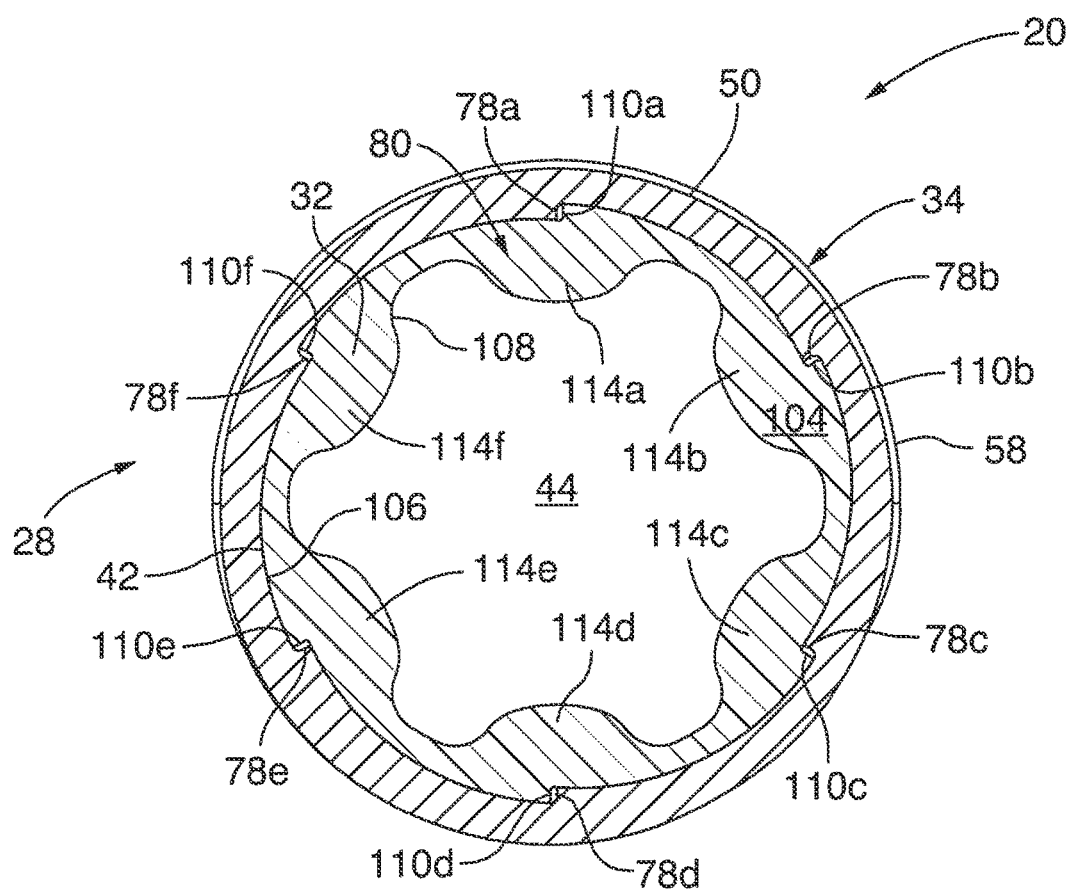
FIG. 7 is another cross-sectional view of the coupling assembly illustrated in FIG. 2 taken along section '7-7' showing the top expansion ring positioned within the coupling sleeve while the upper portion of the coupling sleeve remains in a non-expanded configuration.

With reference to FIGS. 4, 7 and 9, the top expansion ring 32 is now described. The top expansion ring is generally similar to bottom expansion ring 30, except that it is sized somewhat smaller to fit snugly into the top groove 74. In like fashion to bottom expansion ring 30, the top expansion ring 32 has an upper face 102 (visible in FIGS. 4 and 9), an opposed lower face 104 (visible in FIG. 3), a curved outer surface 106 and an inner surface 108. The curvature of the outer surface 106 is configured to correspond substantially to the curvature of the top groove 74.

When seen in plan view, the top expansion ring 32 has a generally circular profile defined by the curved outer surface 106, the circular profile being interrupted by relatively small discontinuities in the nature of ring abutment shoulders or ridges (generically designated by reference numeral 110) jutting outwardly from the outer surface 106. In this embodiment, there are six (6) such abutment shoulders 110*a*, 110*b*, 110*c*, 110*d*, 110*e* and 110*f*. As shown in FIG. 7, these ring shoulders are configured to bear against corresponding upper sleeve shoulders 78*a*, 78*b*, 78*c*, 78*d*, 78*e* and 78*f* formed in the inner surface 42 of the sleeve body 34, when the top expansion ring 32 is arranged within the top groove 74 and the upper portion 58 of the coupling sleeve 28 in the region of top groove 74 is in the non-expanded configuration 80. As explained in greater detail below, the ring abutment shoulders 110 cooperate with the inner surface 42 of the sleeve body 34 to define top sleeve expansion seal and locking means 111.

A central cutout 112 imparts a vague annular shape to the top expansion ring 32. Similar to cutout 93, the cutout 112 is sized large enough so as not to significantly impede the flow of any water that passes through the cutout 112 and the passageway 44 defined in the coupling sleeve 28, when the coupling assembly 20 is operatively connected to the insert pipe 24 and the standing drain pipe 26.

The star-like shape of the cutout 112 is defined by contoured portions, in this case, scalloped portions 114a, 114b, 114c, 114d, 114e and 114f (generically designated with reference numeral 114) formed in the inner surface 108 and disposed in a ring-like arrangement. Each scalloped portion 114 has a rectangular rebate generically identified with reference numeral 116 (and more specifically, 116a, 116b, 116c, 116d, 116e and 116f) which is cut deep into the upper face 102 of the top expansion ring 32. Each 116 defines a landing 118 that is configured to receive therein a portion of a key fitting 119 and to support the key fitting 119 so as to substantially prevent or minimize the accidental loss of the key fitting 119 resulting from the key fitting 119 falling through the coupling assembly 20 and down into the standing drain pipe 26 during installation of the coupling assembly 20. As explained in greater detail below, when attached to the ratchet tool 100, the key fitting 119 can be used to rotate the top expansion ring 32 within the coupling sleeve 28 so as to urge the upper portion 58 of the coupling sleeve 28 in the region of top groove 74 to adopt an expanded or bulging configuration 82.

In other embodiments, the cutout 112 could be shaped differently.

During fabrication of the coupling assembly 20, the top expansion ring 32 is inserted into the top groove 74 where it fits snugly therein, with portions of curved outer surface 106 of the expansion ring 32 abutting the inner surface 42 of sleeve body 34. As shown in FIG. 4, the upper face 102 of the top expansion ring 32 is oriented towards the top opening 46 of the sleeve body 34 so that during installation of the coupling assembly 20, the key fitting 119 attached to the ratchet tool 100 can be inserted through the top opening 46 and be mated with the top expansion ring 32 (i.e. with portions of the key fitting 119 being received within the landings 118 formed in the scalloped portions 114).

In this embodiment, the thickness of the top expansion ring 32 as measured between the upper face 102 and the lower face 104 is 8.5 mm. In other embodiments, the top expansion ring can be fabricated with a different thickness (i.e. a larger or smaller thickness). Preferably, the thickness of the bottom expansion ring measures between 8 and 20 mm.

Preferably, the top expansion ring 32 is made of the same material to that used for fabricating the bottom expansion ring 30.

Referring to FIGS. 14, 15, 16 and 17, the ratchet tool 100, the key fitting 98 and the key fitting 119 are now described in greater detail. The ratchet tool 100 includes a standard socket wrench or ratchet 120 and an extension rod 122 operatively connected thereto. The ratchet 120 has a handle portion 124 at one end, a work end portion 126 at an opposite end and an elongated stem portion 128 extending between the handle portion 124 and the work end portion 126. The work end portion 126 supports a conventional ratchet mechanism (not shown) which terminates with a generally square male connector (also not shown) for mating with a generally square female socket 130 provided on the extension rod 122. The square male connector extends generally perpendicular to the stem portion 128.

The extension rod 122 is configured in the typical manner. At its proximal end, it has the generally square female socket 130 and at its distal end it terminates with a generally square male connector 134 (visible in FIGS. 14 and 16) for insertion into a generally square female socket 136 defined in the key fitting 98 or generally square female socket 138 defined in the key fitting 119. Preferably, the length of the extension rod 122 measures 305 mm, which is long enough to permit the extension rod 122 to extend all the way through the insert pipe 24 with sufficient length left over to reach the lower portion 56 of the coupling sleeve 28 where the bottom expansion ring 30 is situated. In other embodiments, a shorter or longer extension rod could be employed, as required.

Figure 14:
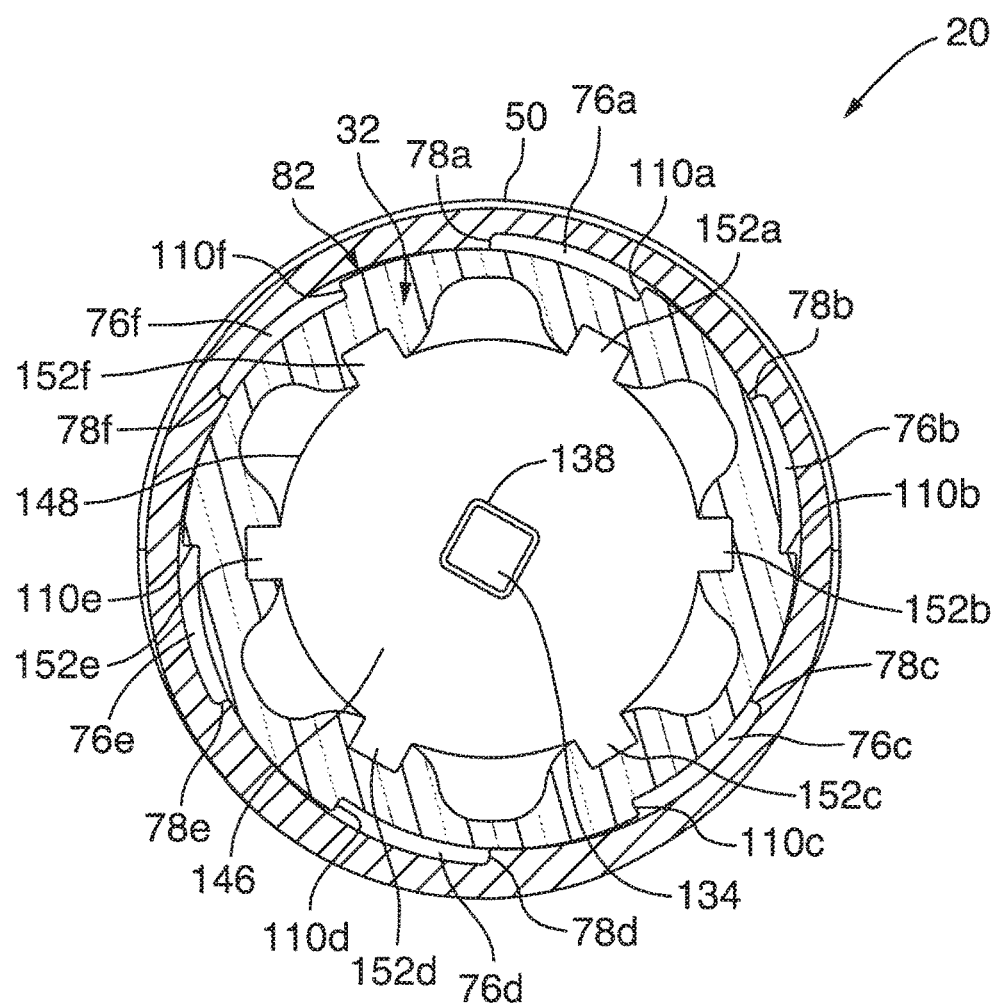
FIG. 14 is a cross-sectional view similar to that illustrated in FIG. 5 showing the key fitting of the ratchet tool being used to rotate the top expansion ring within the coupling sleeve so as to urge the top portion of the coupling sleeve to adopt an expanded or bulging configuration.

With specific reference to FIG. 14, the key fitting 98 has a disc-shaped body 140 with a central aperture formed therein which corresponds to the generally square female socket 136. In this embodiment, the diameter of the disc-shaped body 140 measures 50 mm. Projecting outwardly from the outer margin 142 of the disc-shaped body 140 at evenly spaced locations, are stub arms generically identified with reference numeral 144. In this embodiment, the disc-shaped body 140 possesses six (6) stub arms 144a, 144b, 144c, 144d, 144e and 144f. The generally rectangular stub arms 144a, 144b, 144c, 144d, 144e and 144f constitute male portions to be received in landings 96 formed by the rebates 95a, 95b, 95c, 95d, 95e and 95f.

Figure 16:
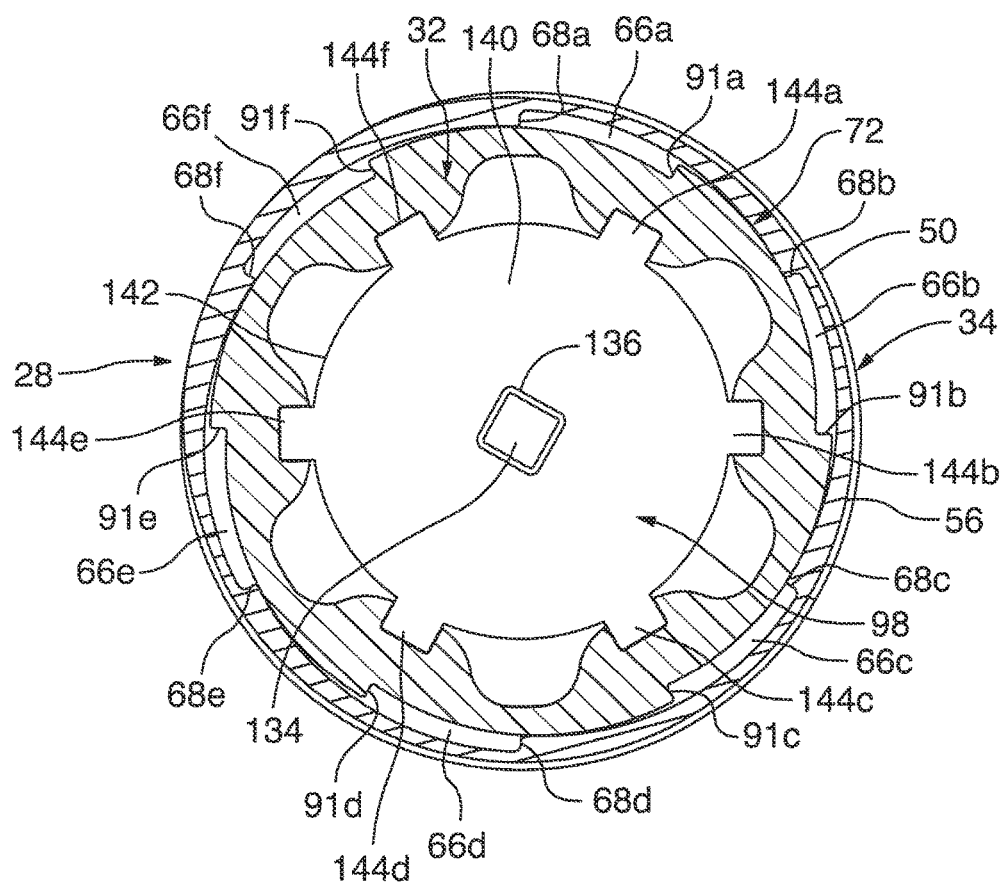
FIG. 16 is another cross-sectional view similar to that illustrated in FIG. 7 showing the key fitting of the ratchet tool being used to rotate the bottom expansion ring within the coupling sleeve so as to urge the bottom portion of the coupling sleeve to adopt an expanded or bulging configuration.

The key fitting 119 is generally similar to the key fitting 98 except that it sized slightly smaller than the key fitting 98 in order to mate with the relatively smaller top expansion ring 32. As shown in FIG. 16, the key fitting 119 has a disc-shaped body 146 which resembles the disc-shaped body 140. In this regard, the body 146 also possesses a central aperture, but in this case, the aperture corresponds to the generally square female socket 138. In this embodiment, the diameter of the disc-shaped body 146 measures 45 mm. Projecting outwardly from the outer margin 148 of the disc-shaped body 146 at evenly spaced locations, are stub arms generically identified with reference numeral 152. In this embodiment, the disc-shaped body 152 possesses six (6) stub arms 152a, 152b, 152c, 152d, 152e and 152f. The generally rectangular stub arms 152a, 152b, 152c, 152d, 152e and 152f constitute male portions to be received in landings 118 formed by the rebates 116a, 116b, 116c, 116d, 116e and 116f.

Having described all the various components of the coupling assembly 20, what follows next is a description of an exemplary installation of the coupling assembly 20 to the insert pipe 24 of drain 22 and the standing drain pipe 26 with reference to FIGS. 13 to 17. Prior to installation as a preliminary step, care is taken to ensure that the bottom expansion ring 30 is positioned within the bottom groove 64 such that the lower portion 56 of the sleeve body 34 in the region of the bottom groove 64 is in a non-expanded configuration 70. Similarly, the installer verifies that the top expansion ring 32 is positioned within the top groove 74 such that the upper portion 58 of the sleeve body 34 in the region of the top groove 74 is in a non-expanded configuration 80.

Next, a waterproofing adhesive or caulking material is spread along the outer surface 40 of the sleeve body 34 between the threading 50 located on the top portion 58. Preferably, the adhesive is a cyanoacrylate adhesive. The bottom end 160 of the insert pipe 24 is fitted onto the coupling sleeve 28 until the upper portion 58 of the sleeve body 34 is wholly received in the insert pipe 24 and abuts the flange 62 of the coupling sleeve 28. Also, in this arrangement, the outer surface 40 of the sleeve body 34 abuts the inner surface 52 of the insert pipe 24 with the threading 50 snugly compressed up against the inner surface 52. Use of the adhesive assists in maintaining the upper portion 58 of the sleeve body 34 fixedly secured to the insert pipe with a tight seal being formed therebetween. While use of an adhesive has been shown to be advantageous, it need not be used in every application. In certain applications, the coupling assembly could be installed to the insert pipe without the application of adhesive.

Figure 15:
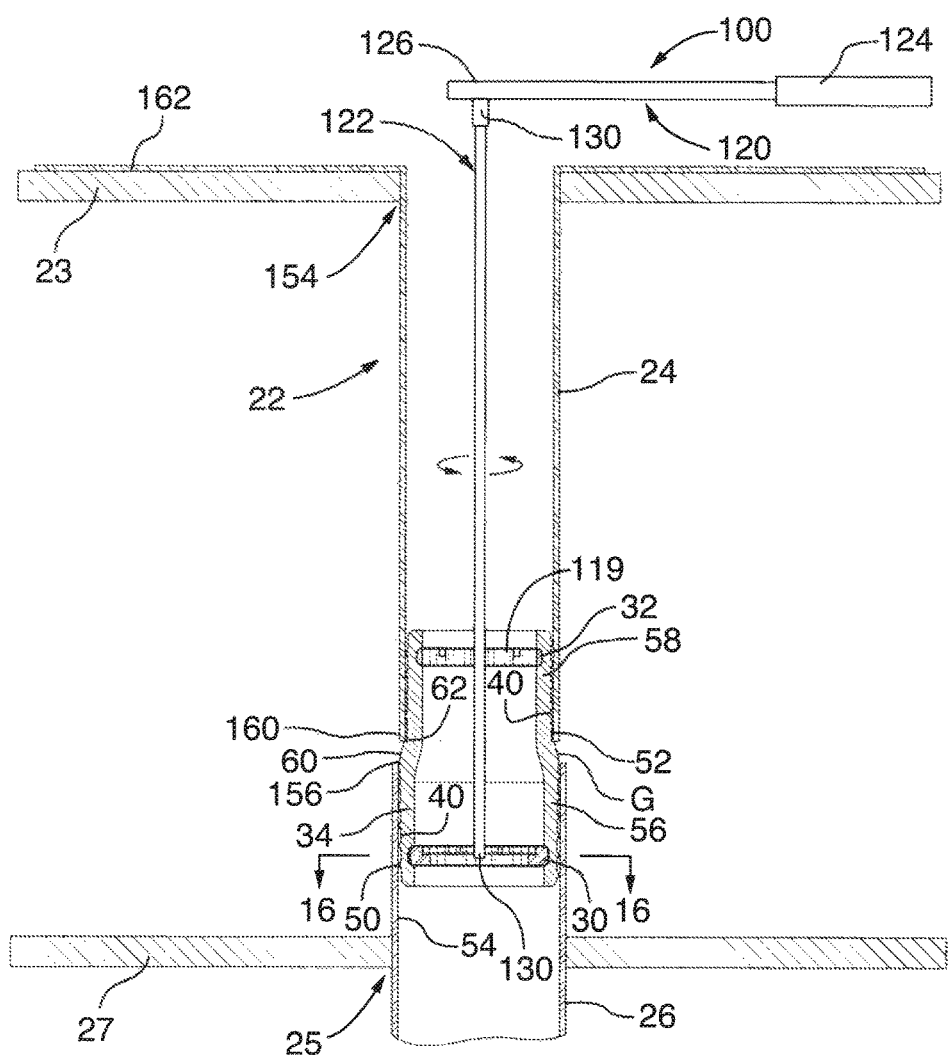
FIG. 15 is another longitudinal cross-sectional view showing the coupling assembly illustrated in FIG. 1 being operatively connected to the standing drain pipe using the ratchet tool.

As shown in FIG. 15, the male connector 134 of the extension rod 122 is mated with the female socket 138 of the key fitting 119 and the ratchet tool 100 outfitted with the key fitting 119 carried on the extension rod 122, is inserted through the top opening 46 of the sleeve body 34. The stub arms 152a, 152b, 152c, 152d, 152e and 152f radiating from the disc-shaped boy 146 are received within the landings 118 such that the key fitting 119 and the top expansion ring 32 are now fixed to each other for rotation. Alternatively, the key fitting 119 could be manually inserted into the sleeve body and positioned into the landings formed in the top expansion ring and the ratchet tool could then fitted through the top opening to mate the extension arm with the key fitting.

Thereafter, the installer grasps the handle portion 124 of the ratchet tool 100 and uses the tool to urge the top expansion ring 32 to rotate within the top groove 74. As the top expansion ring 32 rotates, each ring abutment shoulders 110 is urged to travel within a curved rebate 76 and is displaced from the top sleeve shoulder 78 with which it was associated when the upper portion 58 of the sleeve body 34 in the region of the top groove 74 was in the non-expanded configuration 80. The rigid outer surface 106 of the top expansion ring 32 (more specifically, the ring abutment shoulders 91a, 91b, 91c, 91d, 91e and 91f) pushes against the inner surface 42 of the sleeve body 34 in an area where the sleeve body 34 has increased thickness, thereby causing the upper portion 58 of the sleeve body 34 in the region of the top groove 74 to resiliently deform and adopt the expanded or bulging configuration 82 shown in FIG. 16. Expansion of the sleeve body 34 in the region of the top groove 74 tends to "lock" or tightly hold the coupling sleeve 28 in place against the inner surface 52 of the insert pipe 24, and create a tight seal between the coupling sleeve 28 and the insert pipe 24. Care should be taken not to rotate the top expansion ring too much, otherwise the ring abutment shoulders 110 may be moved to abut against top sleeve shoulders 78 and the sleeve body 34 in the region of the top groove 74 may revert back to the non-expanded configuration 80.

The key fitting 119 is then detached from the top expansion ring 32 and the ratchet tool 100 with the key fitting 119 mounted thereto is pulled out from the sleeve body 172.

With the insert pipe securely fixed to the coupling assembly 20, the coupling assembly 20 can now be connected to the standing drain pipe. Optionally, waterproofing adhesive may be spread along the outer surface 40 of the sleeve body 34 between the threading 50 located on the lower portion 56. The coupling assembly 20 with the insert pipe 24 attached thereto is then introduced into the space defined between the roof structure 25 and the support structure 27 through opening 154. The sleeve body 34 is inserted into the top end 156 of the standing drain pipe 26 until the lower portion 56 is wholly received in the standing drain pipe 26, and the top circumferential flange 162 of the insert pipe 24 rests the roof structure 25. In this arrangement, the outer surface 40 of the sleeve body 34 abuts the inner surface 54 of the standing drain pipe 26 with the threading 50 snugly compressed up against the inner surface 54. Where adhesive is used, the lower portion 56 of the sleeve body 34 can be permanently secured to the standing drain pipe 26 with a tight seal being formed therebetween. While use of the adhesive has been shown to be advantageous, it is optional and need not be used in every application. In certain applications, the coupling assembly could be installed to the standing drain pipe without the application of adhesive.

With the coupling assembly 20 thus arranged, only a small gap G remains between the standing drain pipe 26 and the insert pipe 24, the gap G being bridged by the narrow intermediate transition portion 60 of the sleeve body 34.

Figure 13:
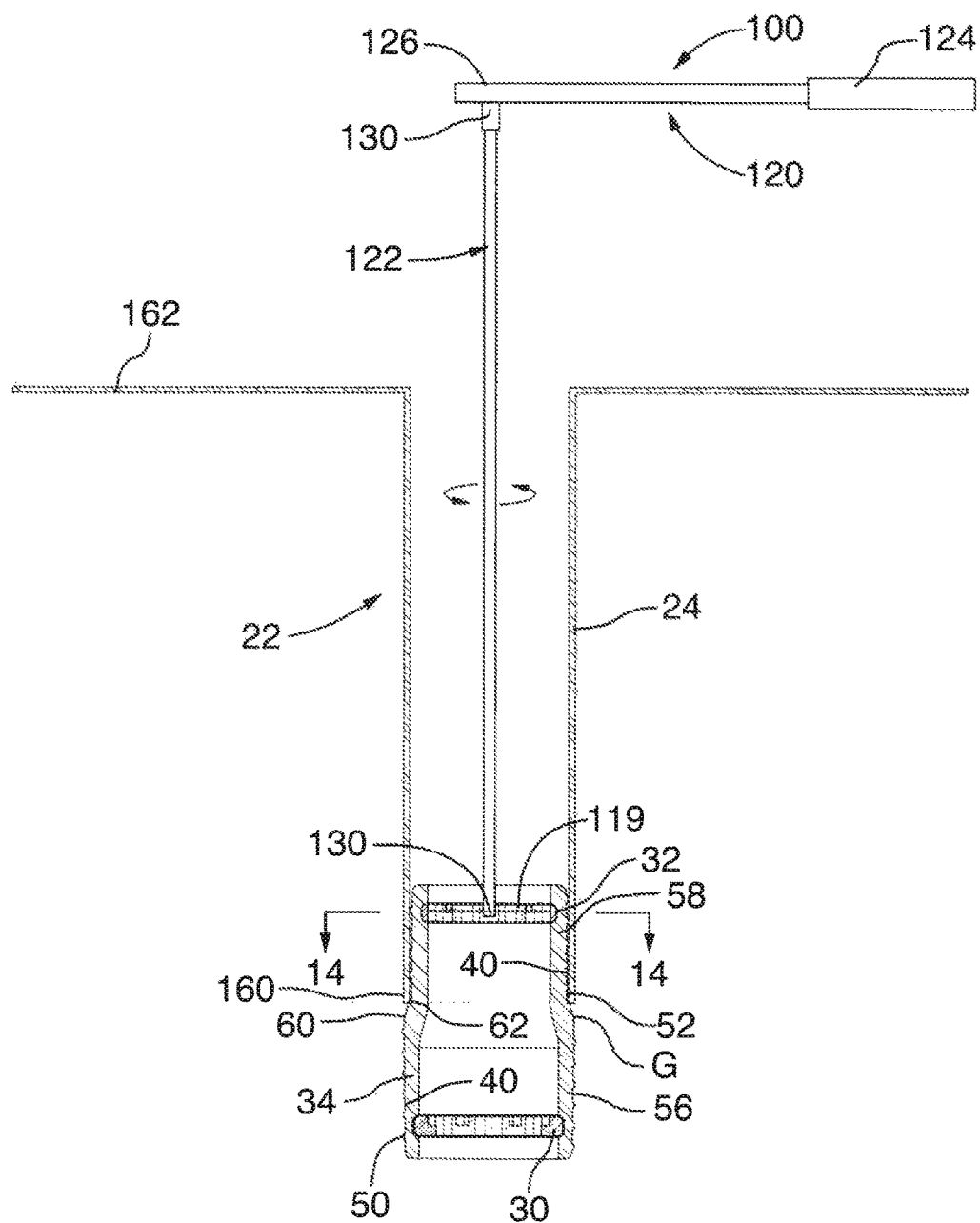
FIG. 13 is a longitudinal cross-sectional view showing the coupling assembly illustrated in FIG. 1 being operatively connected to the insert pipe of the drain using a ratchet tool.

As shown in FIG. 13, the male connector 134 of the extension rod 122 is mated with the female socket 136 of the key fitting 98 and the ratchet tool 100 outfitted with the key fitting 98 carried on the extension rod 122, is inserted through the top opening 46 of the sleeve body 34. The stub arms 114a, 114b, 114c. 114d, 114e and 114f radiating from the disc-shaped boy 140 are received within the landings 96 such that the key fitting 98 and the bottom expansion ring 32 are now fixed to each other for rotation. Alternatively, the key fitting 98 could be manually inserted into the sleeve body and positioned into the landings formed in the bottom expansion ring and the ratchet tool could then fitted through the top opening to mate the extension arm with the key fitting.

Thereafter, the installer grasps the handle portion 124 of the ratchet tool 100 and uses the tool to urge the bottom expansion ring 30 to rotate in a clockwise direction within the bottom groove 64. As the bottom expansion ring 30 rotates, each ring abutment shoulders 91 is urged to travel within a curved rebate 66 and is displaced from the lower sleeve shoulder 68 with which it was associated when the lower portion 56 of the sleeve body 34 in the region of the bottom groove 64 was in the non-expanded configuration 70. The rigid outer surface 88 of the bottom expansion ring 30 pushes against the inner surface 42 of the sleeve body 34 in an area where the sleeve body 34 has increased thickness, thereby causing the lower portion 56 of the sleeve body 34 in the region of the bottom groove 64 to resiliently deform and adopt the expanded or bulging configuration 72 shown in FIG. 14. Expansion of the sleeve body 34 in the region of the bottom groove 64 tends to "lock" or tightly hold the coupling sleeve 28 in place against the inner surface 54 of the standing drain pipe and create a tight seal between the coupling sleeve 28 and the standing drain pipe 26. Care should be taken not to rotate the bottom expansion ring too much, otherwise the ring abutment shoulders 91 may be moved to abut against lower sleeve shoulders 68 and the sleeve body 34 in the region of the bottom groove 64 may revert back to the non-expanded configuration 70.

The key fitting 98 is then detached from the bottom expansion ring 30 and the ratchet tool 100 with the key fitting 98 mounted thereto is pulled out from the sleeve body 172.

With the coupling assembly 20 now secured to both the insert pipe 24 and the standing drain pipe 24, the installation is completed by affixing a hemispherical vented drain portion to the top flange 162 of the insert pipe 24 (see FIG. 17).

It will thus be appreciated that installation of the coupling assembly 20 within the insert pipe 24 and the standing drain pipe 26 can be performed relatively quickly and easily and without the use of expensive customized tools. In this regard, the use of a standard ratchet tool 100 is most advantageous in that it is a popular tool which can be found in the toolboxes of most workmen. Moreover, it can be sourced from any local hardware store, if necessary, thereby obviating the inconvenience, delay and cost which are typically incurred when a custom tool can only be purchased from a small number of specialized plumbing or roofing supply outlets. Moreover, the key fittings 98 and 119 are relatively cheap to manufacture, compact and portable, such that an installer could easily carry spares of such key fittings in his/her toolbox to various job sites.

Moreover, this installation method offers the additional advantage of allowing the installer to tighten or "lock" the coupling assembly in place to each of the standing pipe drain and the insert pipe, separately. This tends to be desirable because it allows the installer to connect the insert pipe to the standing drain pipe with the coupling sleeve already attached to the insert pipe, which tends to facilitate installation. Another advantage is that the once the coupling sleeve is fully attached (or locked) to the insert pipe roof it tends not to dislodge from the insert pipe once you place it into the drain pipe. This tends to substantially reduce the risk of the coupling assembly falling into the standing drain pipe.

If required for maintenance purposes or other purposes, the coupling assembly can be disconnected from the standing drain pipe or the insert pipe by simply rotating the bottom expansion ring or the top expansion ring so that the region of the sleeve body in the area of the bottom groove or top groove is no longer deformed and adopts the non-expanded configuration.

In the preferred embodiment shown in FIGS. 5 and 7, the coupling sleeve 28 is formed with six (6) bottom sleeve shoulders 68 disposed about the bottom groove 64 and six (6) top sleeve abutment shoulders 78 located around the top groove 74. Correspondingly, the bottom expansion ring 30 is formed with six (6) ring abutment shoulders 91 and the top expansion ring 30 is configured with six (6) ring abutment shoulders 110. This need not be the case in every application. In other embodiments, the top sleeve expansion seal and locking means could use a different number of sleeve abutment shoulders and ring abutment shoulders than that employed for the bottom sleeve expansion seal and locking means. Alternatively, the top and bottom sleeve expansion seal and locking means could use the same number of sleeve abutment shoulders and ring abutment shoulders, which number can be greater or lesser than six (6), but preferably at least two (2). Where two (2) sleeve abutment shoulders and two (2) ring abutment shoulders are employed, it is recommended to have the sleeve abutment shoulders positioned at 180 degrees from each other, and two (2) ring abutment shoulders positioned at 180 degrees from each other.

FIGS. 18 to 25 show an alternative embodiment of a coupling assembly that uses an arrangement of four (4) sleeve abutment shoulders configured in each of the top and bottom portions of the sleeve body, and four (4) ring abutment shoulders formed in each of the top and bottom expansion rings. In the figures, the alternative coupling assembly is designated generally with reference numeral 170. The coupling assembly 170 resembles very closely the coupling assembly 20 in that it too includes a flexible coupling sleeve 172, a rigid bottom expansion ring 174 and a rigid top expansion ring 176. The coupling sleeve 172 is similar to the coupling sleeve 28 in all material respects, except for the configuration of the top and bottom grooves and more specifically, the number of abutment shoulders that each groove possesses. The coupling sleeve 172 is made of an elastomeric material and has a generally tubular sleeve body 180 which extends between a top end 182 and a bottom end 184 (see FIGS. 18 and 19).

The sleeve body 180 has an outer surface 186 and an inner surface 188 which defines a longitudinal passageway 190 that communicates with a top opening 192 and a bottom opening 194. Disposed helically along the outer surface 186 of the sleeve body 180 between the top and bottom ends 182 and 184 and formed thereon, is raised helical threading 196.

Figure 18:
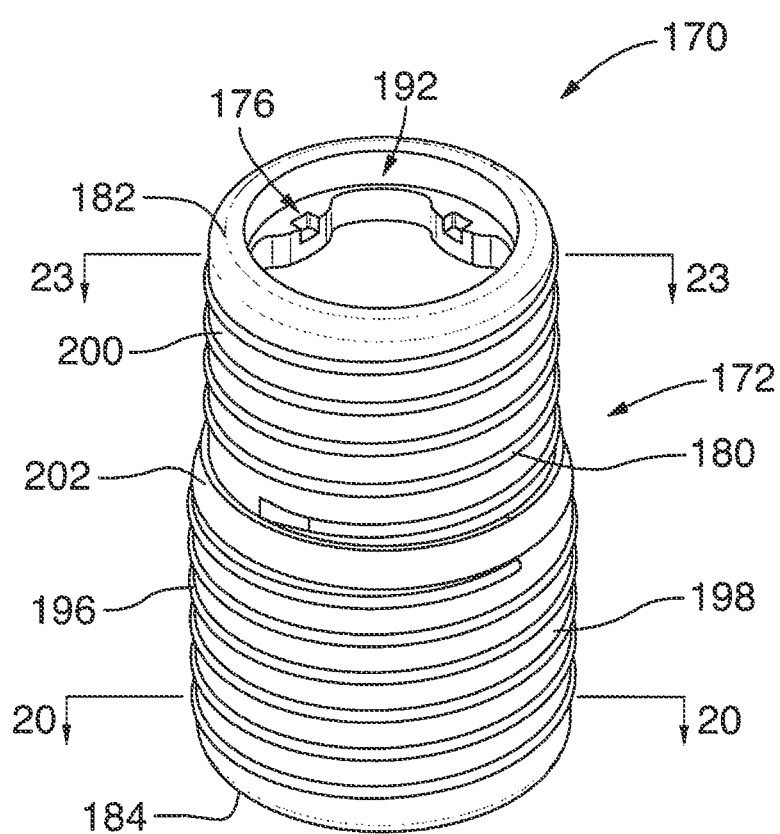
FIG. 18 is a front right perspective view of another coupling assembly according to an alternative embodiment to that shown in FIG. 1.
Figure 19:
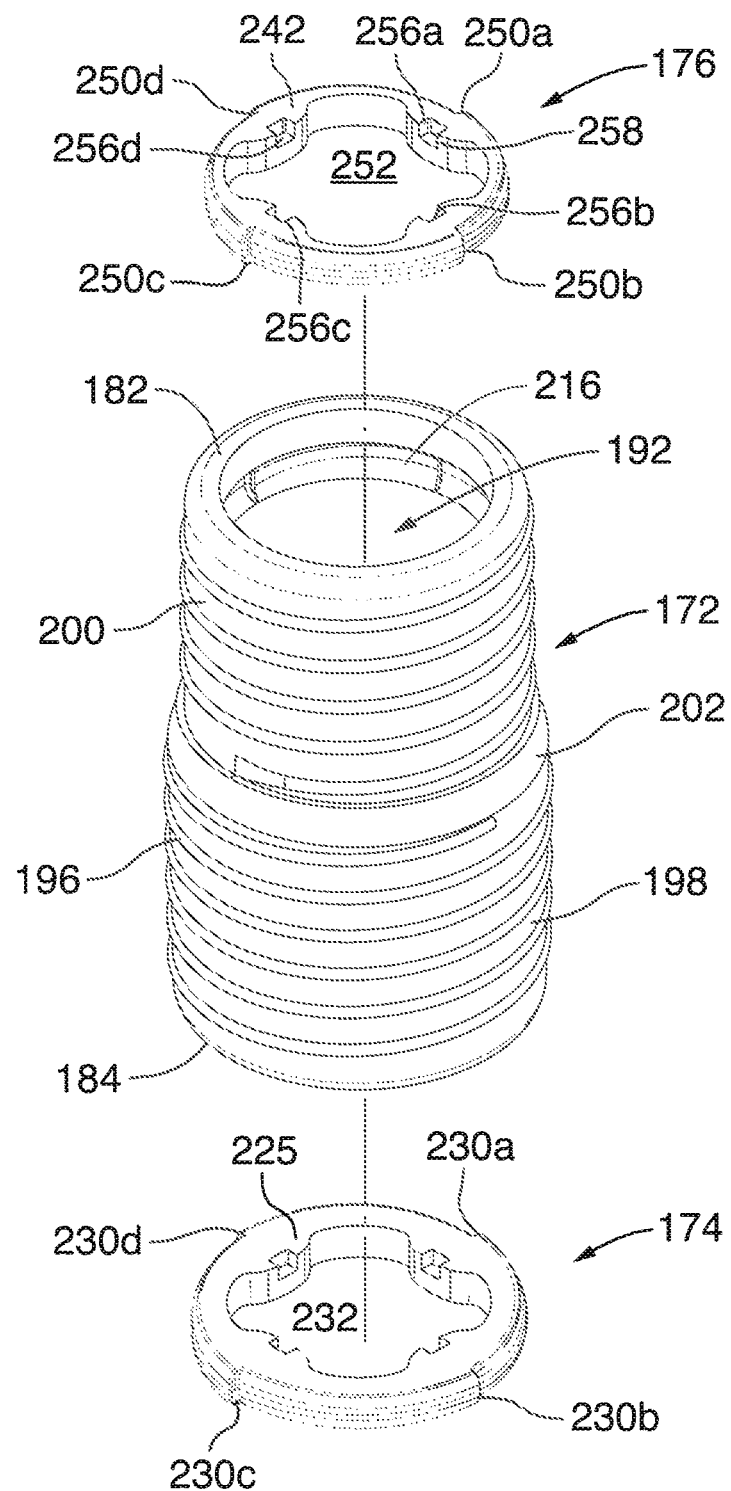
FIG. 19 is an exploded view of the coupling assembly shown in FIG. 18.

As shown in FIGS. 18 and 19, the sleeve body 180 further includes a lower portion 198, an upper portion 200 and an intermediate transition portion 202 joining the lower portion 198 to the upper portion 200. The intermediate portion 202 is relatively narrow and is formed roughly midway between the upper and lower portions 198 and 200. In the region of the intermediate portion 202, the sleeve body 180 tapers gently in the direction of the upper portion 200 before terminating with a very short flange 204 that connects to the upper portion 200.

Figure 21:
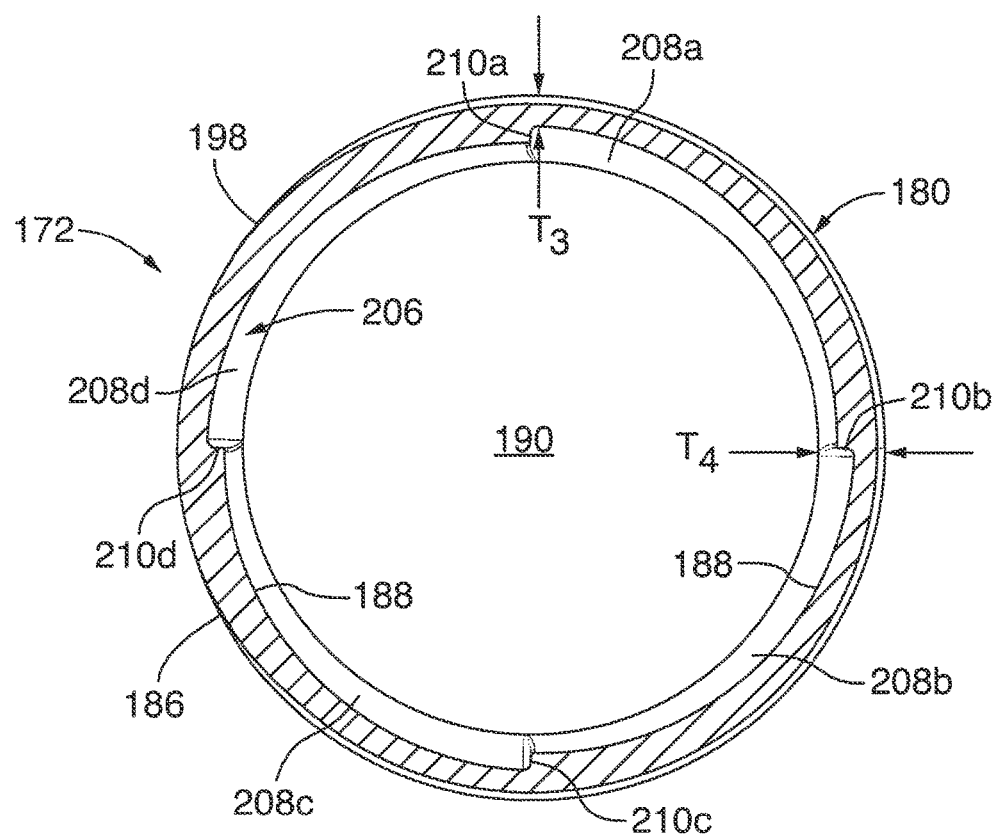
FIG. 21 is another cross-sectional view similar to that illustrated in FIG. 20 except that the bottom expansion ring has been removed to reveal details of the internal structure of the coupling sleeve in the region of the bottom groove.

As found in the sleeve body 34, there is a first station in the nature of a circumferential bottom groove 206 defined in the inner surface 188 of the sleeve body 180. The bottom groove 206 is configured to accommodate therein the bottom expansion ring 174. In like fashion to the bottom groove 64, the bottom groove 206 has a generally arcuate profile. As best shown in FIG. 21, the bottom groove 206 is formed with a series of discrete curved rebate regions generically designated with reference numeral 208, disposed in a ring-like arrangement. In this embodiment, there are four (4) discrete curved rebate regions 208a, 208b, 208c and 208d circumferentially disposed one adjacent the other. Each rebate region 208 is bound on either side by a lower sleeve abutment shoulder or ridge, (generically designated by reference numeral 210) that is formed into the inner surface 188 of the sleeve body 180 and juts inwardly into the passageway 190.

More specifically, curved rebate region 208a is bound by shoulder 210a and shoulder 210b; rebate region 208b is bound by shoulder 210b and shoulder 210c; rebate region 208c is bound by shoulder 210c and shoulder 210d; rebate region 208d is bound by shoulder 210d and shoulder 210a. In this embodiment, because there are fewer curved rebate regions than in the embodiment shown in FIG. 6, each rebate region 208 occupies a larger part of the circumference of bottom groove 206.

As was the case for the curved rebate regions 66, the thickness of the sleeve body 180 in a curved rebate region 208 varies between adjacent shoulders 210. For example, in curved rebate region 208a the sleeve body 180 is thinnest just beyond the shoulder 210a (see thickness $T_5$ in FIG. 24). The thickness of the sleeve body 180 increases as one follows the curve of the rebate region 208a and moves further away from shoulder 210a, with the sleeve body 180 having its greatest thickness at shoulder 210b (see thickness $T_6$ in FIG. 24). Preferably, the increase in thickness is gradual. It will thus be understood that the locations of the shoulders 210 correspond to areas of increased thickness in the sleeve body 180. The curved rebate regions 208 and the shoulders 210 are configured to cooperatively engage portions of the bottom expansion ring 174 to selectively urge the lower portion 198 of the coupling sleeve 170 in the region of bottom groove 206 to resiliently deform from a non-expanded configuration 212 (shown in FIG. 20) to an expanded or bulging configuration 214 (shown in FIG. 22).

Figure 24:
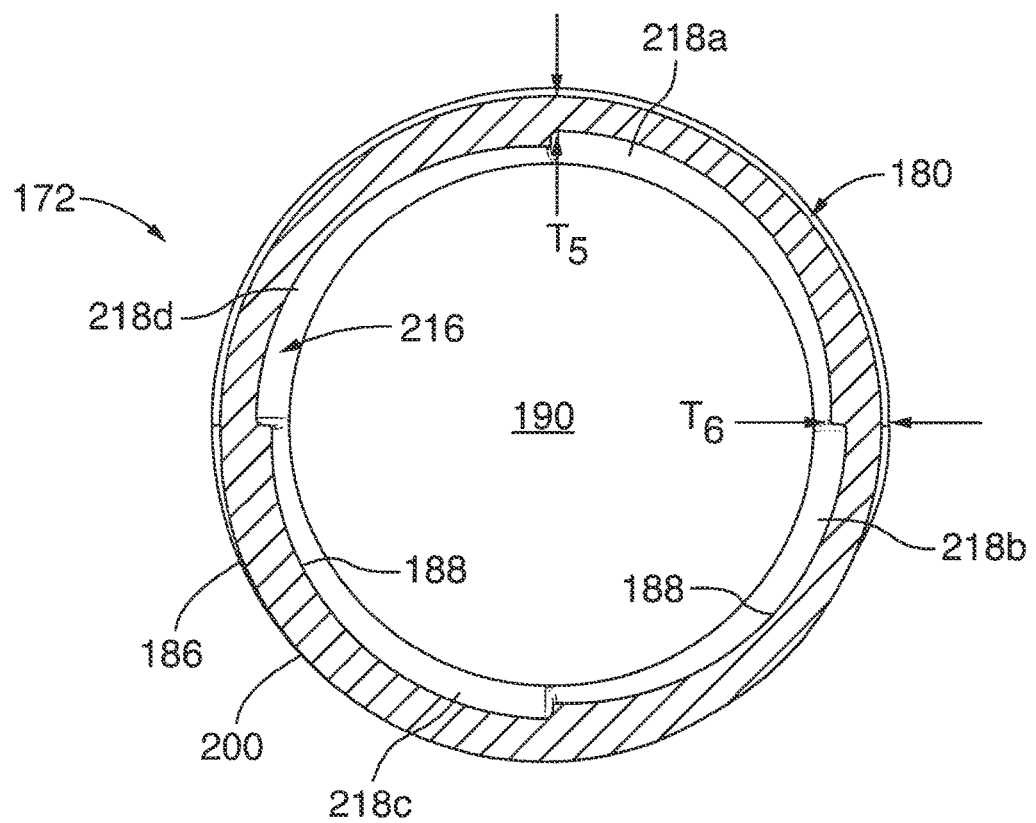
FIG. 24 is another cross-sectional view similar to that illustrated in FIG. 23 except that the top expansion ring has been removed to reveal details of the internal structure of the coupling sleeve in the region of the top groove.

A second station in the nature of a circumferential top groove 216 is defined in the inner surface 188 of the sleeve body 180, a short distance away from the top opening 192. The top groove 216 is configured to receive therein the top expansion ring 176. The top groove 216 is generally similar to bottom groove 206, except that it is sized somewhat smaller on account of the smaller diameter of the sleeve body 180 in that area. In like fashion to bottom groove 206, the top groove 216 has a generally arcuate profile and is formed with a series of discrete curved rebate regions generically designated with reference numeral 218, disposed in a ring-like arrangement. However, as shown in FIG. 24, in this embodiment, there are four (4) discrete curved rebate regions 218a, 218b, 218c and 218d (generically, identified with reference numeral 218) circumferentially disposed one adjacent the other.

Figure 23:
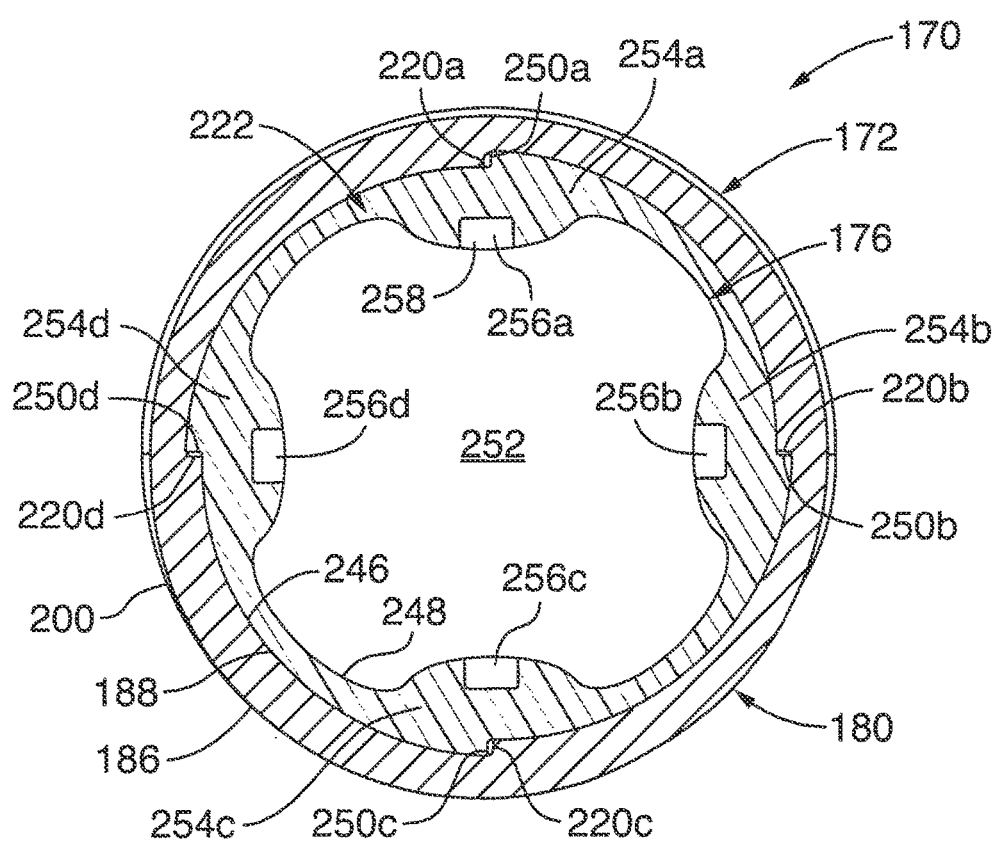
FIG. 23 is a cross-sectional view of the coupling assembly illustrated in FIG. 18 taken along section '23-23' showing the top expansion ring positioned within the coupling sleeve while the upper portion of the coupling sleeve remains in a non-expanded configuration, the lower portion of the coupling sleeve being omitted for purposes of clarity.
Figure 25:
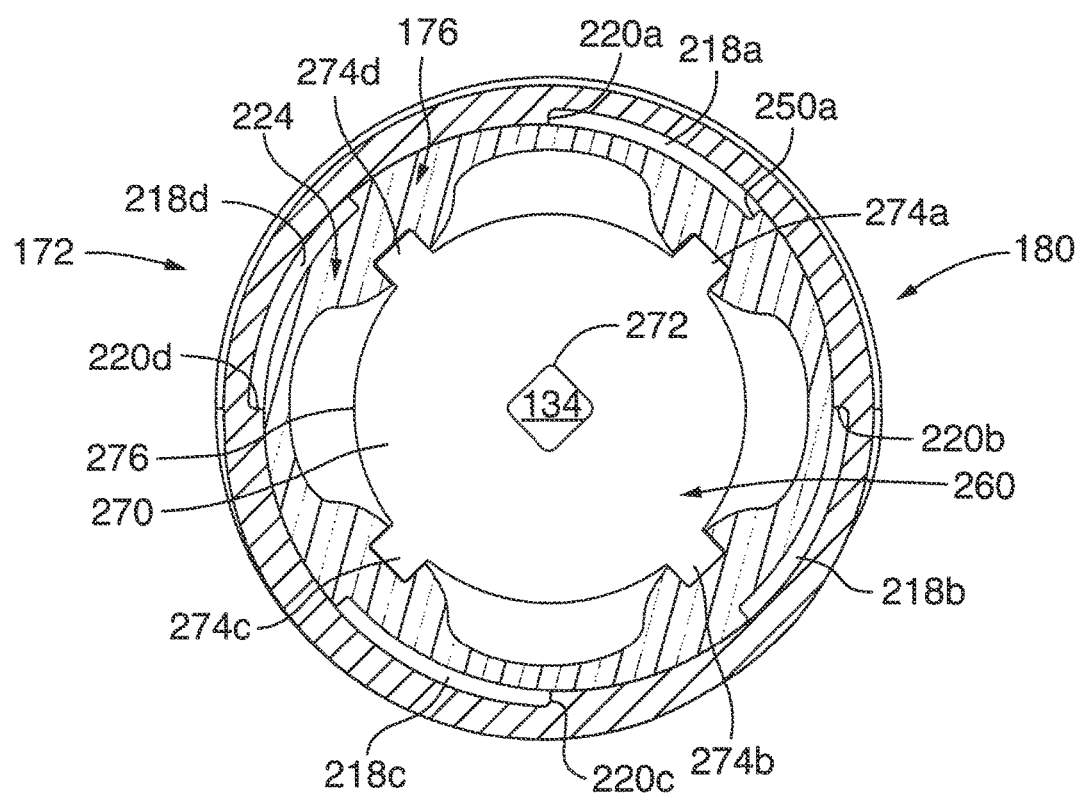
FIG. 25 is a cross-sectional view similar to that illustrated in FIG. 23 showing an alternative key fitting of the ratchet tool being used to rotate the top expansion ring within the coupling sleeve so as to urge the upper portion of the coupling sleeve to adopt an expanded or bulging configuration.
Figure 26:
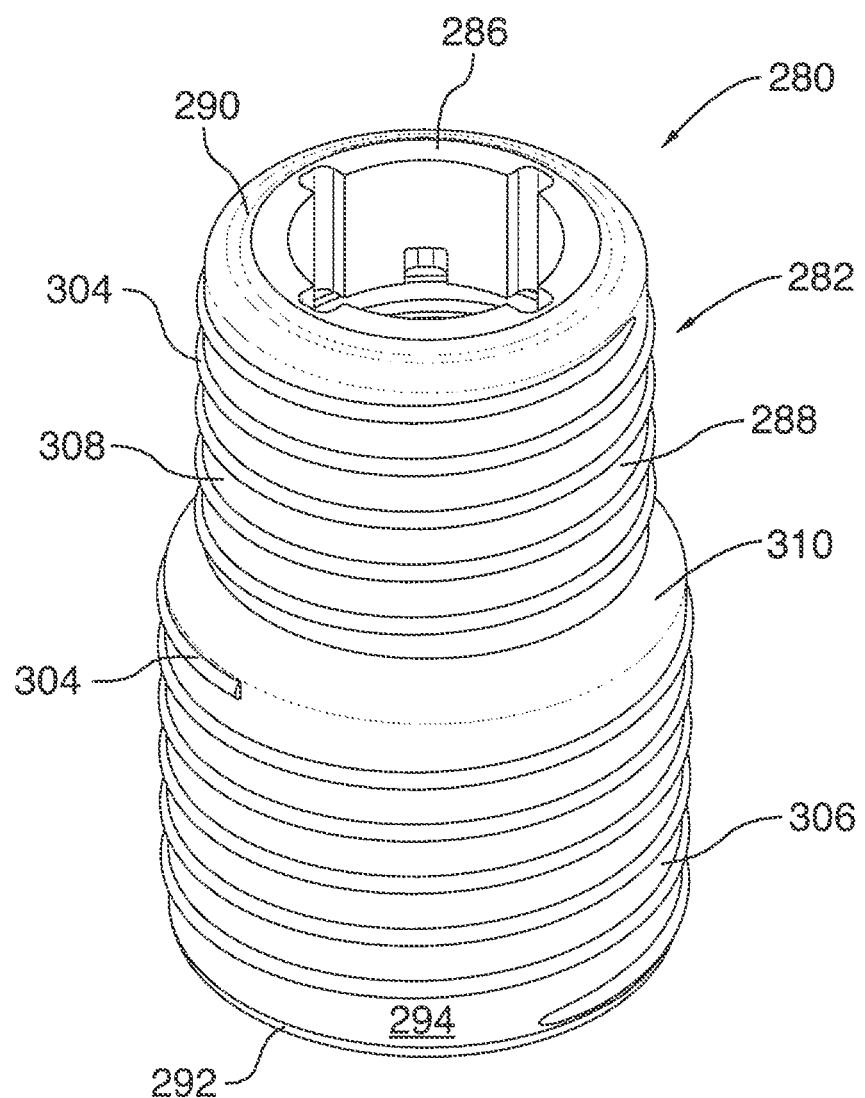
FIG. 26 is a top right perspective view of a coupling assembly for a drain pipe according to a further embodiment of the present invention.
Figure 27:
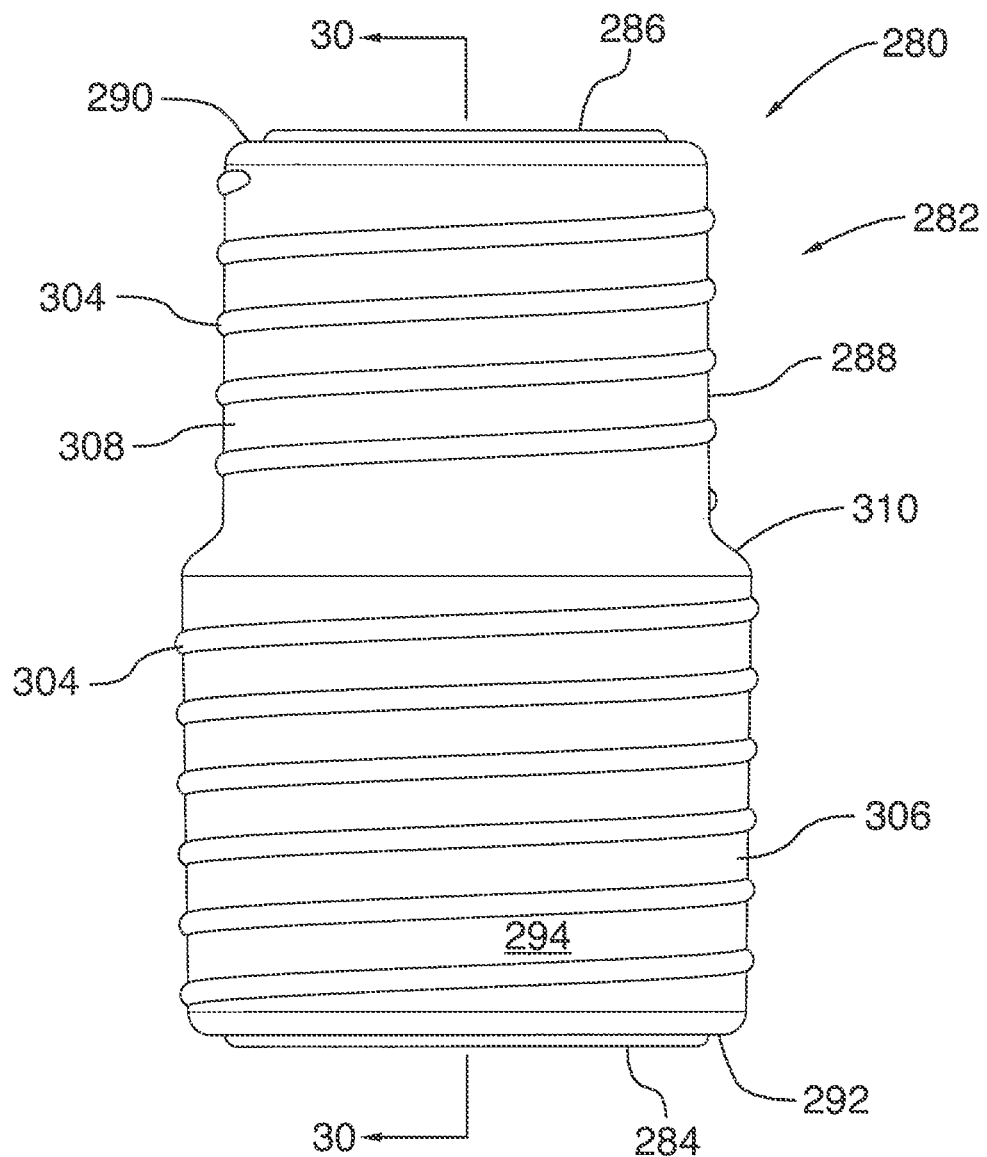
FIG. 27 is a side elevation view of the coupling assembly shown in FIG. 26.
Figure 28:
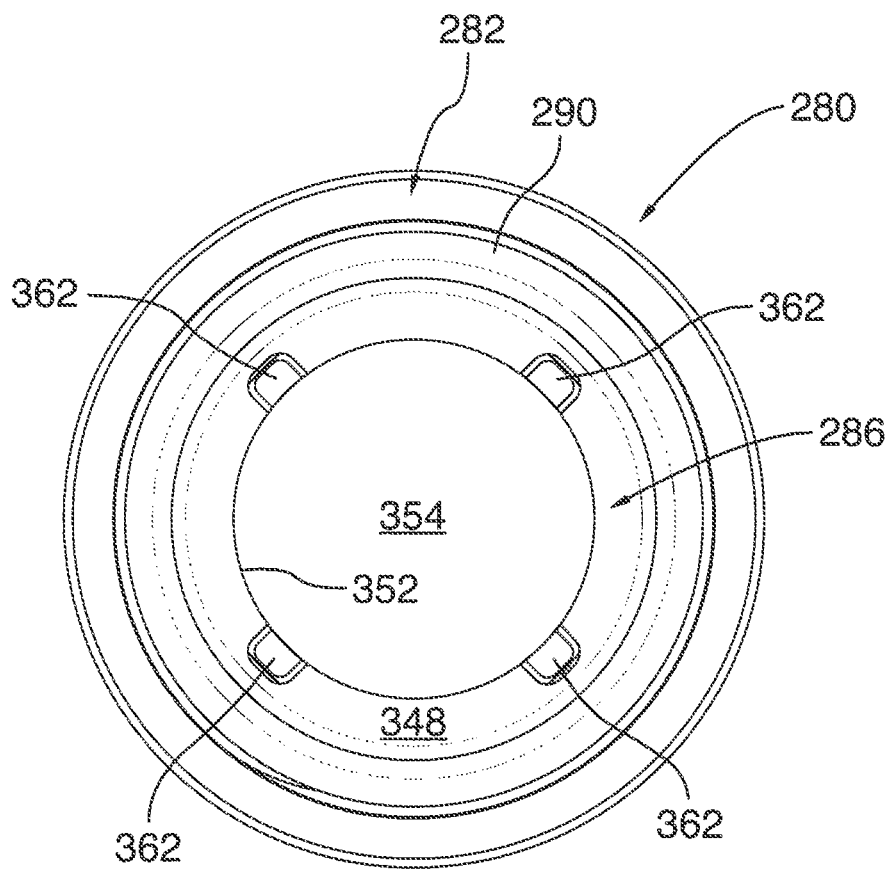
FIG. 28 is a bottom plan view showing the coupling assembly illustrated in FIG. 26 with a bottom expansion ring disposed within a coupling sleeve being visible therein.
Figure 29:
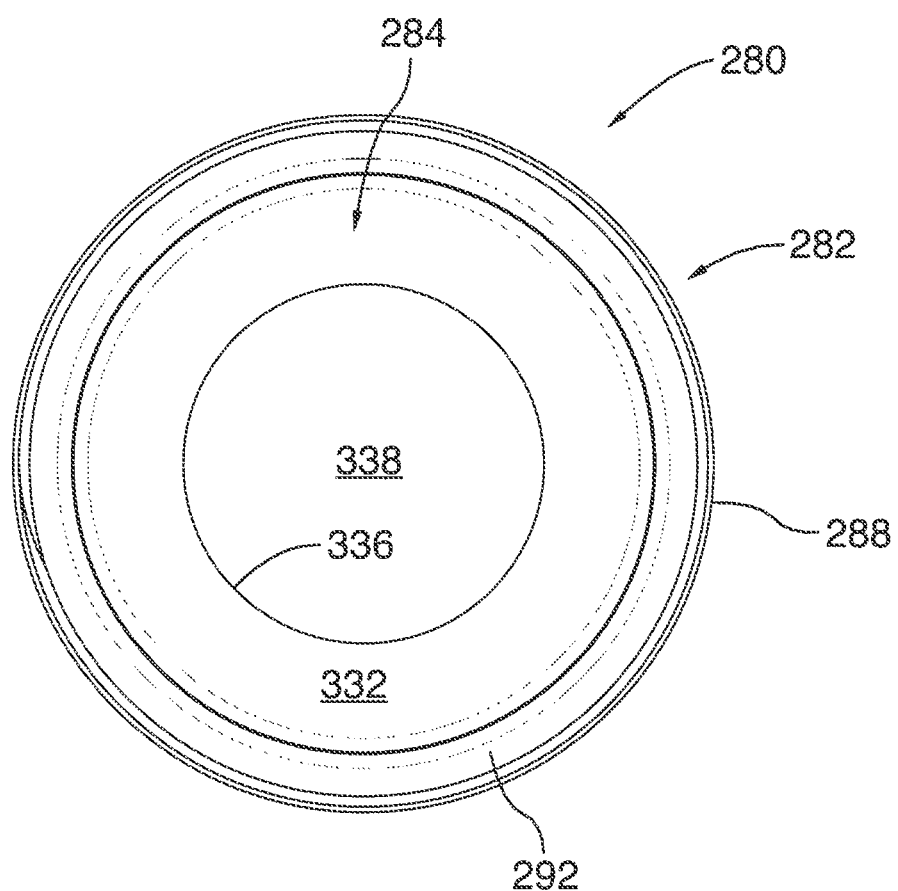
FIG. 29 is a top plan view showing the coupling assembly illustrated in FIG. 26 with an top expansion ring disposed within the coupling sleeve being visible therein.
Figure 30:
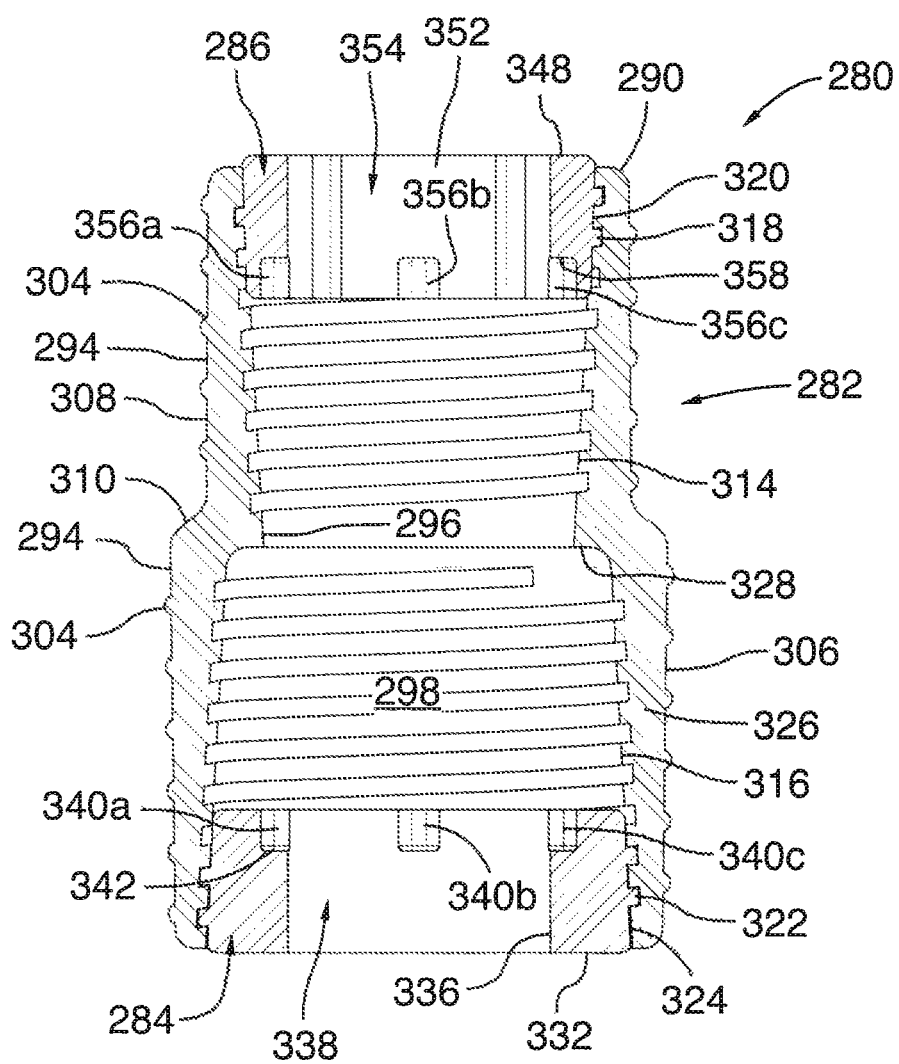
FIG. 30 is a cross-sectional view of the coupling assembly illustrated in FIG. 27 taken along section '30-30' showing the top and bottom expansion rings positioned within the coupling sleeve with the upper and lower portions of the coupling sleeve remaining in a non-expanded configuration.

Each rebate region 218 is bound on either side by an upper shoulder abutment shoulder or ridge, (generically designated by reference numeral 220) that is formed into the inner surface 188 of the sleeve body 180 and juts inwardly into the passageway 190. For example, curved rebate region 218a is bound by shoulder 220a and shoulder 220b. The thickness of the sleeve body 180 in a curved rebate region 218 varies between adjacent shoulders 220 in the same manner as described above in the regards to a curved rebate region 208, such that no further description is required. It will be appreciated that the curved rebate regions 208 and the shoulders 220 are configured to cooperatively engage portions of the top expansion ring 176 to selectively urge the upper portion 200 of the coupling sleeve 180 in the region of top groove 216 to resiliently deform from a non-expanded configuration 222 (as shown in FIG. 23) to an expanded or bulging configuration 224 (as shown in FIG. 25).

Figure 20:
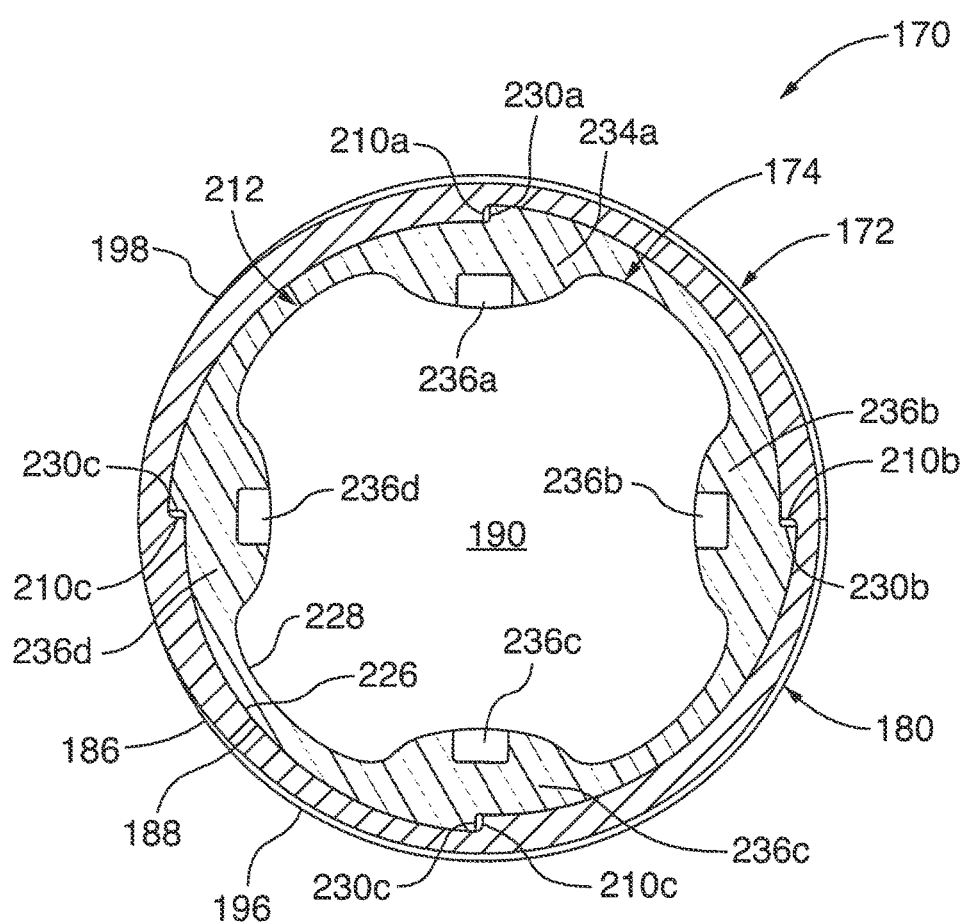
FIG. 20 is a cross-sectional view of the coupling assembly illustrated in FIG. 18 taken along section '20-20' showing the bottom expansion ring positioned within the coupling sleeve while the lower portion of the coupling sleeve remains in a non-expanded configuration.

Turning now to FIGS. 19 and 20, a detailed description of the bottom expansion ring 174 follows. The bottom expansion ring 174 closely resembles the bottom expansion ring 30 in that it too has an upper face 225, an opposed lower face (not shown), a curved outer surface 226 and an inner surface 228. The curvature of the outer surface 226 is configured to correspond substantially to the curvature of the bottom groove 206.

When seen in plan view, the bottom expansion ring 174 has a generally circular profile defined by the curved outer surface 226, the circular profile being interrupted by relatively small discontinuities in the nature of ring abutment shoulders or ridges (generically designated by reference numeral 230) jutting outwardly from the outer surface 226. However, in this embodiment, there are only four (4) such abutment shoulders 230a, 230b, 230c, and 230d. As shown in FIG. 19, these ring shoulders are configured to bear against corresponding lower sleeve shoulders 210a, 210b, 210c and 210d formed in the inner surface 188 of the sleeve body 180, when the bottom expansion ring 174 is arranged within the bottom groove 206 and the lower portion 198 of the coupling sleeve 172 in the region of bottom groove 206 is in the non-expanded configuration 212.

A central cutout 232 imparts a vague annular shape to the bottom expansion ring 174. The cutout 232 is sized large enough so as not to significantly impede the flow of any water that passes through the cutout 232 and the passageway 190 defined in the coupling sleeve 172, when the coupling assembly 170 is operatively connected to the insert pipe 24 and the standing drain pipe 26.

Unlike cutout 93 defined in the bottom expansion ring 30 which has a star-like shape, the shape of the cutout 232 resembles that of a quatrefoil and is defined by four contoured portions, in this case, scalloped portions 234a, 234b, 234c and 234d (generically designated with reference numeral 234) formed in the inner surface 228 and disposed in a ring-like arrangement. Each scalloped portion 234 has a rectangular rebate generically identified with reference numeral 236 (and more specifically, 236a, 236b, 236c and 236d) which is cut deep into the upper face 222 of the bottom expansion ring 174. Each rebate 236 defines a landing 238 to receive therein a portion of a key fitting 240 which, when to the ratchet tool 100, can be used to rotate the bottom expansion ring 174 within the coupling sleeve 172 so as to urge the lower portion 198 of the coupling sleeve 172 in the region of bottom groove 206 to adopt an expanded or bulging configuration 214.

During fabrication of the coupling assembly 170, the bottom expansion ring 174 is inserted into the bottom groove 206 where it fits snugly therein, with portions of curved outer surface 226 of the expansion ring 174 abutting the inner surface 186 of sleeve body 180, and the upper face 225 of the expansion ring 174 oriented towards the top opening 192 of the sleeve body 180.

The bottom expansion ring 174 is sized similar to the bottom expansion ring 30 and can be made of the same or similar materials.

With reference to FIGS. 19, 23 and 25, the top expansion ring 176 is now described. The top expansion ring is generally similar to bottom expansion ring 174, except that it is sized somewhat smaller to fit snugly into the top groove 216. The top expansion ring 176 closely resembles the top expansion ring 32 in that it too has an upper face 242 (visible in FIG. 19), an opposed lower face 244, a curved outer surface 246 and an inner surface 248. The curvature of the outer surface 246 is configured to correspond substantially to the curvature of the top groove 216.

When seen in plan view, the top expansion ring 176 has a generally circular profile defined by the curved outer surface 246, the circular profile being interrupted by relatively small discontinuities in the nature of ring abutment shoulders or ridges (generically designated by reference numeral 250) jutting outwardly from the outer surface 246. In this embodiment, there are four (4) such abutment shoulders 250a, 250b, 250c, and 250d. As shown in FIG. 23, these ring shoulders are configured to bear against corresponding upper sleeve shoulders 220a, 220b, 220c and 220d formed in the inner surface 188 of the sleeve body 172, when the top expansion ring 174 is arranged within the top groove 216 and the upper portion 200 of the coupling sleeve 170 in the region of top groove 216 is in the non-expanded configuration 222.

A central cutout 252 imparts a vague annular shape to the top expansion ring 176. The cutout 252 is sized large enough so as not to significantly impede the flow of any water that passes through the cutout 252 and the passageway 190 defined in the coupling sleeve 172, when the coupling assembly 170 is operatively connected to the insert pipe 24 and the standing drain pipe 26.

In like fashion to the cutout 232, the cutout 252 is in the shape of a quatrefoil and is defined by four contoured portions, in this case, scalloped portions 254a, 254b, 254c and 254d (generically designated with reference numeral 254) formed in the inner surface 248 and disposed in a ring-like arrangement. Each scalloped portion 254 has a rectangular rebate generically identified with reference numeral 256 (and more specifically, 256a, 256b, 256c and 256d) which is cut deep into the upper face 242 of the top expansion ring 176. Each rebate 256 defines a landing 258 to receive therein a portion of a key fitting 260 which, when to the ratchet tool 100, can be used to rotate the top expansion ring 176 within the coupling sleeve 172 so as to urge the upper portion 200 of the coupling sleeve 172 in the region of top groove 216 to adopt an expanded or bulging configuration 224.

During fabrication of the coupling assembly 170, the top expansion ring 176 is inserted into the top groove 216 where it fits snugly therein, with portions of curved outer surface 226 of the expansion ring 176 abutting the inner surface 246 of sleeve body 180, and the upper face 242 of the expansion ring 176 oriented towards the top opening 192 of the sleeve body 180.

The top expansion ring 176 is sized similar to the top expansion ring 32 and can be made of the same or similar materials.

Referring to FIGS. 23 and 25, the key fitting 240 and the key fitting 260 are now described in greater detail. The key fitting 240 has a disc-shaped body 262 which resembles the disc-shaped body 140 of the key fitting 98. It has a central aperture formed therein which defines a generally square female socket 264 and diameter that is similar in size to that of the disc-shaped body 140. However, in contrast to the disc-shaped 140, the body 262 only has four stub arms generically identified with reference numeral 266 (more specifically, stub arms 266a, 266b, 266c and 266d) which project outwardly from the outer margin 268 of the disc-shaped body 262 at evenly spaced locations. The generally rectangular stub arms 266a, 266b, 266c and 266d constitute male portions to be received in landings 238 formed by the rebates 236a, 236b, 236c and 236d.

The key fitting 260 is generally similar to the key fitting 119 in that it too is sized to mate with the top expansion ring 176. As shown in FIG. 25, the key fitting 260 has a disc-shaped body 270 which resembles the disc-shaped body 146. The key fitting 260 possesses a central aperture that defines a generally square female socket 272. However, unlike the key fitting 119, the key fitting 260 only has four stub arms generically identified with reference numeral 274 (more specifically, stub arms 274a, 274b, 274c and 274d) which project outwardly from the outer margin 276 of the disc-shaped body 270 at evenly spaced locations. The generally rectangular stub arms 274a, 274h, 274c and 274d constitute male portions to be received in landings 258 formed by the rebates 256a, 256b, 256c and 256d.

The installation of the installation of the coupling assembly 170 to the insert pipe 24 of drain 22 and the standing drain pipe 26 is performed in a manner similar to that described earlier in connection with coupling assembly 20 such that no further description is required other than a brief description of how each of the expansion rings 30 and 32 are displaced within their respective groove 206 and 216 so as to cause the sleeve body 172 to bulge outwardly.

Referring to FIG. 25, the key fitting 260 is fitted onto the top expansion ring 176 with its stub arms 274a, 274b, 274c and 274d received within the landings 258. Using the ratchet tool 100, the key fitting 260 and the top expansion ring 176 are urged to rotate. Care is taken not to over-rotate the top expansion ring 176. This rotation causes each ring abutment shoulders 250 to travel within a curved rebate 218 and to move away from the upper sleeve shoulder 220 with which it was associated when the upper portion 200 of the sleeve body 172 in the region of the top groove 216 was in the non-expanded configuration 222. The rigid outer surface 246 of the top expansion ring 176 pushes against the inner surface 188 of the sleeve body 172 in an area where the sleeve body 172 has increased thickness, thereby causing the upper portion 200 of the sleeve body 172 in the region of the bottom groove 216 to resiliently deform and adopt the expanded or bulging configuration 224. Expansion of the sleeve body 172 in the region of the top groove 216 tends to "lock" or tightly hold the coupling sleeve 170 in place against the inner surface 52 of the insert pipe 24 and create a tight seal between the coupling sleeve 170 and the insert pipe 24. Care should be taken not to rotate the bottom expansion ring 174 too much, otherwise the ring abutment shoulders 230 may be moved to abut against lower sleeve shoulders 210 and the sleeve body 172 in the region of the bottom groove 206 may revert back to the non-expanded configuration 212.

Figure 22:
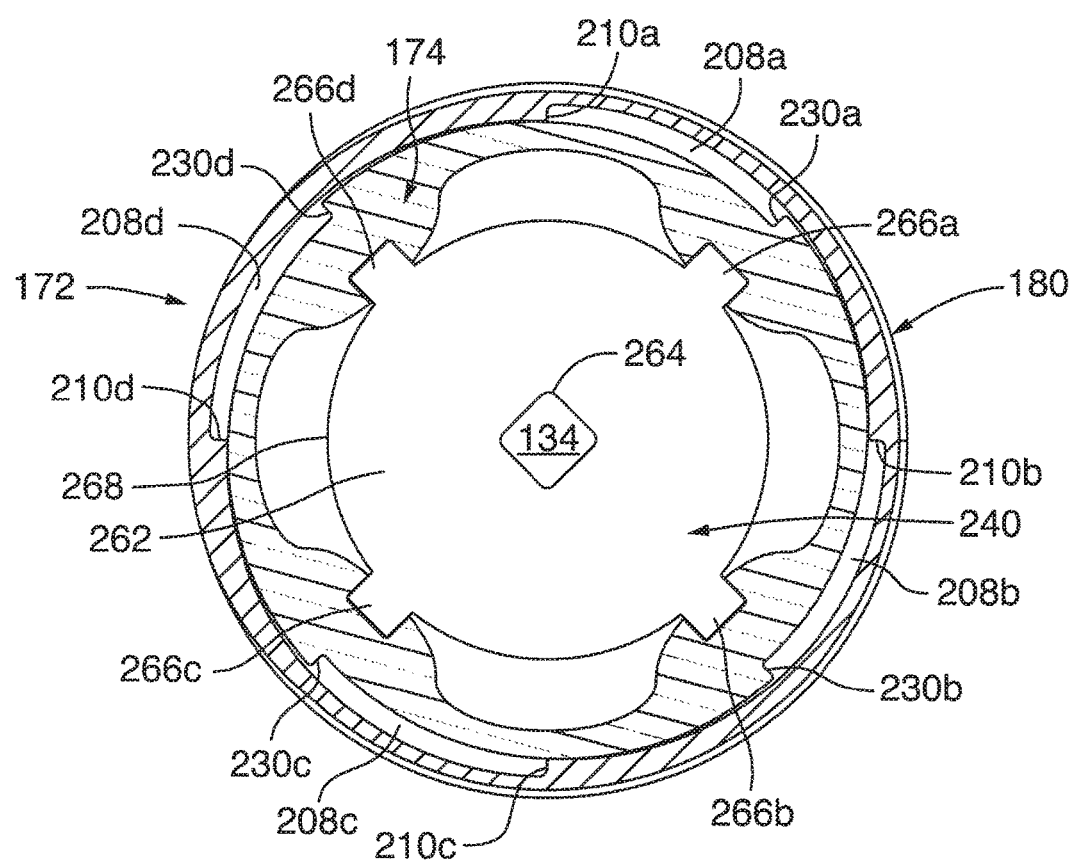
FIG. 22 is a cross-sectional view similar to that illustrated in FIG. 20 showing an alternative key fitting of the ratchet tool being used to rotate the bottom expansion ring within the coupling sleeve so as to urge the bottom portion of the coupling sleeve to adopt an expanded or bulging configuration.

With reference to FIG. 22, expansion of the sleeve body 172 in the area of the bottom groove 206 takes place in a very similar fashion. The key fitting 240 is fitted onto the bottom expansion ring 174 with its stub arms 266a, 266b, 266c and 266d received within the landings 118. Using the ratchet tool 100, the key fitting 240 and the bottom expansion ring 174 are urged to rotate. Care is taken not to over-rotate the bottom expansion ring 174. This rotation causes each ring abutment shoulders 230 to travel within a curved rebate 208 and to move away from the lower sleeve shoulder 210 with which it was associated when the lower portion 198 of the sleeve body 172 in the region of the bottom groove 206 was in the non-expanded configuration 212. The rigid outer surface 226 of the bottom expansion ring 174 pushes against the inner surface 188 of the sleeve body 172 in an area where the sleeve body 172 has increased thickness, thereby causing the lower portion 198 of the sleeve body 172 in the region of the bottom groove 206 to resiliently deform and adopt the expanded or bulging configuration 214. Expansion of the sleeve body 172 in the region of the bottom groove 206 tends to tightly "lock" or hold the coupling sleeve 170 against the inner surface 54 of the standing drain pipe 26 and create a tight seal between the coupling sleeve 170 and the standing drain pipe 26.

Other modifications are possible. For example, in other embodiments, the sleeve abutment shoulders and the ring abutment shoulders could be configured differently. For example, the shoulders could be configured as saw teeth, rounded humps, nubs, or other shaped projections or structures.

In alternative embodiments, the configuration and arrangement of stub arms in the key fittings and the rebates or landings in the expansion rings could be different.

The coupling assemblies described above could be provided in a kit which would include a coupling sleeve, a bottom expansion, a top expansion ring, a first key fitting adapted to engage the bottom expansion ring and a second key fitting adapted to engage the top expansion ring. Each kit could be designed for use with a standing drain pipe of a predetermined size and a correspondingly sized drain. In an alternative embodiment, it may be possible for a kit to be provided with only a single key fitting suitable to engage both the top expansion ring and the bottom expansion ring. In a further alternative, the kit could include a coupling sleeve, a bottom expansion and a top expansion ring, with the first and second key fittings being provided separately.

In the embodiments described above, sleeve expansion seal and locking means are defined by ring abutment shoulders of an expansion ring cooperating with the inner surface of the sleeve body. In other embodiments, the sleeve expansion seal and locking means can be formed by a different structural interaction between the expansion rings and the sleeve body. For example, in an alternative embodiment, the expansion rings could be configured with threading about their outer circumferential surface for threaded engagement with corresponding threading running along the inner surface of the sleeve body. The interior passageway of the sleeve body could be provided with an hourglass-like taper (i.e. tapering from both the upper and lower portions of the sleeve body toward the middle). Configured in this manner, when the top and bottom expansion rings are urged to advance towards the middle of the sleeve body as they travel along the threading formed in the inner surface of the sleeve body, the expansion rings would push out against the interior surface of the sleeve body in the area where the wall thickness is increased due to the taper, thereby causing compression of the sleeve body between the top expansion ring 284 and the insert pipe, and the bottom expansion ring 286 and the standing drain pipe. An example of such alternative embodiment is described in greater detail below with reference to FIGS. 26 to 41.

Figure 31:
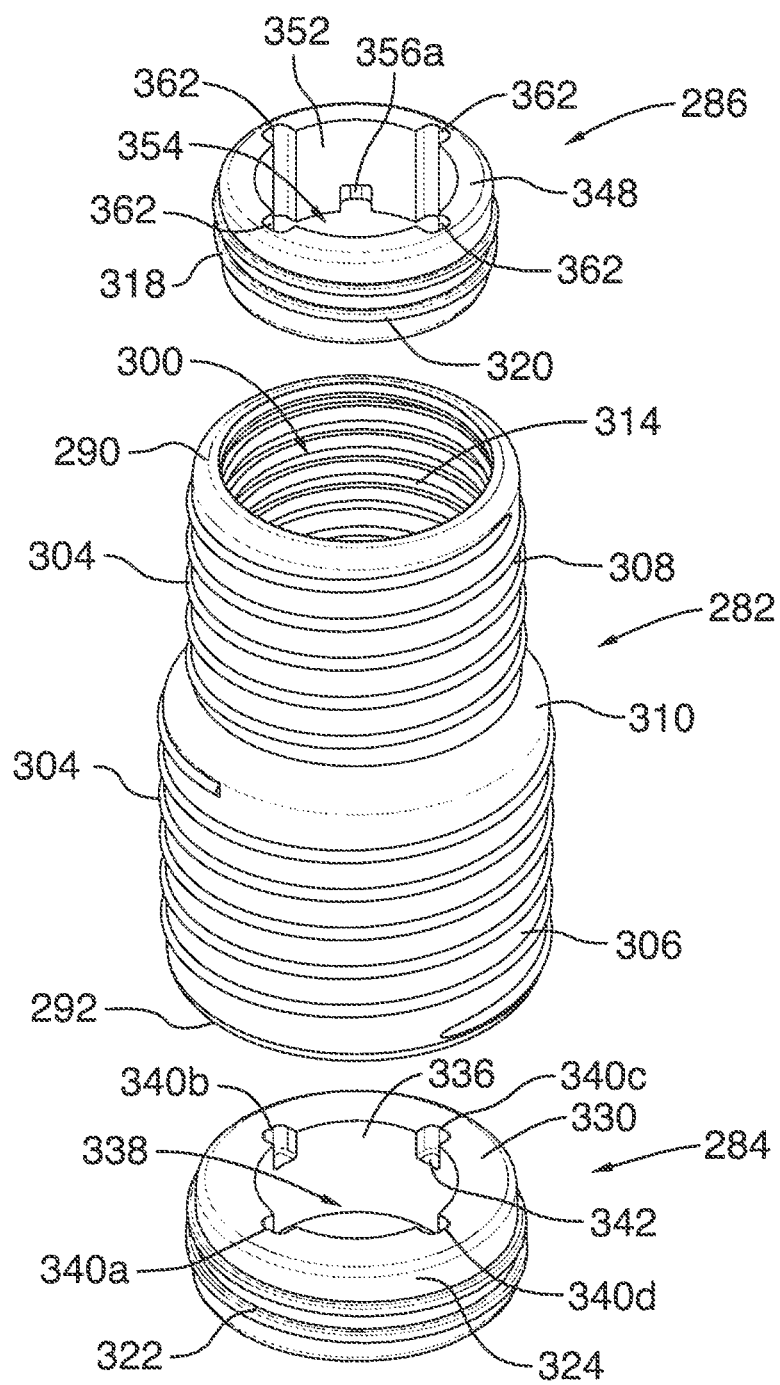
FIG. 31 is an exploded view of the coupling assembly shown in FIG. 26.

FIG. 31 shows a coupling assembly 280 that includes a flexible coupling sleeve 282, a rigid bottom expansion ring 284 and a rigid top expansion ring 286. The coupling sleeve 282 is generally similar to the sleeve coupling 28 in that the sleeve 282 is also made of a fluid impermeable, elastomeric material (preferably, ethylene propylene diene monomer (EPDM) rubber) and also has a generally tubular sleeve body 288 which extends between a top end 290 and a bottom end 292 (see FIGS. 27 and 30).

Figure 32:
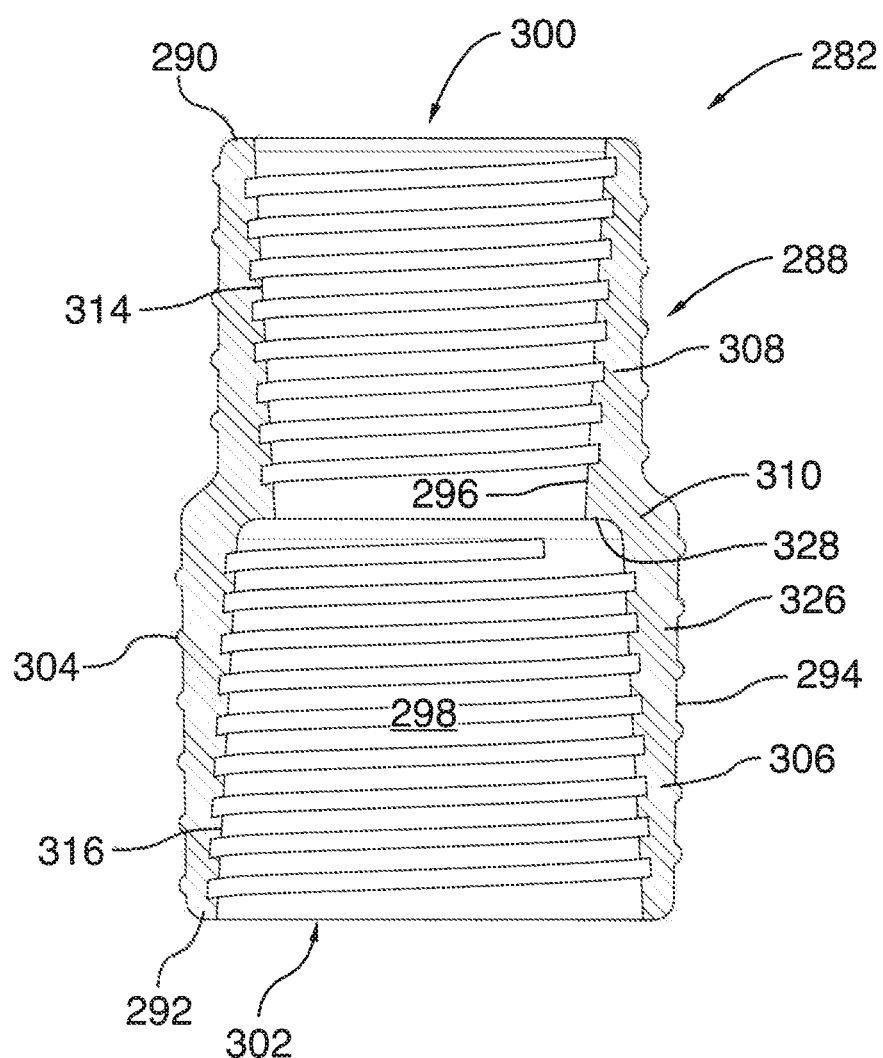
FIG. 32 is a cross-sectional view of the coupling sleeve similar to that shown in FIG. 30, except that the top and bottom expansion rings have been omitted to reveal details of the interior of the coupling sleeve.

With reference to FIG. 32, the sleeve body 288 can be seen to have an outer surface 294 and an inner surface 296 which defines a longitudinal passageway 298 that communicates with a top opening 300 and a bottom opening 302. Disposed helically along the outer surface 294 of the sleeve body 288 between the top and bottom ends 290 and 292 and formed thereon, is raised threading 304, similar to threading 50 (shown in FIG. 2).

Figure 41:
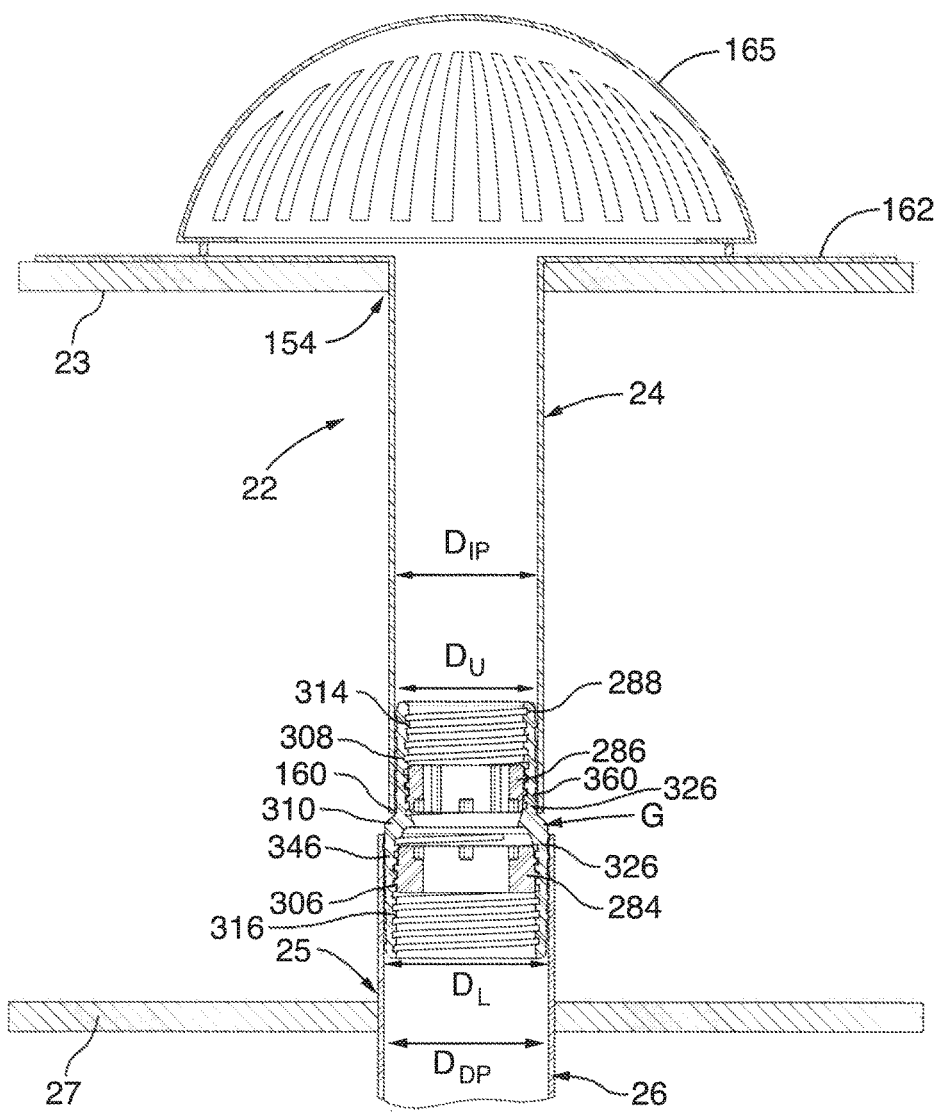
FIG. 41 is a longitudinal cross-sectional view of the drain, the coupling assembly and the drain pipe all shown operatively connected to each other.

As shown in FIG. 41, the sleeve body 288 further includes a lower portion 306 provided with an outer diameter $D_L$ (measured about the outer surface 294, but excluding the threading 304), an upper portion 308 provided with a relatively smaller outer diameter $D_U$ (also measured about the outer surface 294, but excluding the threading 304) and an intermediate transition portion 310 joining the lower portion 306 to the upper portion 308. The outer diameter $D_L$ is sized to be smaller than the internal diameter $D_{DP}$ of the standing drain pipe 26 such that the lower portion 306 can fit snugly within the standing drain pipe 26, when the coupling sleeve 280 is inserted therein. Similarly, the outer diameter $D_U$ of the upper portion 308 is sized to be smaller than the internal diameter $D_{IP}$ of the insert pipe 24 to allow the upper portion 58 to fit snugly within the insert pipe 24, when the coupling sleeve 280 is connected to the drain 22. It should be noted that in this arrangement, the internal diameter $D_{IP}$ of the insert pipe 24 is relatively smaller than the internal diameter $D_{DP}$ of the standing drain pipe 26. In this embodiment, $D_L$, $D_U$, $D_{DP}$, and $D_{IP}$ of the sleeve body 288 have the same dimensions as the same as $D_L$, $D_U$, $D_{DP}$, and $D_{IP}$ of sleeve body 28.

The intermediate portion 310 is relatively narrow and is formed roughly midway between the upper and lower portions 308 and 306. In the region of the intermediate portion 310, the sleeve body 288 tapers in the direction of the upper portion 308.

Referring specifically to FIG. 32, one can see two distinct sets of tapered, helical female threading running along the inner surface 296 of the sleeve body 288—upper female threading 314 which tapers from the upper end 290 toward the intermediate portion 310, and lower female threading 316 which tapers from the lower end 292 toward the intermediate portion 310. As explained in greater detail below, the upper female threading 314 is configured to match male threading 318 disposed on the outer surface 320 of the top expansion ring 286, while the lower female threading 316 is configured to match male threading 322 on the outer surface 324 of the bottom expansion ring 284.

Due to the taper in threading 314 and 316, the internal passageway 298 can be seen to narrow from both ends in an hourglass fashion. Correspondingly, the thickness of the sleeve body wall 326 increases from each of the top and bottom ends 290 and 292 towards the middle of the sleeve body 288 (i.e. the intermediate portion 310). A shoulder 328 formed in the sleeve body 288 projects into the internal passageway 298, thereby creating a discontinuity (or hard transition) in the passageway 298 and a clear demarcation between the upper female threading 314 and the lower female threading 316.

Figure 33:
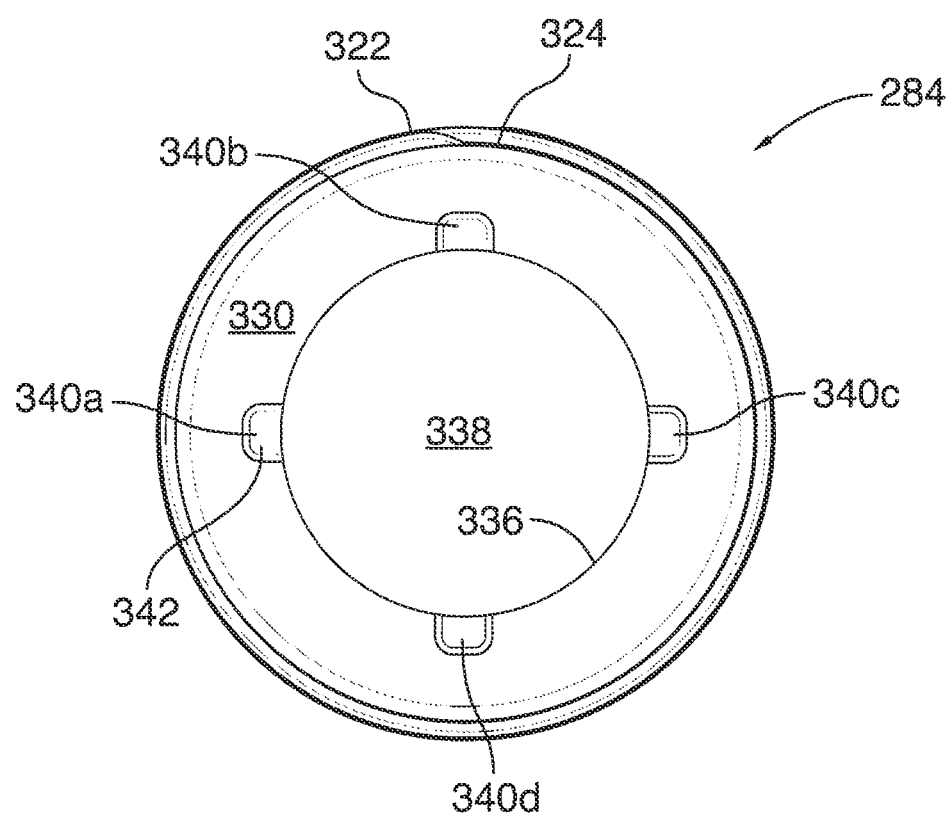
FIG. 33 is a top plan view of the bottom expansion ring illustrated in FIG. 29.
Figure 34:
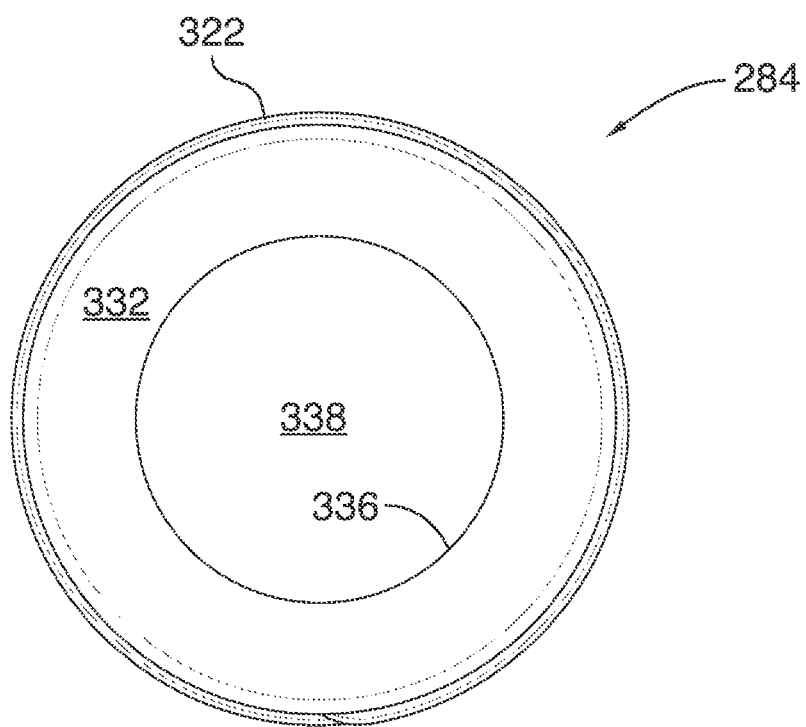
FIG. 34 is a bottom plan view of the bottom expansion ring shown in FIG. 29.

Turning now to FIGS. 31, 33 and 34, a detailed description of the bottom expansion ring 284 follows. The bottom expansion ring 284 has an upper face 330, an opposed lower face 332, the curved outer surface 324 and a curved inner surface 336. Helical male threading 322 runs along the curved outer surface 324.

A central circular cutout 338 imparts an annular shape to the bottom expansion ring 284. The cutout 338 is sized large enough so as not to significantly impede the flow of any water that passes through the cutout 338 and the passageway 298 defined in the coupling sleeve 288, when the coupling assembly 280 is operatively connected to the insert pipe 24 and the standing drain pipe 26.

Cut deep into the upper face 330 of the bottom expansion ring 284 along the edge of the cutout 338, is a plurality of rectangular rebates 340 (more specifically, four (4) evenly-spaced rebates 340a, 340b, 340c and 340d). By having each rebate 340 extend partially into (but not completely through) the upper face 330, a landing 342 is formed at the location of each rebate 340. The landing 342 is configured to receive therein a portion of a key fitting 344 and to support the key fitting 344 so as to substantially prevent or minimize the accidental loss of the key fitting 344 resulting from the key fitting 344 falling through the coupling assembly 280 and down into the standing drain pipe 26 during installation of the coupling assembly 280. As explained in greater detail below, when attached to the ratchet tool 100, the key fitting 344 can be used to advance the bottom expansion ring 284 along threading 316 toward the intermediate portion 310 within the coupling sleeve 280 so as to urge the sleeve body wall 326 in that region to adopt an expanded or bulging configuration 346 (shown in FIG. 41).

The bottom expansion ring 284 is sized to fit into the lower portion 306 of the sleeve body 288. During installation of the coupling assembly 280, the upper face 330 of the bottom expansion ring 284 is oriented towards the top opening 300 of the sleeve body 288 so that the key fitting 344 attached to the ratchet tool 100 can be inserted through the top opening 300 and be mated with the bottom expansion ring 284 (i.e. with portions of the key fitting 344 being received within the landings 342).

The thickness of the bottom expansion ring 284 as measured between the upper face 330 and the lower face 332 will vary depending on the size of the coupling sleeve and the standing drain pipe.

The bottom expansion ring 284 shown in the drawings is made of a translucent, hard, plastic material—polycarbonate. In other embodiments, the expansion ring could be fabricated from other materials selected on the basis of their strength, rigidity and durability characteristics. For example, the expansion ring could be made of steel or another suitable metal.

Figure 35:
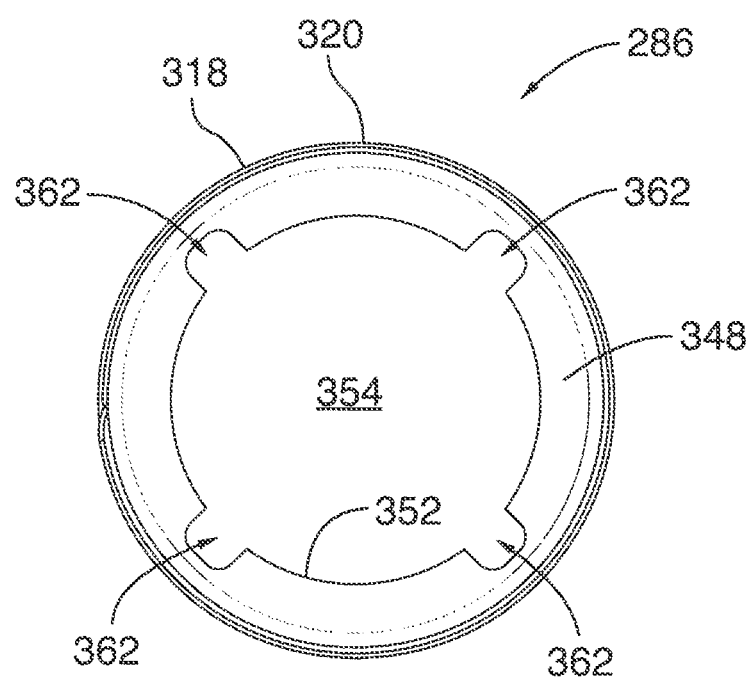
FIG. 35 is a top plan view of the top expansion ring illustrated in FIG. 28.
Figure 36:
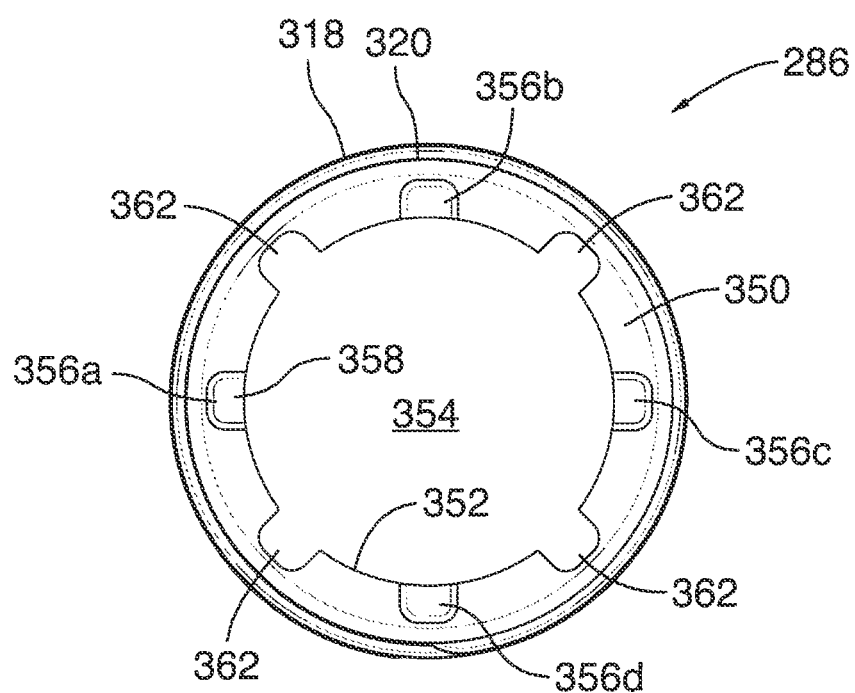
FIG. 36 is a bottom plan view of the top expansion ring shown in FIG. 28.
Figure 37:
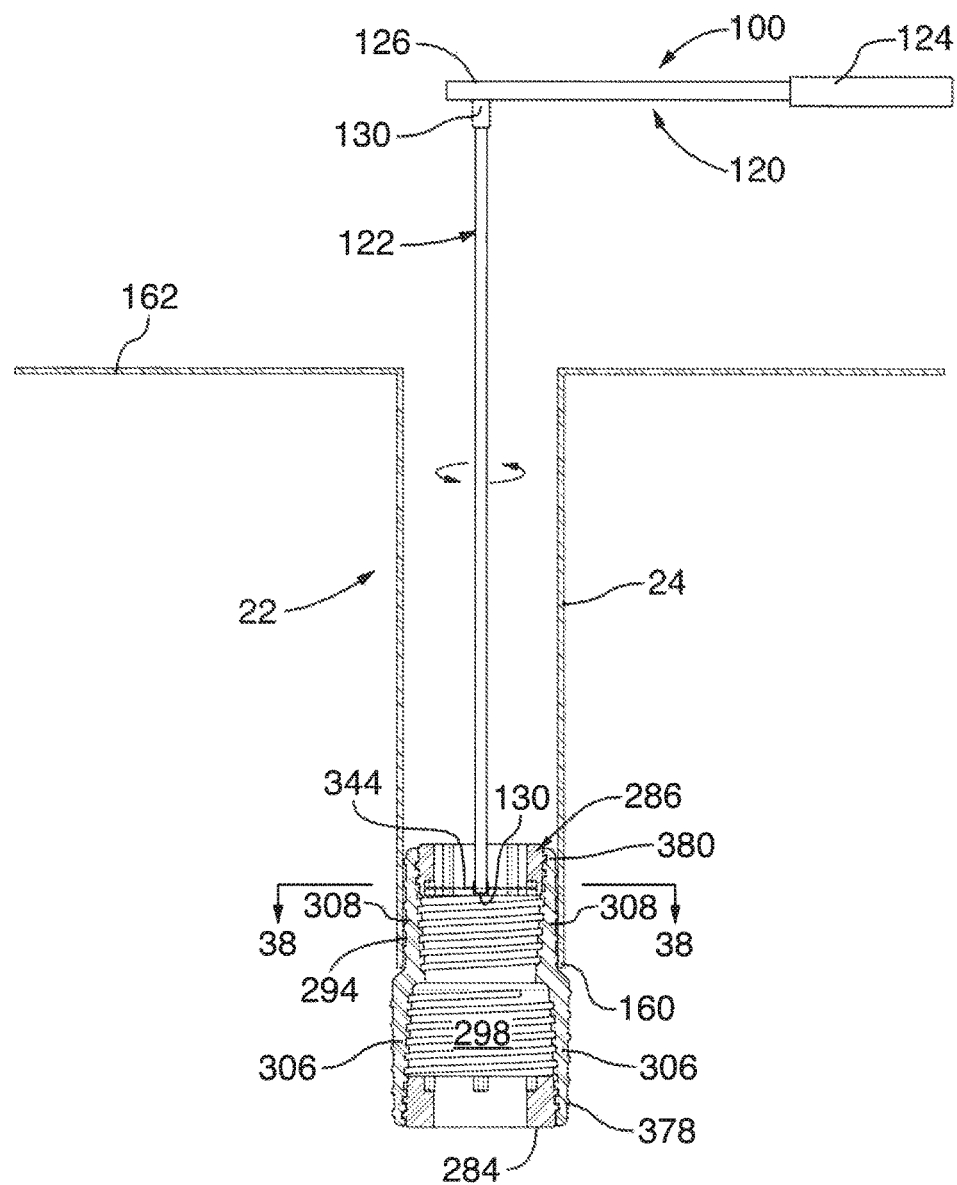
FIG. 37 is a longitudinal cross-sectional view showing the coupling assembly illustrated in FIG. 26 being operatively connected to the insert pipe of the drain using a ratchet tool.

With reference to FIGS. 31, 35 and 36, the top expansion ring 286 is now described. The top expansion ring is generally similar to bottom expansion ring 284, except that it is sized somewhat smaller to fit into the upper portion 308 of the sleeve body 288. In like fashion to bottom expansion ring 284, the top expansion ring 286 has an upper face 348, an opposed lower face 350, the curved outer surface 320 and a curved inner surface 352. Helical male threading 318 runs along the curved outer surface 320.

A central circular cutout 354 imparts an annular shape to the top expansion ring 286. The cutout 354 is sized large enough so as not to significantly impede the flow of any water that passes through the cutout 354 and the passageway 298 defined in the coupling sleeve 288, when the coupling assembly 280 is operatively connected to the insert pipe 24 and the standing drain pipe 26.

Cut deep into the lower face 350 of the top expansion ring 286 along the edge of the cutout 354, is a plurality of rectangular rebates 356 (more specifically, four (4) evenly-spaced rebates 356a, 356b, 356c and 356d). By having each rebate 356 extend partially into (but not completely through) the lower face 350, a landing 358 is formed at the location of each rebate 356. The landing 356 is configured to receive therein a portion of the key fitting 344. As explained in greater detail below, when attached to the ratchet tool 100, the key fitting 344 can be used to advance the top expansion ring 286 toward the intermediate portion 310 within the coupling sleeve 280 so as to urge the sleeve body wall 326 in that region to adopt an expanded or bulging configuration 360.

Full-length grooves 362 are also formed along the edge of the cutout 354 at locations circumferentially staggered away from each landing 358. The grooves 362 run from the upper face 348 to the lower face 350 of the top expansion ring 286. In this embodiment, there are four grooves 362 (the number of grooves matching the number of stub arms of the key fitting 344). Each groove 362 is shaped so as to allow a portion of the key fitting 344 to pass therethrough. As will be explained in greater detail below, this feature allows the same key fitting 344 to be used with both the bottom expansion ring 284 and the top expansion ring 286.

The top expansion ring 286 is sized to fit into the upper portion 308 of the sleeve body 288. During installation of the coupling assembly 280, the lower face 350 of the top expansion ring 286 is oriented towards the bottom opening 302 of the sleeve body 288 so that the key fitting 344 attached to the ratchet tool 100 can be inserted through the bottom 302 and be mated with the top expansion ring 286 (i.e. with portions of the key fitting 344 being received within the landings 358).

The thickness of the top expansion ring 284 as measured between the upper face 348 and the lower face 350 will vary depending on the size of the coupling sleeve and the insert pipe.

Figure 38:
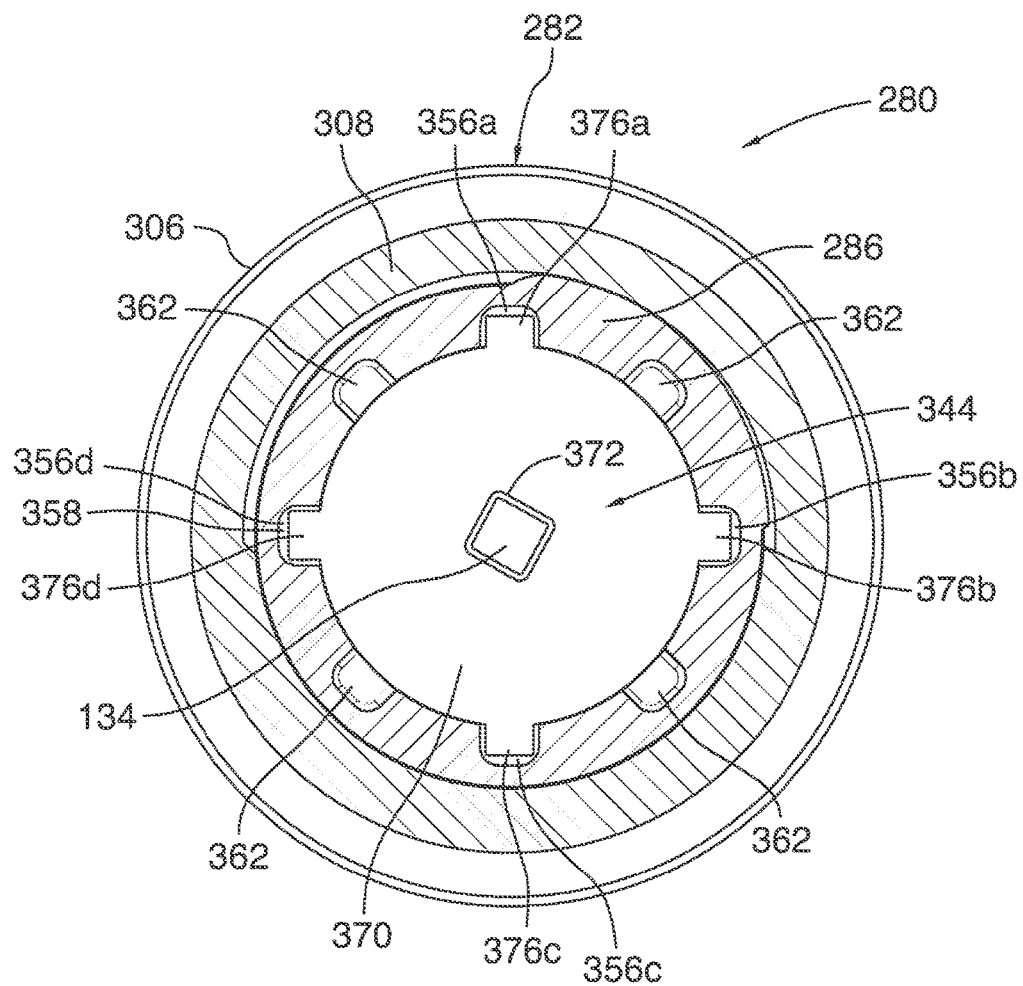
FIG. 38 is a cross-sectional view of the coupling assembly deployed within the insert pipe shown in FIG. 37 along taken along section '38-38' showing the key fitting of the ratchet tool being used to rotate the top expansion ring and advance it further downward into the coupling sleeve.
Figure 40:
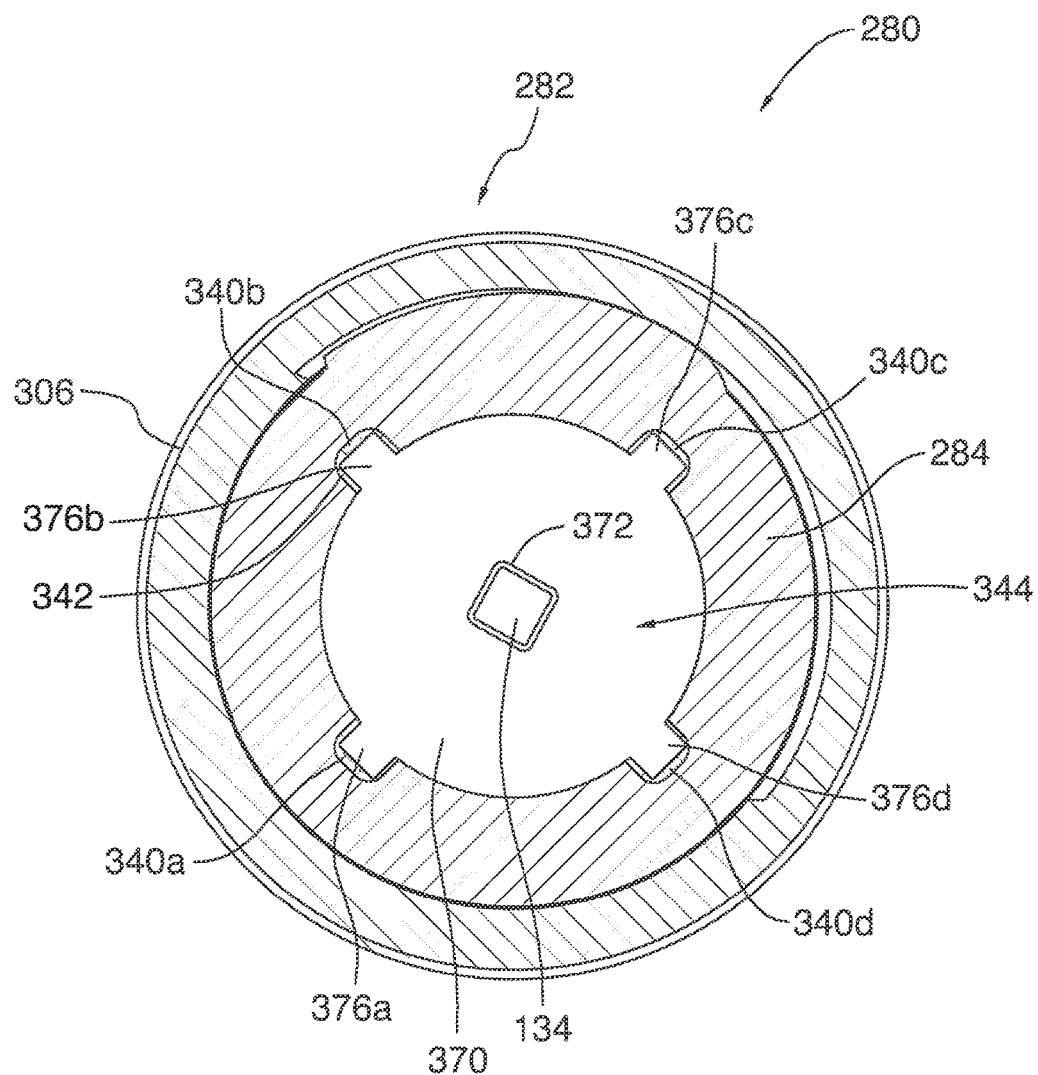
FIG. 40 is another cross-sectional of the coupling assembly deployed within the standing drain pipe shown in FIG. 39 along taken along section '40-40' showing the key fitting of the ratchet tool being used to rotate the bottom expansion ring and advance it further upward into the coupling sleeve.

Referring to FIGS. 38 and 40, the key fitting 344 is now described in greater detail. The key fitting 344 has a disc-shaped body 370 with a central aperture formed therein which defines a generally square female socket 372 configured to mate with the generally square male connector (not shown) of the ratchet tool 110. The diameter of the disc-shaped body 370 will be sized appropriately to mate with both the top and bottom expansion rings 286 and 284. Projecting outwardly from the outer margin 374 of the disc-shaped body 370 at evenly spaced locations, are stub arms generically identified with reference numeral 376. In this embodiment, the disc-shaped body 140 possesses four (4) stub arms 376a, 376b, 376c and 376d. In other embodiments, the disc-shaped body could be provided with a different number of stub arms and correspondingly, the top and bottom expansion rings would be adapted with a matching number of landings. The generally rectangular stub arms 376a, 376b, 376c and 376d constitute male portions to be received in landings 342 formed by the rebates 340a, 340b, 340c and 340d, and in landings 358 formed by the rebates 356a, 356b, 356c and 356d. Advantageously, the length of the stub arms 376 is appropriately sized to allow it to engage both top and bottom expansion rings 286 and 284. This reduces the hardware required for installation of the coupling assembly 280.

Having described all the various components of the coupling assembly 280, what follows next is a description of an exemplary installation of the coupling assembly 280 to the insert pipe 24 of drain 22 and the standing drain pipe 26 with reference to FIGS. 37 to 41. Prior to installation as a preliminary step, care is taken to ensure that the bottom expansion ring 284 is in threaded engagement with the sleeve body 288 and the bottom expansion ring 284 is advanced into the lower portion 306 of the sleeve body 288 until the lower face 332 of the bottom expansion ring 284 projects slightly below the bottom end 292 of the sleeve body 288. It will be appreciated that in this position, the lower portion 306 of the sleeve body 288 remains in a non-expanded configuration 378. In other embodiments, the lower face 332 could be brought flush to the bottom end 292 of the sleeve body 288. In still other embodiments, it may be sufficient for the lower face 332 to be brought close to bottom end 302.

Similarly, the installer verifies that the top expansion ring 286 is sufficiently threadedly engaged onto the sleeve body 288 so that the top face 348 of the top expansion ring 286 projects slightly above the top end 292 of the sleeve body 288. In this position, the upper portion 308 of the sleeve body 288 remains in a non-expanded configuration 380.

Next, a waterproofing adhesive or caulking material is spread along the outer surface 294 of the sleeve body 288 between the threading 304 located on the top portion 308. Preferably, the adhesive is a cyanoacrylate adhesive. The bottom end 160 of the insert pipe 24 is fitted onto the coupling sleeve 280 until the upper portion 308 of the sleeve body 288 is wholly received in the insert pipe 24 and abuts the intermediate portion 310 of the coupling sleeve 280. Also, in this arrangement, the outer surface 294 of the sleeve body 288 abuts the inner surface 52 of the insert pipe 24 with the threading 304 snugly compressed up against the inner surface 52. Use of the adhesive assists in maintaining the upper portion 306 of the sleeve body 288 fixedly secured to the insert pipe with a tight seal being formed therebetween. While use of an adhesive has been shown to be advantageous, it need not be used in every application. In certain applications, the coupling assembly could be installed to the insert pipe without the application of adhesive.

As shown in FIG. 38, the male connector 134 of the extension rod 122 is mated with the female socket 372 of the key fitting 344 and the ratchet tool 100 outfitted with the key fitting 344 carried on the extension rod 122, is inserted through the top opening 300 of the sleeve body 288. The stub arms 376a, 376b, 376c and 376d radiating from the disc-shaped body 370 are received within the landings 358 such that the key fitting 344 and the top expansion ring 286 are now fixed to each other for rotation. Alternatively, the key fitting 344 could be manually inserted into the sleeve body and positioned into the landings formed in the top expansion ring and the ratchet tool could then fitted through the top opening to mate the extension arm with the key fitting.

Thereafter, the installer grasps the handle portion 124 of the ratchet tool 100 and uses the tool to urge the top expansion ring 284 to move along the threading 314 formed in the inner surface 296 of the sleeve body 288. As the top expansion ring 284 travels downward further into the upper portion 308, the narrowing of the tapered passageway 298 causes the top expansion ring 286 to exert forces outwardly against the sleeve body wall 326. Because the sleeve body 288 is made of a resilient material, the sleeve body wall 326 deforms locally in response to the forces exerted against it and adopts the expanded or bulging configuration 360 shown in FIGS. 39 and 41.

Expansion of the sleeve body 288 in the region of the top expansion ring 284 tends to "lock" or tightly hold the coupling sleeve 280 in place against the inner surface 52 of the insert pipe 24, and create a tight seal between the coupling sleeve 280 and the insert pipe 24. It will be appreciated that the top expansion ring 286 will exert the greatest forces against the sleeve body wall 326 when the top expansion ring 286 is moved closest to the intermediate portion 310 of the sleeve body 288. Accordingly, it is generally preferred that the top expansion ring 286 be fully tightened down into the upper portion 308 of the sleeve body 288. However, this need not be the case in every implementation. In other embodiments, the top expansion ring could be tightened partially such that it occupies a position only part way down the upper portion of the sleeve body.

The key fitting 344 is then detached from the top expansion ring 284 and the ratchet tool 100 with the key fitting 344 mounted thereto is pulled out from the sleeve body 288.

With the insert pipe securely fixed to the coupling assembly 280, the coupling assembly 280 can now be connected to the standing drain pipe 26. Optionally, waterproofing adhesive may be spread along the outer surface 294 of the sleeve body 288 between the threading 304 located on the lower portion 306. The coupling assembly 280 with the insert pipe 24 attached thereto is then introduced into the space defined between the roof structure 25 and the support structure 27 through opening 154. The sleeve body 288 is inserted into the top end 156 of the standing drain pipe 26 until the lower portion 306 is wholly received in the standing drain pipe 26, and the top circumferential flange 162 of the insert pipe 24 rests the roof structure 25. In this arrangement, the outer surface 294 of the sleeve body 288 abuts the inner surface 54 of the standing drain pipe 26 with the threading 304 snugly compressed up against the inner surface 54. Where adhesive is used, the lower portion 306 of the sleeve body 288 can be permanently secured to the standing drain pipe 26 with a tight seal being formed therebetween. While use of the adhesive has been shown to be advantageous, it is optional and need not be used in every application. In certain applications, the coupling assembly could be installed to the standing drain pipe without the application of adhesive.

With the coupling assembly 280 thus arranged, only a small gap G remains between the standing drain pipe 26 and the insert pipe 24, the gap G being bridged by the narrow intermediate transition portion 310 of the sleeve body 288.

Figure 39:
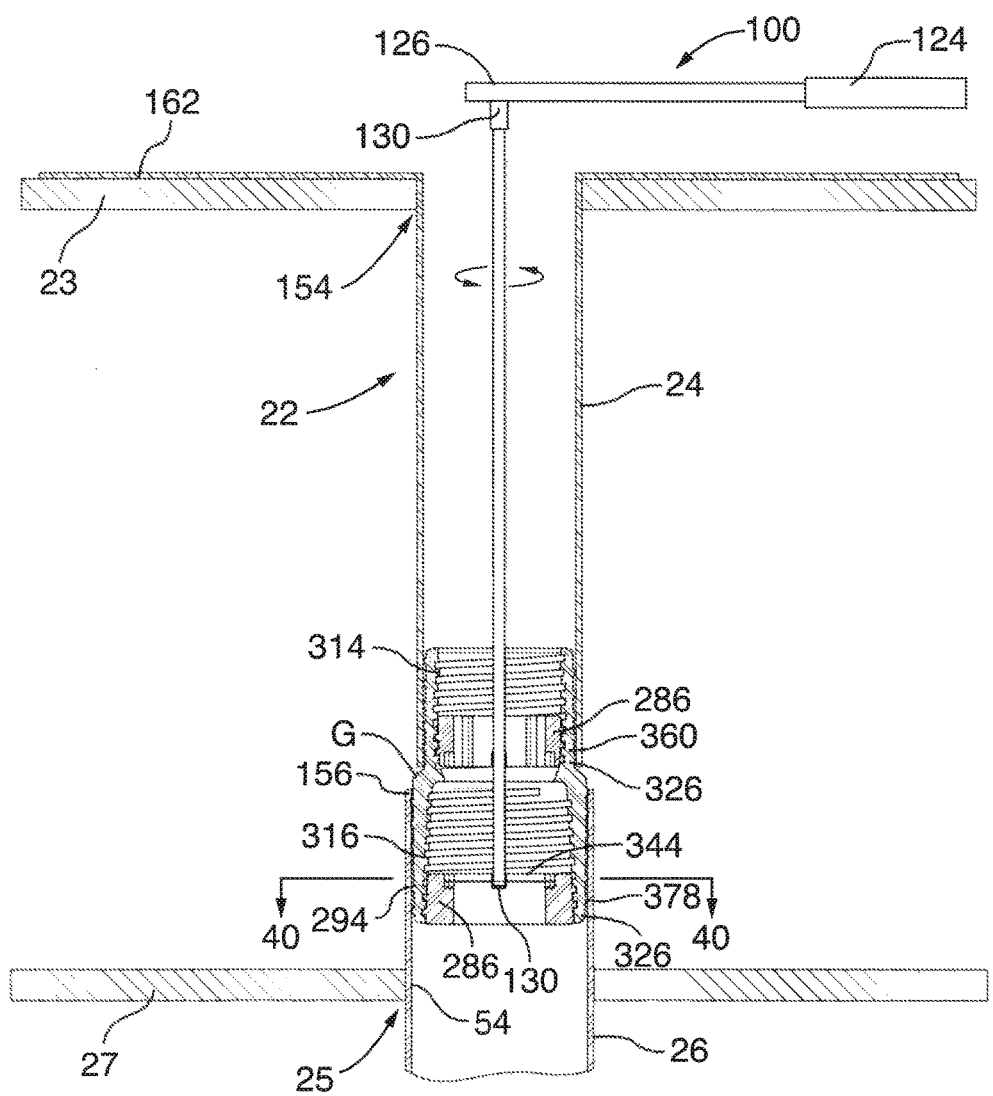
FIG. 39 is another longitudinal cross-sectional view showing the coupling assembly illustrated in FIG. 26 being operatively connected to the standing drain pipe using the ratchet tool.

As shown in FIG. 39, the male connector 134 of the extension rod 122 is mated with the female socket 372 of the key fitting 344 and the ratchet tool 100 outfitted with the key fitting 344 carried on the extension rod 122, is inserted through the top opening 300 of the sleeve body 288. The stub arms 376a, 376b, 376c and 376d radiating from the disc-shaped body 370 are aligned with the grooves 362 defined in the top expansion ring 286 so that the key fitting 344 can be moved downward toward the bottom expansion ring 284, unhindered by the top expansion ring 286. Once clear of the top expansion ring 286, the key fitting 344 can be positioned so that the stub arms 376a, 376b, 376c and 376d can be located in the landings 358 (see FIG. 40). Thus arranged, the key fitting 344 and the bottom expansion ring 284 are now fixed to each other for rotation.

Thereafter, the installer grasps the handle portion 124 of the ratchet tool 100 and uses the tool to urge the bottom expansion ring 284 to move along the threading 316 formed in the inner surface 296 of the sleeve body 288. As the top expansion ring 284 travels upward further into the lower portion 306, the narrowing of the tapered passageway 298 causes the bottom expansion ring 284 to exert forces outwardly against the sleeve body wall 326. Because the sleeve body 288 is made of a resilient material, the sleeve body wall 326 deforms locally in response to the forces exerted against it and adopts the expanded or bulging configuration 346 shown in FIG. 41.

Expansion of the sleeve body 288 in the region of the bottom expansion ring 284 tends to "lock" or tightly hold the coupling sleeve 28 in place against the inner surface 54 of the standing drain pipe 26 and create a tight seal between the coupling sleeve 28 and the standing drain pipe 26. It will be appreciated that the bottom expansion ring 284 will exert the greatest forces against the sleeve body wall 326 when the bottom expansion ring 284 is moved closest to the intermediate portion 310 of the sleeve body 288. Accordingly, it is generally preferred that the bottom expansion ring 284 be fully tightened up into the lower portion 306 of the sleeve body 288. However, this need not be the case in every implementation. In other embodiments, the bottom expansion ring could be tightened partially such that it occupies a position only part way up the lower portion of the sleeve body.

The key fitting 344 is then detached from the bottom expansion ring 284 and the ratchet tool 100 with the key fitting 344 mounted thereto is pulled upward toward the top expansion ring 286. The stub arms 376a, 376b, 376c and 376d radiating from the disc-shaped boy 370 are aligned with the grooves 362 defined in the top expansion ring 386. Thereafter, the key fitting 344 can be pulled out from the sleeve body 288, unhindered by the top expansion ring 286.

With the coupling assembly 280 now secured to both the insert pipe 24 and the standing drain pipe 24, the installation is completed by affixing a hemispherical vented drain portion to the top flange 162 of the insert pipe 24 (see FIG. 41).

From the foregoing description, it will be appreciated that the coupling assemblies described herein are relatively easy and inexpensive to manufacture and to install and require few components. Advantageously, such coupling assemblies offer the ability to independently lock the coupling sleeve onto the insert pipe without having to also contemporaneously lock it onto the standing drain pipe.

Although the foregoing description and accompanying drawings relate to specific preferred embodiments of the present invention as presently contemplated by the inventor, it will be understood that various changes, modifications and adaptations, may be made without departing from the principles of the invention.

What is claimed is:

1. A kit for coupling a drain having an insert pipe to a drain pipe, the kit comprising:

a coupling sleeve made of a resiliently deformable, elastomeric material; the coupling sleeve having a tubular sleeve body including:

a top portion, a bottom portion, an intermediate portion disposed between the top and bottom portions and an inner surface defining a passageway extending through the top, intermediate and bottom portions; the passageway having a first portion extending between the top portion and the intermediate portion and a second portion extending between the intermediate portion and the bottom portion; the first portion of the passageway tapering from the top portion toward the intermediate portion and having threading formed along the inner surface; the second portion of the passageway tapering from the bottom portion toward the intermediate portion and having threading formed along the inner surface;
a top end sized to snugly fit within the insert pipe of the drain;
a bottom end sized to snugly fit within the drain pipe;
a top expansion ring made of a rigid material and having threading formed along its outer surface configured for engagement with the threading formed along the inner surface of the first portion of the passageway; when operatively connecting the coupling sleeve to the insert pipe of the drain, the top expansion ring being threadingly engageable with the top portion of the coupling sleeve so as to urge the coupling sleeve in the region of top expansion ring to bulge outwardly and seal the coupling sleeve against the insert pipe; and
a bottom expansion ring made of a rigid material and having threading formed along its outer surface configured for engagement with the threading formed along the inner surface of the second portion of the passageway; when operatively connecting the coupling sleeve to the drain pipe, the bottom expansion ring being threadingly engageable with the bottom portion of the coupling sleeve so as to urge the coupling sleeve in the region of bottom expansion ring to bulge outwardly and seal the coupling sleeve against the drain pipe.

2. The kit of claim 1 wherein the top portion of the sleeve body has a diameter that is sized smaller than the diameter of the bottom portion.

3. The kit of claim 2 wherein the sleeve body has helical threading projecting from the outer surface thereof.

4. The kit of claim 2 wherein the sleeve body has a sleeve body wall and the thickness of the sleeve body wall increases from each of the top and bottom ends of the sleeve body towards the intermediate portion.

5. The kit of claim 2 wherein the top expansion ring is sized smaller than the bottom expansion ring.

6. The kit of claim 2 further comprising a key fitting configured to mate with at least one of the top and bottom expansion rings for fixed rotation therewith; the key fitting being attachable to a tool.

7. The kit of claim 6 wherein the key fitting is configured to mate with the top expansion ring and the bottom expansion ring.

8. The kit of claim 6 wherein the key fitting has a body and a plurality of spaced apart stub arms projecting outwardly therefrom.

9. The kit of claim 8 wherein the key fitting has four stub arms.

10. The kit of claim 8 wherein the top expansion ring has an inner surface that defines a central cutout and includes a plurality of spaced apart landings cut into the inner surface of the top expansion ring at locations about the central cutout; each landing being configured to receive one of the stub arms of the key fitting.

11. The kit of claim 10 wherein the top expansion ring has a top face and a bottom face and the plurality of landings extend into the bottom face of the top expansion ring.

12. The kit of claim 10 wherein the top expansion ring has a top face and a bottom face and a plurality of grooves that extend through the top and bottom faces; each groove of the plurality being shaped to allow one of the stub arms of the key fitting to pass therethrough.

13. The kit of claim 8 wherein the bottom expansion ring has an inner surface that defines a central cutout and includes a plurality of spaced apart landings cut into the inner surface of the bottom expansion ring at locations about the central cutout; each landing being configured to receive one of the stub arms of the key fitting.

14. The kit of claim 13 wherein the bottom expansion ring has a top face and a bottom face and the plurality of landings extend into the top face of the bottom expansion ring.

15. A kit for coupling a first pipe to a second pipe, the kit comprising:
a coupling sleeve made of a resiliently deformable, elastomeric material; the coupling sleeve having a tubular sleeve body including:
a top portion, a bottom portion, an intermediate portion disposed between the top and bottom portions and an inner surface defining a passageway extending through the top, intermediate and bottom portions; the passageway having a first portion extending between the top portion and the intermediate portion and a second portion extending between the intermediate portion and the bottom portion; the first portion of the passageway tapering from the top portion toward the intermediate portion and having threading formed along the inner surface; the second portion of the passageway tapering from the bottom portion toward the intermediate portion and having threading formed along the inner surface;
a top end sized to snugly fit within the first pipe;
a bottom end sized to snugly fit within the second pipe;
a top expansion ring made of a rigid material and having threading formed along its outer surface configured for engagement with the threading formed along the inner surface of the first portion of the passageway; when operatively connecting the coupling sleeve to the first pipe, the top expansion ring being threadingly engageable with the top portion of the coupling sleeve so as to urge the coupling sleeve in the region of top expansion ring to bulge outwardly and seal the coupling sleeve against the first pipe; and
a bottom expansion ring made of a rigid material and having threading formed along its outer surface configured for engagement with the threading formed along the inner surface of the second portion of the passageway; when operatively connecting the coupling sleeve to the second pipe, the bottom expansion ring being threadingly engageable with the bottom portion of the coupling sleeve so as to urge the coupling sleeve in the region of bottom expansion ring to bulge outwardly and seal the coupling sleeve against the second pipe.

16. A kit for coupling a first pipe to a second pipe, the kit comprising:
a coupling sleeve made of a resiliently deformable, elastomeric material; the coupling sleeve having a tubular sleeve body including:
a first body portion, a second body portion, an intermediate body portion disposed between the first and second body portions and an inner surface defining a passageway extending through the first, intermediate and second body portions; the passageway having a first passageway portion extending between the first body portion and the intermediate body portion and a second passageway portion extending between the intermediate body portion and the bottom body portion; the first passageway portion tapering from the top body portion toward the intermediate body portion and having threading formed along the inner surface; the second passageway portion tapering from the bottom body portion toward the intermediate body portion and having threading formed along the inner surface;

a first end sized to snugly fit within the first pipe;

a second end sized to snugly fit within the second pipe;

a first expansion ring made of a rigid material and having threading formed along its outer surface configured for engagement with the threading formed along the inner surface of the first passageway portion; when operatively connecting the coupling sleeve to the first pipe, the first expansion ring being threadingly engageable with the first body portion of the coupling sleeve so as to urge the coupling sleeve in the region of first expansion ring to bulge outwardly and seal the coupling sleeve against the first pipe; and a second expansion ring made of a rigid material and having threading formed along its outer surface configured for engagement with the threading formed along the inner surface of the second passageway portion; when operatively connecting the coupling sleeve to the second pipe, the second expansion ring being threadingly engageable with the second body portion of the coupling sleeve so as to urge the coupling sleeve in the region of second expansion ring to bulge outwardly and seal the coupling sleeve against the second pipe.

17. A kit for coupling a drain having an insert pipe to a drain pipe, the kit comprising:

a coupling sleeve made of a resiliently deformable, elastomeric material; the coupling sleeve having a tubular sleeve body provided with:

an inner surface;

a top end sized to snugly fit within the insert pipe of the drain;

a top circumferential groove defined in the inner surface of the sleeve body at a location proximate the top end of the sleeve body; the thickness of the sleeve body being variable along the top circumferential groove;

a bottom end sized to snugly fit within the drain pipe;

a bottom circumferential groove defined in the inner surface of the sleeve body at a location proximate the bottom end of the sleeve body; the thickness of the sleeve body being variable along the bottom circumferential groove;

a top expansion ring made of a rigid material; the top expansion ring being sized to snugly fit within the top groove and having a plurality of outwardly projecting structures at spaced apart locations configured to abut the inner surface of the sleeve body; when operatively connecting the coupling sleeve to the insert pipe of the drain, the top expansion ring being rotatable within the top groove to position at least one of the plurality of outwardly projecting structures of the top expansion ring against an area of the sleeve body having increased thickness so as to urge the coupling sleeve in the region of top groove to bulge outwardly and seal the coupling sleeve against the insert pipe; and a bottom expansion ring made of a rigid material; the bottom expansion ring being sized to snugly fit within the bottom groove and having a plurality of outwardly projecting structures at spaced apart locations to abut the inner surface of the sleeve body; when operatively connecting the coupling sleeve to the drain pipe, the bottom expansion ring being rotatable within the bottom groove to position at least one of the plurality of outwardly projecting structures of the bottom expansion ring against an area of the sleeve body having increased thickness so as to urge the coupling sleeve in the region of bottom groove to bulge outwardly and seal the coupling sleeve against the drain pipe.

* * * * *